US010798953B2

(12) United States Patent
Liss

(10) Patent No.: US 10,798,953 B2
(45) Date of Patent: *Oct. 13, 2020

(54) APPARATUS AND METHODS FOR AT LEAST SEMI-AUTONOMOUS MEAL STORAGE AND COOKING

(71) Applicant: Home Tech Innovation, Inc., Cambridge, MA (US)

(72) Inventor: Robin Liss, Cambridge, MA (US)

(73) Assignee: Home Tech Innovation, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/591,843

(22) Filed: Oct. 3, 2019

(65) Prior Publication Data

US 2020/0029603 A1 Jan. 30, 2020

Related U.S. Application Data

(63) Continuation of application No. 15/419,627, filed on Jan. 30, 2017, now Pat. No. 10,440,979, which is a (Continued)

(51) Int. Cl.
*A23L 5/10* (2016.01)
*A47J 27/00* (2006.01)
(Continued)

(52) U.S. Cl.
CPC ............... *A23L 5/10* (2016.08); *A23L 3/364* (2013.01); *A23L 5/13* (2016.08); *A47J 27/002* (2013.01);
(Continued)

(58) Field of Classification Search
CPC . A23L 3/36; A23L 3/363; A23L 3/365; A23L 5/00; A23L 5/10; A23L 5/13;
(Continued)

(56) References Cited

U.S. PATENT DOCUMENTS 590,212 A 9/1897 Daesch
734,054 A 7/1903 Frost
(Continued)

FOREIGN PATENT DOCUMENTS

CA 2 904 544 A1 9/2014
DE 2 211 659 9/1973
(Continued)

OTHER PUBLICATIONS

Non-Final Office Action dated Jul. 14, 2017 for U.S. Appl. No. 15/419,627, 14 pages.
(Continued)

*Primary Examiner* — Drew E Becker
*Assistant Examiner* — Bryan Kim
(74) *Attorney, Agent, or Firm* — Cooley LLP

(57) ABSTRACT

A method of using a fluid-immersion storage and cooking device having a thermal container that defines a first volume and a second volume includes disposing a first food item in the first volume. A second food item and a third food item are disposed in the second volume in a first position and a second position, respectively. A volume of fluid having a first temperature is circulated through the first volume to transfer thermal energy to the first food item. After a predetermined time, at least a portion of the volume of fluid is heated to a second temperature. A portion of the volume of fluid is conveyed to the second volume such that (1) the second food item is substantially submerged in the portion of the volume of fluid and (2) the third food item is disposed substantially outside of the portion of the volume of fluid.

30 Claims, 19 Drawing Sheets

Related U.S. Application Data continuation of application No. PCT/US2016/061549, filed on Nov. 11, 2016.

(60) Provisional application No. 62/253,795, filed on Nov. 11, 2015.

(51) Int. Cl.

| | | |
|---|---|---|
| *A47J 36/00* | (2006.01) | |
| *A47J 27/18* | (2006.01) | |
| *A23L 3/36* | (2006.01) | |
| *A47J 36/32* | (2006.01) | |
| *A23B 4/06* | (2006.01) | |

(52) U.S. Cl.
CPC ............. *A47J 27/18* (2013.01); *A47J 36/00* (2013.01); *A47J 36/32* (2013.01); *A47J 36/321* (2018.08); *A23B 4/068* (2013.01)

(58) Field of Classification Search
CPC .... A23L 5/17; A23L 3/12; A23L 3/364; A47J 27/00; A47J 27/004; A47J 27/024; A47J 27/10; A47J 27/18; A47J 36/00; A47J 36/2405; A47J 36/2483; A47J 2027/043; A47J 39/006; A47J 44/00; A47J 36/32; A47J 36/321; A47J 27/002; B65D 81/18; B65D 81/34; B65D 81/3415; B65D 81/3438; F25D 3/08; F25D 3/11; F25D 17/06
USPC ....... 426/410, 412, 418, 520, 521, 523, 524; 99/325–335, 359, 367, 368
See application file for complete search history.

(56) References Cited

U.S. PATENT DOCUMENTS

| | | | |
|---|---|---|---|
| 2,097,478 A | 11/1937 | Struble | |
| 2,323,623 A | 7/1943 | Porter | |
| 3,547,660 A | 12/1970 | Weisberg | |
| 3,608,770 A | 9/1971 | Vincent et al. | |
| 3,819,089 A | 6/1974 | Scales | |
| 3,888,303 A * | 6/1975 | Skala | A47J 27/17 165/300 |
| 3,946,654 A | 3/1976 | Janssen | |
| 3,983,259 A | 9/1976 | Maior | |
| 4,013,798 A | 3/1977 | Goltsos | |
| 4,084,492 A * | 4/1978 | Sullivan | A47J 27/18 137/393 |
| 4,173,993 A * | 11/1979 | Skala | A47J 27/17 126/400 |
| 4,214,514 A | 7/1980 | Contino et al. | |
| 4,215,629 A | 8/1980 | Janssen | |
| 4,270,598 A | 6/1981 | Britton | |
| 4,505,192 A | 3/1985 | Dreano | |
| 4,646,628 A | 3/1987 | Lederman | |
| 4,817,512 A * | 4/1989 | Vangen | A47J 27/004 219/417 |
| 5,097,759 A | 3/1992 | Vilgrain et al. | |
| 5,123,337 A * | 6/1992 | Vilgrain | A47J 17/18 366/144 |
| 5,174,273 A * | 12/1992 | Oiwa | A47J 27/18 126/345 |
| 5,174,274 A * | 12/1992 | Oiwa | A47J 27/18 126/345 |
| 5,281,426 A | 1/1994 | Pardo | |
| 5,376,392 A | 12/1994 | Ikegami et al. | |
| 5,445,062 A | 8/1995 | Polster | |
| 5,542,344 A * | 8/1996 | Koether | A23L 3/375 392/445 |
| 6,085,639 A | 7/2000 | Dreano | |
| 6,162,478 A * | 12/2000 | Koch | A47J 29/02 426/298 |
| 6,447,827 B1 | 9/2002 | Andersen | |
| 6,588,327 B2 | 7/2003 | Wakabayashi et al. | |
| 7,654,194 B2 | 2/2010 | Lagares | |
| 7,757,601 B2 * | 7/2010 | Lagares Corominas | A23L 5/13 165/61 |
| 8,302,528 B2 | 11/2012 | Pawlick et al. | |
| 9,055,756 B2 | 6/2015 | Lambert | |
| 9,095,638 B2 | 8/2015 | Solfa | |
| 9,226,609 B2 * | 1/2016 | Romero | A47J 27/18 |
| 9,285,280 B2 * | 3/2016 | Faden | G01K 7/42 |
| 9,439,530 B2 | 9/2016 | Logan et al. | |
| 9,603,477 B2 * | 3/2017 | Hoare | A47J 27/10 |
| 9,826,752 B2 * | 11/2017 | Cocchi | A23G 1/56 |
| 2003/0057206 A1 | 3/2003 | Ishii et al. | |
| 2004/0094532 A1 | 5/2004 | Li | |
| 2004/0121054 A1 | 6/2004 | Berrier et al. | |
| 2005/0072315 A1 | 4/2005 | Romero | |
| 2007/0012068 A1 | 1/2007 | Kaplan | |
| 2007/0261561 A1 | 11/2007 | Grossbach et al. | |
| 2008/0069485 A1 | 3/2008 | France et al. | |
| 2009/0110791 A1 | 4/2009 | Burley et al. | |
| 2010/0021605 A1 | 1/2010 | Cadoret et al. | |
| 2010/0178402 A1 | 7/2010 | Ippolito et al. | |
| 2010/0255168 A1 | 10/2010 | Roth | |
| 2011/0104349 A1 * | 5/2011 | Foser | A47J 27/18 426/509 |
| 2011/0117259 A1 | 5/2011 | Storek et al. | |
| 2011/0195167 A1 | 8/2011 | Sus et al. | |
| 2012/0251695 A1 | 10/2012 | Neff et al. | |
| 2012/0298655 A1 | 11/2012 | Kamii et al. | |
| 2013/0011537 A1 | 1/2013 | Vahid | |
| 2013/0101720 A1 | 4/2013 | Allaire | |
| 2013/0129892 A1 | 5/2013 | Cadoret et al. | |
| 2013/0224342 A1 | 8/2013 | Peng | |
| 2013/0240500 A1 | 9/2013 | Alipour et al. | |
| 2013/0264333 A1 | 10/2013 | Alipour et al. | |
| 2014/0242232 A1 | 8/2014 | McDonald | |
| 2014/0251164 A1 | 9/2014 | Alipour et al. | |
| 2014/0260998 A1 | 9/2014 | Pearson | |
| 2014/0348989 A1 | 11/2014 | Sloat et al. | |
| 2015/0027319 A1 | 1/2015 | Wu | |
| 2015/0118362 A1 | 4/2015 | Raczynski | |
| 2015/0201749 A1 | 7/2015 | Turner et al. | |
| 2015/0257404 A1 | 9/2015 | Isenberg et al. | |
| 2015/0265090 A1 | 9/2015 | Pannella | |
| 2015/0272371 A1 | 10/2015 | Gagnon | |
| 2015/0289544 A1 * | 10/2015 | Mendonca Vilela Pinto Ferreira | A47J 27/10 426/232 |
| 2016/0206136 A1 | 7/2016 | Storek et al. | |
| 2016/0242594 A1 | 8/2016 | Empl | |
| 2016/0379434 A1 | 12/2016 | Huang | |
| 2017/0016623 A1 | 1/2017 | Rabie et al. | |
| 2017/0027365 A1 * | 2/2017 | Mendonca Vilela Pinto Ferreira | A47J 27/004 |
| 2017/0036791 A1 | 2/2017 | Infante | |
| 2017/0135383 A1 | 5/2017 | Liss | |
| 2017/0238750 A1 | 8/2017 | Liss et al. | |
| 2019/0104879 A1 | 4/2019 | Howitt | |

FOREIGN PATENT DOCUMENTS

| | | |
|---|---|---|
| FR | 2 753 346 A1 | 3/1998 |
| FR | 2 978 957 | 2/2013 |
| WO | WO 2015/018205 A1 | 2/2015 |
| WO | WO 2017/083664 A2 | 5/2017 |

OTHER PUBLICATIONS

Final Office Action dated Dec. 26, 2017 for U.S. Appl. No. 15/419,627, 10 pages.

Non-Final Office Action dated Jul. 27, 2018 for U.S. Appl. No. 15/419,627, 14 pages.

Final Office Action dated Apr. 15, 2019 for U.S. Appl. No. 15/419,627, 18 pages.

(56) References Cited

OTHER PUBLICATIONS

Non-Final Office Action dated Jun. 16, 2017 for U.S. Appl. No. 15/487,835, 14 pages.
Final Office Action dated Oct. 2, 2017 for U.S. Appl. No. 15/487,835, 16 pages.
Non-Final Office Action dated Jul. 3, 2019 for U.S. Appl. No. 15/942,860, 10 pages.
Extended European Search Report dated Jun. 18, 2019 for European Application No. 16865091.9, 7 pages.
Invitation to Pay Additional Fees dated Feb. 24, 2017 for International Application No. PCT/US2016/061549, 2 pages.
International Search Report and Written Opinion dated May 22, 2017 for International Application No. PCT/US2016/061549, 11 pages.
International Search Report and Written Opinion dated Jul. 25, 2017 for International Application No. PCT/US2017/018312, 14 pages.
International Search Report and Written Opinion dated Nov. 5, 2018 for International Application No. PCT/US2018/041819, 11 pages.
International Search Report and Written Opinion dated Nov. 23, 2018 for International Application No. PCT/US2018/051367, 14 pages.
"Are You Storing Food Safely," Refrigeration, published Jun. 8, 2009, https://web.archive.org/web/20090608062550/www.fda.gov:80/ForConsumers/ConsumerUpdates/ucm093704.htm, 2009, 4 pages.
"June Intelligent Oven—The Computer-based Oven That Thinks Like a Chef," Jul. 15, 2015, [retrieved from the Internet on Mar. 7, 2017], <URL: https://juneoven.com/the-oven>, 25 pages.
"Meet Mellow: the Smart Sous-Vide Machine," Apr. 28, 2014, [retrieved from the Internet on Mar. 7, 2017], <URL: https://cookmellow.com/technology#anchor>, 12 pages.
Sous Vide, published Aug. 18, 2015, http://web.archive.org/web/20150818223717/https://www.molecularrecipes.com/sous-vide-class/sous-vide-cooking-time-temperature/, 2015, 8 pages.
"Thermonix USA: Home Cooking, Made Easy," Feb. 5, 2001, [retrieved from the Internet on Mar. 7, 2017], <URL: https://thermonix-state-of-the-art-machinery-specs/>, 5 pages.
"Why Sous Vide Supreme?," Sous-Vide Supreme—Offical Site, Sep. 19, 2010, [retrieved from the Internet on Mar. 7, 2017], <URL: https://sousvidesupreme.com/en-us/learn/why-sousvide-supreme.htm/>, 10 pages.
Final Office Action dated Dec. 20, 2019 for U.S. Appl. No. 15/942,860, 8 pages.

\* cited by examiner

US 10,798,953 B2

APPARATUS AND METHODS FOR AT LEAST SEMI-AUTONOMOUS MEAL STORAGE AND COOKING

CROSS-REFERENCE TO RELATED APPLICATIONS

This application is a continuation of U.S. patent application Ser. No. 15/419,627 entitled, "Apparatus and Methods for At Least Semi-Autonomous Meal Storage and Cooking Via Fluid Immersion," filed Jan. 30, 2017, now U.S. Pat. No. 10,440,979, which is a continuation of International Patent Application Serial No. PCT/US2016/061549 entitled, "Apparatus and Methods for At Least Semi-Autonomous Meal Storage and Cooking Via Fluid Immersion," filed Nov. 11, 2016, which claims priority to and the benefit of U.S. Provisional Patent Application Ser. No. 62/253,795 entitled, "Apparatus and Methods for At Least Semi-Autonomous Meal Storage and Cooking Via Fluid Immersion," filed Nov. 11, 2015, the disclosures of which are incorporated herein by reference in their entireties.

BACKGROUND

The embodiments described herein relate to apparatus and methods for meal refrigeration and/or cooking and more specifically, to apparatus and methods for at least semi-autonomous storing, refrigerating, and cooking of meals via fluid immersion.

Sous-vide is a method of cooking that is intended to maintain the integrity of food by heating the food for an extended period of time at a relatively low temperature. In some instances, a machine can contain a volume of water and can transfer thermal energy to the volume of water to reach and/or maintain a desired temperature thereof. The food in sous-vide cooking methods is disposed in a vacuum tight package and/or bag, which can be inserted into the machine to submerge the food in the water. Prior to or directly after inserting the food, the water is heated to a temperature typically below the water's boiling point (e.g., around 63 degrees Celsius (° C.) or about 145 degrees Fahrenheit (° F.)). The thermal energy released by the hot water heats the submerged food until a temperature of the food and the temperature of the hot water are in a state of substantial thermal equilibrium. Thus, the food can be cooked to a desired temperature by controlling the temperature of the water in which the food is disposed.

Some known sous-vide cooking methods can involve a significant amount time in preparing the meal, which can, in some instances, present challenges for using sous-vide cooking methods on a daily basis. In an effort to mitigate these challenges, food can be prepared in advance and stored, for example, in a refrigerator. The food can then be placed in a sous-vide cooking device and cooked. Such methods, however, involve human intervention and can be time consuming.

Thus, a need exists for improved apparatus and methods for at least semi-autonomous storing and cooking of meals via fluid immersion.

SUMMARY

Apparatus and methods for at least semi-autonomous meal preparation via fluid immersion are described herein. In some embodiments, a method of using a fluid-immersion storage and cooking device having a thermal container that defines a first volume and a second volume includes disposing a first food item in the first volume. A second food item is disposed in a first position within the second volume. A third food item is disposed in a second position within the second volume different from the first position. A volume of fluid is circulated through the first volume. The volume of fluid has a first temperature and is configured to transfer thermal energy to the first food item. After a predetermined time, at least a portion of the volume of fluid is heated to a second temperature greater than the first temperature. At least a portion of the volume of fluid is conveyed to the second volume such that (1) the second food item is substantially submerged in the portion of the volume of fluid conveyed into the second volume and (2) the third food item is disposed substantially outside of the volume of fluid conveyed into the second volume.

DETAILED DESCRIPTION

Figure 1:
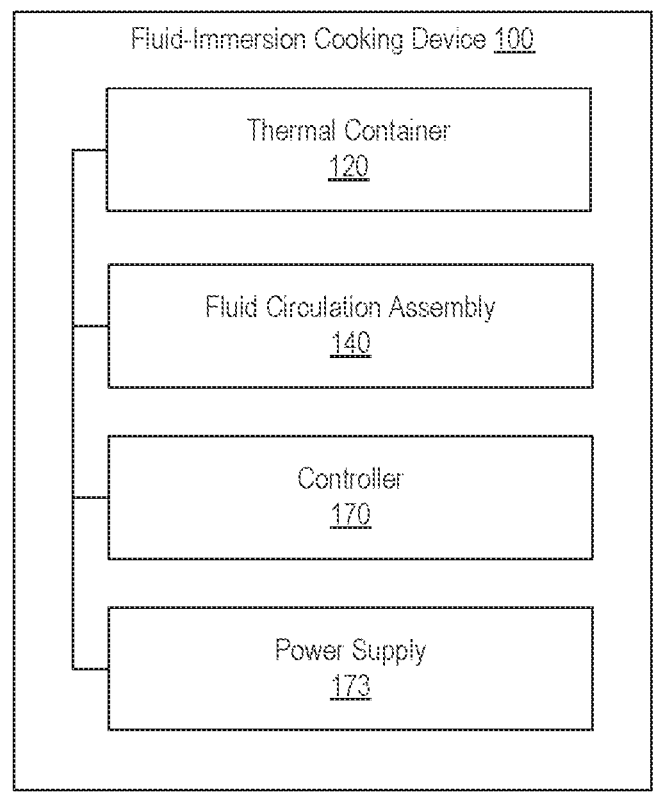
FIG. 1 is a schematic illustration of a semi-autonomous fluid-immersion cooking device according to an embodiment.

Apparatus and methods for at least semi-autonomous meal preparation via fluid immersion are described herein. In some embodiments, a method of using a fluid-immersion storage and cooking device having a thermal container that defines a first volume and a second volume includes disposing a first food item in the first volume. A second food item is disposed in a first position within the second volume. A third food item is disposed in a second position within the second volume different from the first position. A volume of fluid is circulated through the first volume. The volume of fluid has a first temperature and is configured to transfer thermal energy to the first food item. After a predetermined time, at least a portion of the volume of fluid is heated to a second temperature greater than the first temperature. At least a portion of the volume of fluid is conveyed to the second volume such that (1) the second food item is substantially submerged in the portion of the volume of fluid conveyed into the second volume and (2) the third food item is disposed substantially outside of the volume of fluid conveyed into the second volume.

In some embodiments, an apparatus includes a thermal container and a fluid circulation system. The thermal container is formed of a material having a relatively low thermal conductivity. The thermal container has a first portion defining a first volume configured to receive a first food item, and a second portion defining a second volume configured to receive a second food item and a third food item. The thermal container includes a wall or at least a portion of a wall formed of a material having a relatively high thermal conductivity and that collectively defines a portion of the first volume and a portion of the second volume. The fluid circulation system is in fluid communication with the first volume and the second volume. The fluid circulation system has a first configuration, a second configuration, and a third configuration. The fluid circulation system is configured to circulate a volume of fluid having a first amount of thermal energy through the first volume when in the first configuration. The fluid circulation system is configured to circulate the volume of fluid having a second amount of thermal energy greater than the first amount of thermal energy through the first volume when in the second configuration. The fluid circulation system is configured to (1) increase the thermal energy of the volume of fluid from the second amount of thermal energy to a third amount of thermal energy and (2) convey at least a portion of the volume of fluid having the third amount of thermal energy to the second volume when the fluid circulation system is in the third configuration.

In some embodiments, a method of using a fluid-immersion storage and cooking device having a thermal container that defines a first volume and a second volume includes disposing a food item in the first volume and disposing a food item in the second volume. A volume of fluid is then circulated through the first volume. The volume of fluid has a temperature below a temperature threshold. The food item in the first volume is at least partially disposed in the volume of fluid and is maintained at temperature below the temperature threshold. Thermal energy is transferred from the second volume to the first volume via a thermally conductive wall disposed between the first volume and the second volume and at least a portion of the thermal energy is absorbed by the volume of fluid circulating through the first volume. The method further includes removing thermal energy from the volume of fluid.

In some embodiments, a method includes storing food within a thermal container of a fluid-immersion cooking device. The thermal container includes a volume of fluid at a first predetermined temperature. The food is disposed in a sealed package, which is submerged within the volume of fluid. A controller of the fluid-immersion cooking device receives an indication associated with a predetermined time. The controller sends a signal to a heating element operatively coupled to the thermal container after the predetermined time. The heating element heats, via thermal energy, the volume of fluid within the thermal container from the first predetermined temperature to a second predetermined temperature. A portion of the thermal energy is transferred to the food submerged within the volume of fluid until a temperature associated with the food is substantially equal to the second predetermined temperature.

As used in this specification, the singular forms "a," "an" and "the" include plural referents unless the context clearly dictates otherwise. Thus, for example, the term "a member" is intended to mean a single member or a combination of members, "a material" is intended to mean one or more materials, or a combination thereof.

As used herein the term "module" refers to any assembly and/or set of operatively-coupled electrical components that can include, for example, a memory, a processor, electrical traces, optical connectors, software (executing in hardware), and/or the like. For example, a module executed in the processor can be any combination of hardware-based module (e.g., a field-programmable gate array (FPGA), an application specific integrated circuit (ASIC), a digital signal processor (DSP)) and/or software-based module (e.g., a module of computer code stored in memory and/or executed at the processor) capable of performing one or more specific functions associated with that module.

As used herein, the terms "feedback", "feedback system", and/or "feedback loop" relate to a system wherein past or present characteristics influence current or future actions. For example, a fluid circulation system is said to be a feedback system wherein the state of the fluid circulation system (e.g., a measurable temperature of a desired medium) is dependent on a current or past state being fed back to the fluid circulation system. In some instances, a feedback system can be an electromechanical system including a number of relays, switches, and/or the like that can open or close an electric circuit based on a signal received from a sensor, a flow or a direction of a flow of electricity, and/or the like. In some instances, a feedback system can be controlled and/or implemented in a programmable logic controller (PLC) that can use control logic to perform one or more actions based on an input from a system component, a state of an electric circuit, and/or a flow of electric power. In some instances, a PLC can include a control scheme such as, for example, a proportional-integral-derivative (PID) controller. As such, an output of some feedback systems can be described mathematically by the sum of a proportional term, an integral term, and a derivative term. PID controllers are often implemented in one or more electronic devices. In such controllers, the proportional term, the integral term, and/or the derivative term can be actively "tuned" to alter characteristics of the feedback system.

Electronic devices often implement feedback systems to actively control electromechanical and/or fluidic systems in order to achieve and/or maintain a desired system state. For example, a feedback system can be implemented to control a fluidic system (e.g., a volume of water within a closed system) by opening or closing one or more valves, operating one or more pumps, increasing or decreasing a temperature of the water, and/or the like. Expanding further, the feedback system can determine current and/or past states (e.g., temperature, flow rate, volume, etc.) of at least a portion of the volume of water and return the past and/or current state values to, for example, a PID control scheme. In some instances, an electronic device (e.g., a controller) can implement any suitable numerical method or any combination thereof (e.g., Newton's method, Gaussian elimination, Euler's method, LU decomposition, etc.). Thus, based on the past and/or current state of at least the portion of the volume of water, the fluidic system can be actively changed to achieve a desired system state.

FIG. 1 is a schematic illustration of a fluid-immersion cooking device 100 according to an embodiment. The fluid-immersion cooking device 100 (also referred to herein as "device") can be any suitable cooking device, machine, and/or system. As described in further detail herein, for example, the device 100 can be a sous-vide cooking device configured to store food within a sealed package and disposed in the device 100 at a first temperature prior to cooking and configured to cook the food disposed therein at a second temperature greater than the first temperature via heat transfer between the food and a circulating fluid such as water. The device 100 includes at least one thermal container 120, a fluid circulation system 140, a controller 170 and a power supply 173. Although not shown in FIG. 1, the device 100 can include a housing configured to house and/or at least partially enclose the at least one thermal container 120, the fluid circulation system 140, the controller 170, and/or the power supply 173. Moreover, the housing can include a lid or the like configured to allow access to at least a portion of the components disposed within the housing. As described in further detail herein, the device 100 (e.g., the housing) can also include one or more user interface portions such as, for example, a display or touchscreen display configured to present information associated with the device 100.

The thermal container(s) 120 can be any suitable shape, size, and/or configuration. In some embodiments, the device 100 can include a single thermal container 120. In other embodiments, the device 100 can include multiple thermal containers 120 (e.g., two, three, four, five, six, seven, eight, nine, ten, or more thermal containers 120). More specifically, in some embodiments, the device 100 can include a thermal container 120 for each day of the week (i.e., seven) or each day of the workweek (i.e., five). In some embodiments, the housing of the device 100 can include a display and/or indicia associated with each thermal container 120 included in the device 100.

The thermal container(s) 120 can be formed of and/or can include any suitable material(s) or combinations thereof. For example, in some embodiments, the thermal container(s) 120 can be formed of a material having a relatively high thermal conductivity. In other words, the thermal container(s) 120 can be formed of and/or can include materials configured to conduct and/or transfer thermal energy, for example, to a volume of water disposed therein. More specifically, the thermal container(s) 120 and/or any suitable portion thereof can be formed of a metal having a thermal conductivity, for example, between about 10 watts/meter*Kelvin (W/mk) and about 250 W/mk. For example, the thermal container(s) 120 and/or any suitable portion thereof can be formed of aluminum having a thermal conductivity between about 200 W/mk and about 250 W/mk. In other embodiments, the thermal container(s) 120 and/or any suitable portion thereof can be formed of stainless steel having a thermal conductivity between about 12 W/mk and about 45 W/mk. In still other embodiments, the thermal container(s) 120 and/or any suitable portion thereof can be formed of any other suitable material or combination of materials having a relatively high thermal conductivity.

While the thermal container(s) 120 can be formed from a material having a relatively high thermal conductivity, a material or combination of materials having a relatively low thermal conductivity (e.g., foam insulation and/or the like) can be disposed about each thermal container 120 to insulate and/or at least partially thermally isolate a portion of the thermal container(s) 120 from other portions of the device 100 (e.g., other thermal containers 120, the controller 170, portions of the fluid circulation system 140, etc.) In other words, each thermal container 120 can include and/or can be at least partially surrounded by an insulating material (not shown in FIG. 1). For example, in some embodiments, the thermal container(s) 120 can include and/or can be at least partially surrounded by an insulating material having a thermal conductivity between about 0.2 W/mk and about 1.8 W/mk. In some embodiments, such insulating material can be, for example, pourable closed-cell foam insulation (e.g., about 0.24 W/mk), polyisocyanurate foam (e.g., about 0.26 W/mk), mineral wool (e.g., about 1.73 W/mk), and/or the like. In other embodiments, any portion of the device 100 and/or thermal container(s) 120 can be formed from a plastic such as, for example, polypropylene (e.g., about 0.1 W/mk to about 0.22 W/mk), glass-filled nylon such as nylon 6, 30% glass-filled (e.g., about 0.23 W/mk), epoxy (e.g., about 0.17 W/mk), and/or the like. In some embodiments, by arranging the device 100 as, for example, a sous-vide cooking device using relatively low cooking temperatures, the insulating material provides thermal insulation through a range of operating temperatures that is smaller than a range of operating temperatures otherwise associated with other forms of cooking, which can allow for the use of various insulating materials otherwise unsuitable for other cooking methods (e.g., polyurethane and/or the like).

In embodiments including multiple thermal containers 120, thermally insulating each thermal container 120 can allow for independent temperature control of each thermal container 120. For example, in some such embodiments, a thermal container can be in a relatively low temperature configuration (e.g., a storage or refrigeration configuration), while an adjacent thermal container can be in a relatively high temperature configuration (e.g., a cooking configuration). Thus, by insulating each thermal container and/or at least a portion thereof, thermal energy associated with the thermal container in the relatively high temperature configuration can be substantially isolated from the thermal container in the relatively low temperature configuration. In other instances, thermal energy transfer between thermal container(s) can be controlled in any suitable manner.

The thermal container(s) 120 define one or more volumes configured to receive a volume of fluid and one or more packages of food. For example, in some embodiments, each thermal container 120 can define two volumes (e.g., a first volume and a second volume) that are fluidically isolated from each other by a wall or divider. In such embodiments, the wall or divider can have a relatively high thermal conductivity such that thermal energy can be transferred between the first volume and the second volume via the wall or divider, as described in further detail herein. In some embodiments, the first volume can be configured to receive a first kind of food (e.g., meats and/or other proteins) and the second volume can be configured to receive a second kind of food (e.g., vegetables, starches, carbohydrates, sauces, and/or the like). More specifically, in some instances, one or more food items can be pre-packaged (e.g., within a fluid-tight package or the like), which in turn, is coupled to and/or otherwise included in a cartridge. In some embodiments, the cartridge and thermal container 120 are collectively arranged or configured (e.g., via a shape or size, a feature such as a rail and/or groove, etc.) such that the cartridge including the first kind of food and the second kind of food can only be disposed within the thermal container 120 in predetermined orientation. Thus, the cartridge is configured to be inserted into the thermal container 120 in the predetermined orientation such that the first kind of food is disposed in the first volume and the second kind of food is disposed in the second volume. As described in further detail herein, the thermal container(s) 120 can be configured to store the food contained therein at a first desired temperature prior to cooking and in response to one or more instructions being executed by the controller 170, can receive a flow of heated fluid and/or can otherwise heat a fluid contained therein to heat (e.g., cook) the food to a second desired temperature greater than the first desired temperature.

The fluid circulation system 140 of the device 100 can be any suitable shape, size, and/or configuration. The fluid circulation system 140 is configured to regulate a temperature of a working fluid such as, for example, water contained in or flowing through the device 100. For example, the fluid circulation system 140 can include any number of fluid conduits, tubing, pipes, valves, solenoids, pumps, fluid reservoirs, and/or the like that can collectively define any suitable number of fluid flow paths within the device 100. Moreover, the fluid circulation system 140 can include any number of heat exchangers and/or heat exchanger assemblies, heat sinks, heating elements, steamers, heat diffusers, cooling elements, chillers, and/or the like. As such, the fluid circulation system 140 can receive a signal and/or electrical power from the controller 170 and/or power supply 173, respectively, which is operative to controlling, changing, maintaining, and/or otherwise regulating a temperature of a volume of fluid contained in the device.

By way of example, in some embodiments, the fluid circulation system 140 can include a fluid reservoir configured to contain a volume of fluid such as, for example, water, which in turn, is in selective fluid communication with the at least one thermal container 120 via any suitable number and/or arrangement of fluid conduits, valves, pumps, solenoids, and/or the like. Similarly, the fluid circulation system 140 can include any suitable number and/or arrangement of fluid conduits, valves, pumps, solenoids, and/or the like configured to selectively place the at least one thermal container 120 in fluid communication with one or more heat exchangers, coolers, and/or heat sources. In response to an input such as, for example, a user input (e.g., either a local input or an input via a network), an input associated with a predetermined schedule and/or event, and/or the like, the controller 170 can send a signal to the fluid circulation system 140 to regulate a flow and/or temperature of the water within the device 100. For example, in some instances, the fluid circulation system 140 can open one or more valves or solenoids to define a fluid flow path from the thermal container 120 to a chiller assembly (e.g., one or more coolers or the like), and a second fluid flow path from the thermal container 120 to one or more heat sources such as an inline heat source or the like. In this manner, fluid (e.g., water) can be circulated within the first fluid flow path through the chiller assembly and/or coolers or within the second fluid flow path through the one or more heat sources to control a temperature of the fluid contained within the thermal container 120, as described in further detail herein.

The controller 170 can be any suitable electronic and/or electromechanical device configured to at least semi-autonomously control at least a portion of the device 100. For example, in some embodiments, the controller 170 can include any suitable electronic and/or electromechanical device configured to control at least a portion of the device 100. The controller 170 can perform any number of processes and/or can execute any suitable instructions or code associated with controlling a portion of the device 100 (e.g., via a feedback control system, PLC, PID, etc.) to store and cook food items placed in the device 100.

More specifically, the controller 170 can include, for example, at least the power source 173, a memory, a processor, and an input/output (I/O) interface. The memory can be, for example, a random access memory (RAM), a memory buffer, a hard drive, a read-only memory (ROM), an erasable programmable read-only memory (EPROM), and/or the like. In some embodiments, the memory stores instructions to cause the processor to execute modules, processes, and/or functions associated with controlling one or more portions of the device 100, as described above. The processor of the controller 170 can be any suitable processing device such as general-purpose processor (GPP), a central processing unit (CPU), an accelerated processing unit (APU), a field programmable gate array (FPGA), an application specific integrated circuit (ASIC), and/or the like. The processor can be configured to run or execute a set of instructions or code stored in the memory associated with the operation of one or more portions of the device 100. The I/O interface can be, for example, a Universal Serial Bus (USB) interface; an Institute of Electrical and Electronics Engineers (IEEE) 1394 interface (FireWire); a Thunderbolt™ interface; a Serial ATA (SATA) interface or external Serial ATA (eSATA) interface; a network interface card (including one or more Ethernet ports and/or a wireless radios such as a wireless fidelity (WiFi®) radio, a Bluetooth® radio, a near field communication (NFC) radio, a ZigBee protocol radio, a Thread protocol radio, a radio-frequency identification (RFID) radio, and/or the like). The I/O interface is configured to send signals to and/or receive signals from the processor. Similarly, the I/O interface can be configured to receive signals from and/or send signals (e.g., data, electric power, etc.) to any suitable electric and/or electronic device included in the device such as, for example, one or more sensors (e.g., fluid level sensors, flow rate sensors, thermometers, thermistors, etc.), thermoelectric coolers (e.g., Peltier coolers or the like), compressors, liquid heat exchangers, heaters, boilers, steam generators, pumps, optical scanners, barcode scanners, quick response (QR) code scanners, RFID transmitters, inter-integrated circuits (I2Cs), universal asynchronous receive/transmit (UART) devices, serial peripheral interface (SPI) devices, and/or the like.

In some instances, the controller 170 can perform and/or execute one or more processes associated with cooking food disposed in the thermal container 120. In such instances, the controller 170 can be configured to send signals to and/or receive signals from, for example, any number of pumps, valves, solenoids, heat exchangers or heat exchanger assemblies, heating elements, sensors (e.g., fluid level sensors, temperature sensors, and/or the like), etc. associated with maintaining a volume of fluid within at least a portion of the volume defined by the thermal container 120 substantially at a predetermined temperature. For example, the controller 170 can perform one or more processes to cause the power supply 173 to send electrical energy to one or more heating elements operatively coupled to the thermal container 120 and/or otherwise in communication with at least a portion of the volume of fluid (e.g., water) circulating through the thermal container 120. As such, the heating element can transfer thermal energy to the volume of fluid contained in the thermal container 120 and/or circulating therethrough, which in turn, increases a temperature of the fluid. The controller 170 can be configured to regulate the amount of thermal energy released from the heating element, for example, to maintain the heating element and the volume of fluid in a state of thermal equilibrium (substantially). Moreover, the food contained in the package (and/or cartridge) and disposed in the thermal container 120 is submerged in the volume of fluid and thus, the device 100 can cook the food in a sous-vide manner (e.g., via fluid-immersion cooking). In some instances, by maintaining the heating element and the volume of fluid within the thermal container 120 or circulating therethrough in thermal equilibrium (substantially), the volume of fluid transfers a portion of the thermal energy to the food submerged therein until, for example, the volume of fluid and the food reach a state of thermal equilibrium (substantially). In this manner, the controller 170 can be configured to control at least a portion of the device 100 to cook the food contained in the thermal container 120 to a desired temperature with little variance thereof.

By way of another example, in some instances, the controller 170 can perform and/or execute one or more processes associated with maintaining a food contained in the thermal container 120 at a predetermined temperature prior to cooking the food item (e.g., refrigerating). In such instances, a user can pour a volume of fluid (e.g., water) into a volume defined by one or more thermal containers 120. In addition, the user can insert, for example, one or more packages and/or cartridges containing the desired food items into the volume defined one or more thermal container 120 (e.g., at least one package and/or cartridge per thermal container). As described above, the arrangement of the package and/or cartridge and the thermal container 120 into which it is inserted is such that the package and/or cartridge is inserted with a predetermined orientation and/or configuration.

With the food items and the fluid disposed in the thermal container(s) 120, the controller 170 can send signals to and/or receive signals from, for example, any number of pumps, valves, solenoids, heat exchangers or heat exchanger assemblies, sensors, etc. associated with maintaining a volume of the fluid within at least a portion of the volume defined by the thermal container(s) 120 (and/or circulating therethrough) substantially at the predetermined temperature. In some instances, for example, the controller 170 can send one or more signals to the fluid circulation system 140 such that a fluid flow path is defined between the thermal container 120 and a chiller, chiller assembly, heat exchanger, cooler, etc. In such instances, a chiller assembly (e.g., a heat exchanger) can be configured to absorb thermal energy from the fluid flowing within the fluid flow path and can reject the thermal energy, for example, to an environment outside of the chiller assembly. Said another way, the chiller assembly can cool the fluid as the fluid flows through a heat exchanger and/or otherwise through a chiller or cold sink operatively coupled thereto. Thus, the cooled fluid can flow into the volume defined by the thermal container 120 and a volume of warmer fluid can be circulated back toward the chiller assembly (i.e., the fluid is circulated through the thermal container 120). In this manner, the fluid can maintain the volume defined by the thermal container 120 substantially at the predetermined temperature, which in turn, can remove thermal energy from the food disposed therein to maintain the food substantially at the predetermined temperature. In some instances, the predetermined temperature can be, for example, about 40° F. In other words, the controller 170 can be configured to perform one or more processes associated with refrigerating the food within the thermal container(s) 120 prior to cooking the food.

As described above, the controller 170 can be configured to perform any suitable process associated with at least semi-autonomously storing (e.g., chilling or refrigerating) food contained in the device 100 at a first predetermined temperature and can perform any suitable process associated with cooking the food contained in the device 100 (e.g., increasing a temperature of the food to a second predetermined temperature greater than the first predetermined temperature. For example, the controller 170 includes a memory configured to receive and/or store instructions that are executed by one or more processors. The controller 170 can receive data and/or instructions from any suitable source. For example, as described above, in some embodiments, the device 100 can include a housing having one or more user interfaces. Such a user interface can include, for example, a display or a touch screen display, one or more buttons, toggles, switches, timers, etc. Thus, a user can perform any suitable action via the user interface that can result in any number of signals being sent to the controller 170. Such signals can be, for example, indicative of instructions, which can be stored in the memory and executed by a processor. In response, the controller 170 can perform any suitable process associated with controlling the device 100 such as those described above.

Figure 2:
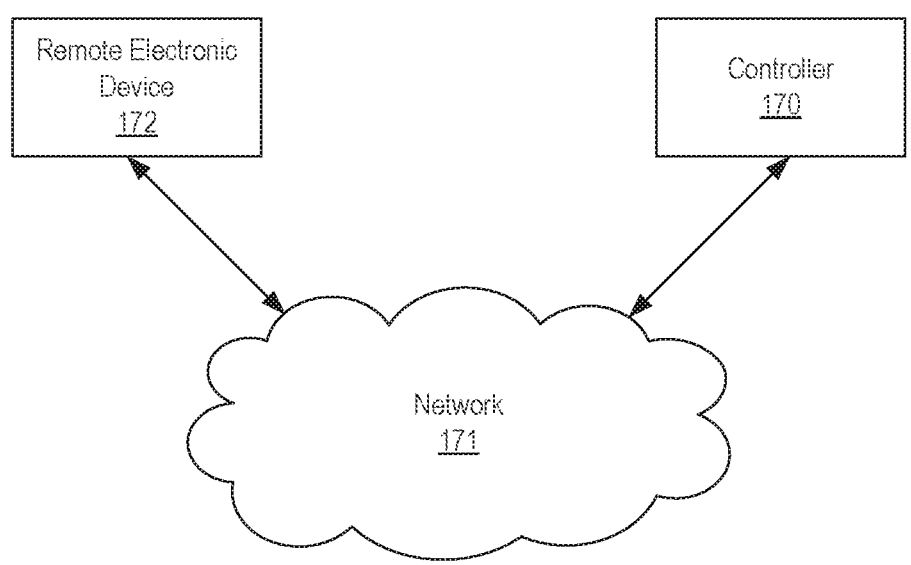
FIG. 2 is a schematic illustration of a controller included in the semi-autonomous fluid-immersion cooking device of FIG. 1 and an electronic device each of which is in communication with a network.

As shown in FIG. 2, in some embodiments, the controller 170 of the device 100 can include a I/O interface such as a network interface card (e.g., including at least one of an Ethernet port and a wireless radio) configured to place the controller 170 in communication with a network 171. The network 171 can be any suitable network such as, for example, a wide area network (WAN), a local area network (LAN), a virtual local area network (VLAN), the Internet, a cellular data network such as long term evolution LTE, etc. The network can be implemented as a wired or wireless network. In this manner, a user can remotely send signals to the controller 170 via the network 171 and a remote electronic device 172 such as a handheld controller, a mobile device, a smartphone, a tablet, a laptop, a personal (PC), and/or the like. For example, the remote electronic device 172 can include at least a processor, a memory, and a display and can run, for example, a personal computer application, a mobile application, a web page, and/or the like. In this manner, a user can manipulate the remote electronic device 172 such that data associated with the device 100 is graphically represented on the display of the remote electronic device 172 (e.g., via an application or "app"). Thus, the user can interact with the app to send signals to and/or receive signals from the controller 170 of the device 100 via the network 171. In such instances, the user can use the remote electronic device 172, for example, to establish a target time at which food should be completely cooked and ready for consumption, to override a pre-programmed process, to turn on or off the device 100 (e.g., place in a "powered on" state or a "powered off" state, respectively), and/or to control any other suitable function of the controller 170 and/or device 100.

As described above, the controller 170 and/or the device 100 can include any suitable sensor, encoder, scanner, and/or the like configured to collect data associated with the operation or lack of operation of a portion of the device 100 and can send the data to the controller 170. For example, in some embodiments, the device 100 can include a scanner such a barcode scanner, a QR code scanner, a NFC device or radio, a RFID device or radio, and/or the like configured to scan, detect, and/or otherwise receive data associated with the food disposed within the device 100. More specifically, in some embodiments, the food is disposed in one or more packages, each of which can include at least one bar code, QR code, and/or RFID tag configured to identify the food contained therein. The device 100 can include a bar code, QR code scanner, and/or RFID transceiver configured to scan the code on the package and/or otherwise receive a signal from the package when the food is inserted into the device 100, and based on data associated with the scanned code or signal, can determine information associated with the food contained in the package. Such information or data can be stored, for example, in the memory of the controller 170 and/or in a database operative coupled thereto. The information and/or data can include, for example, storing and/or cooking instructions, times, temperatures, expiration dates, and/or any other suitable information, as described in further detail herein.

FIGS. 3-10 illustrate a semi-autonomous fluid-immersion cooking device 200 according to an embodiment. The fluid-immersion cooking device 200 (also referred to herein as "device") can be any suitable cooking device, machine, and/or system. As described in further detail herein, for example, the device 200 can be a sous-vide cooking device configured to store food within a sealed package and disposed in the device 200 at a first temperature prior to cooking and configured to cook the food disposed therein at a second temperature greater than the first temperature via a heat transfer between the food and a circulating fluid such as water. The device 200 includes a housing 210, a set of thermal containers 220, a fluid circulation system 240, and a controller (not shown in FIGS. 3-10). In some embodiments, the device 200 can be substantially similar to the device 100 described above with reference to FIGS. 1 and 2. Thus, some aspects of the device 200 are not described in further detail herein. For example, although not shown in FIGS. 3-10, the controller of the device 200 can be substantially similar to or the same as the controller 170 described above with reference to the device 100. As such, the controller of the device 200 can include and/or can be in communication with any suitable electronic and/or electromechanical device configured to control at least a portion of the device 200. Moreover, the controller can be electrically connected to any suitable power supply such as, for example, an electrical wall outlet, a battery, and/or the like.

Figure 3:
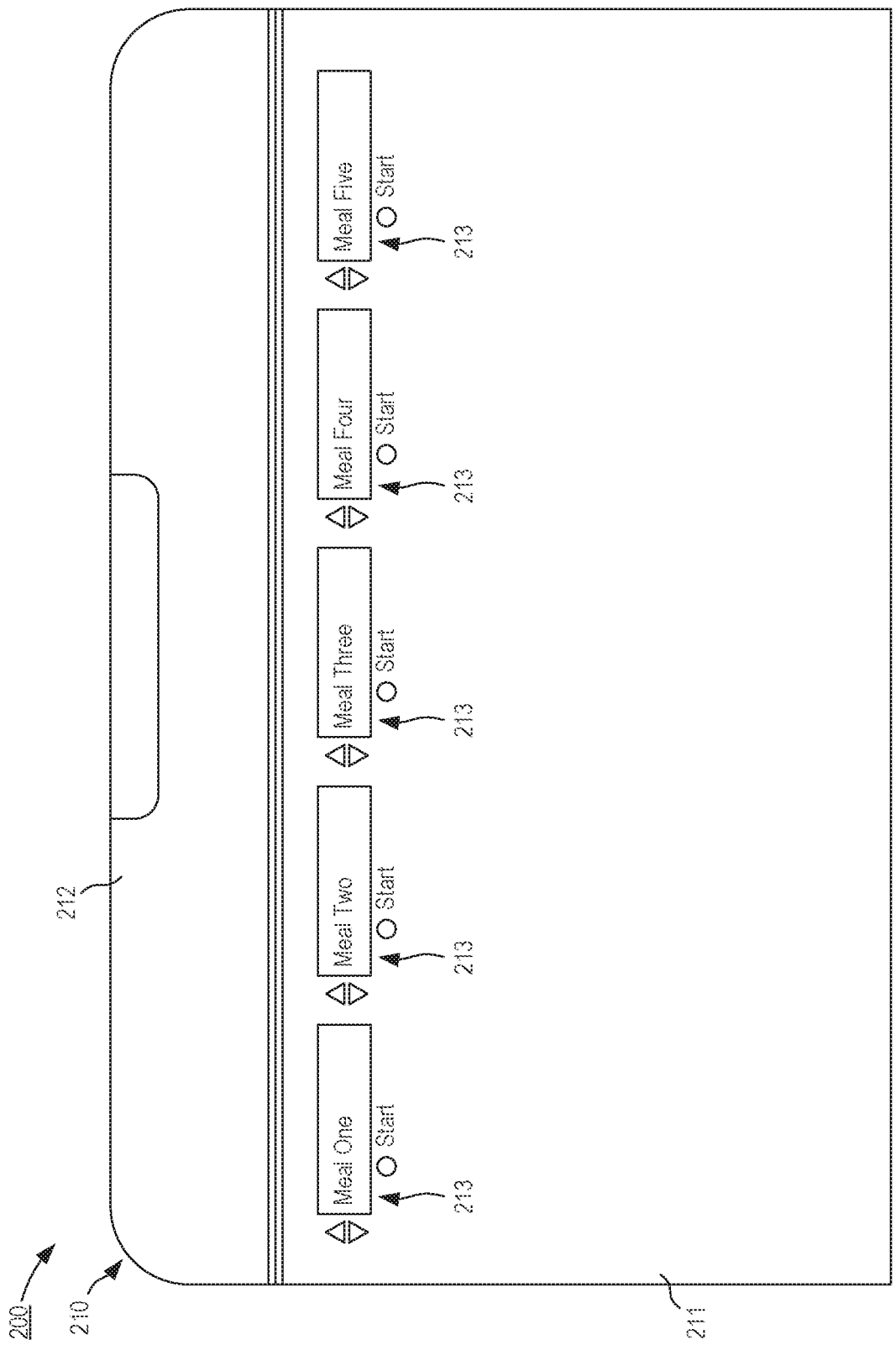
FIG. 3 is a front view of a semi-autonomous fluid-immersion cooking device according to an embodiment.

The housing 210 of the device 200 is configured to house and/or at least partially enclose the set of thermal containers 220, the fluid circulation system 240, and the controller 270. The housing can be any suitable shape, size, and/or configuration. For example, as shown in FIG. 3, the housing 210 is substantially rectangular and can have a size suitable for placement on or in, for example, a kitchen countertop, a cabinet, and/or the like. The housing 210 includes a body portion 211 and a lid 212. The lid 212 is movably coupled to the body portion 211 and can be transitioned from a closed configuration to an open configuration to allow a user to access the components contained within the housing 210. While the device 200 is shown in FIG. 3 as including the lid 212 that is configured to transition the device 200 between the open and closed configurations, in other embodiments, the device 200 can be devoid of the lid 212. For example, in some embodiments, each thermal container 220 can include its own lid.

The body portion 211 of the housing 210 includes one or more user interface portions 213. For example, in the embodiment shown in FIG. 3, the body portion 211 of the housing 210 includes five user interface portions 213, each of which is associated with, for example, a different thermal container 220 disposed within the housing 210, as described in further detail herein. The user interface portions 213 can include, for example, a display configured to present information about its associated thermal container 220 and/or the contents (e.g., food) contained therein. For example, in some embodiments, the display of a user interface portion 213 can be configured to graphically represent information associated with the planned meal the device 200 will cook with the food disposed in the associated thermal container 220. For example, in some instances, the display can graphically display text such as, "Monday-Dinner," or "Wednesday-Lunch," and/or any other suitable information. In some instance, the display of a user interface portion 213 can graphically represent nutritional facts about the food contained in its associated thermal container 220 such as, for example, calorie content, fat content, protein content, etc. In other instances, the display of a user interface portion 213 can graphically represent cooking progress or a status of one or more conditions of the associated thermal container 220 (e.g., estimated time to complete cooking, currently temperature, etc.). While specific examples of information graphically represented by the display of the user interface portion 213, the embodiments described herein are not meant to be limited by the specific examples listed. In other words, the specific examples of information graphically represented by the display of the user interface portions 213 are not intended to be an exclusive or exhaustive list of the information such displays can graphically represent.

Figure 4:
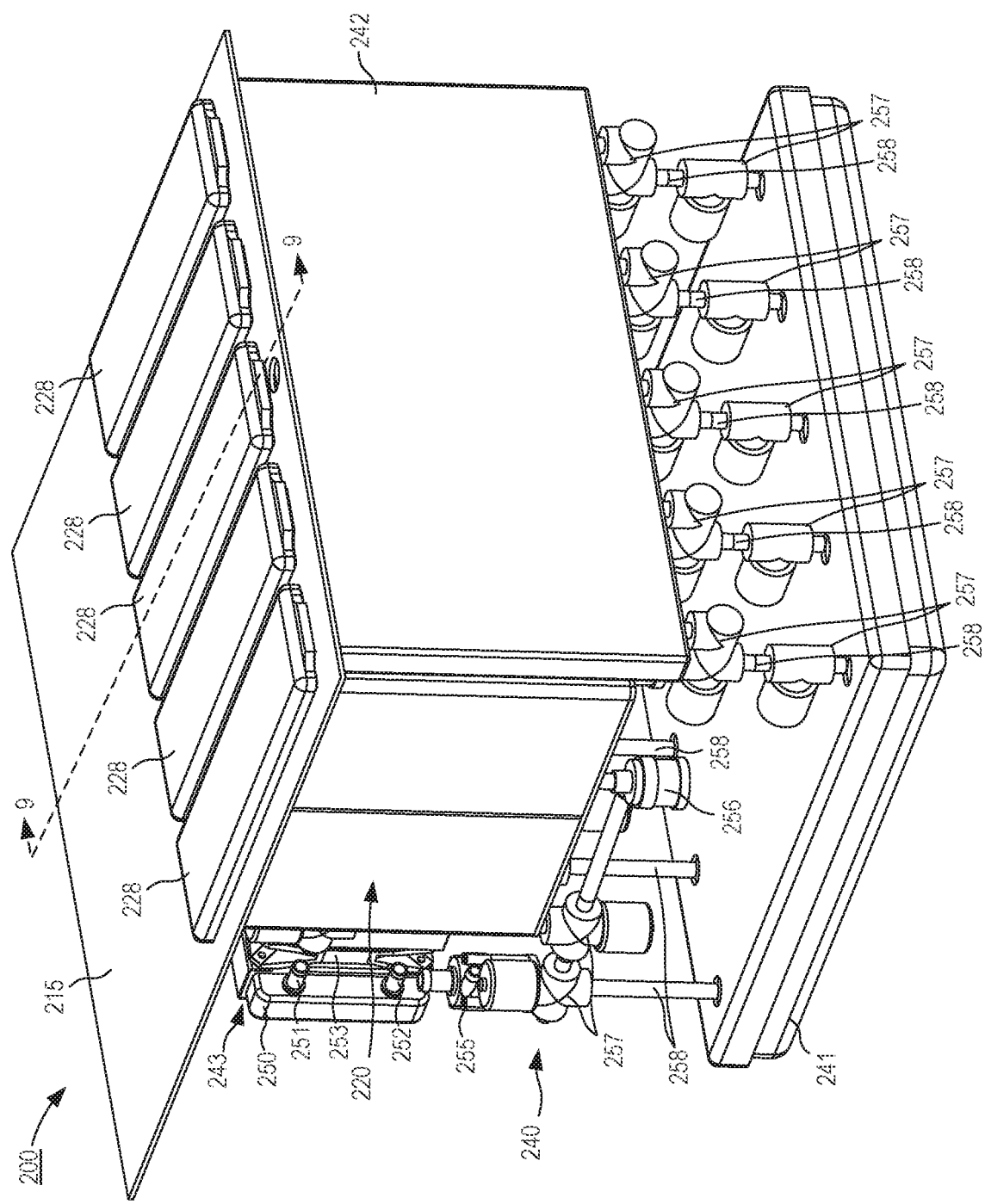
FIGS. 4 and 5 are a front perspective view of the semi-autonomous fluid-immersion cooking device of FIG. 3 shown without a portion of a housing in a first configuration and a second configuration, respectively.
Figure 5:
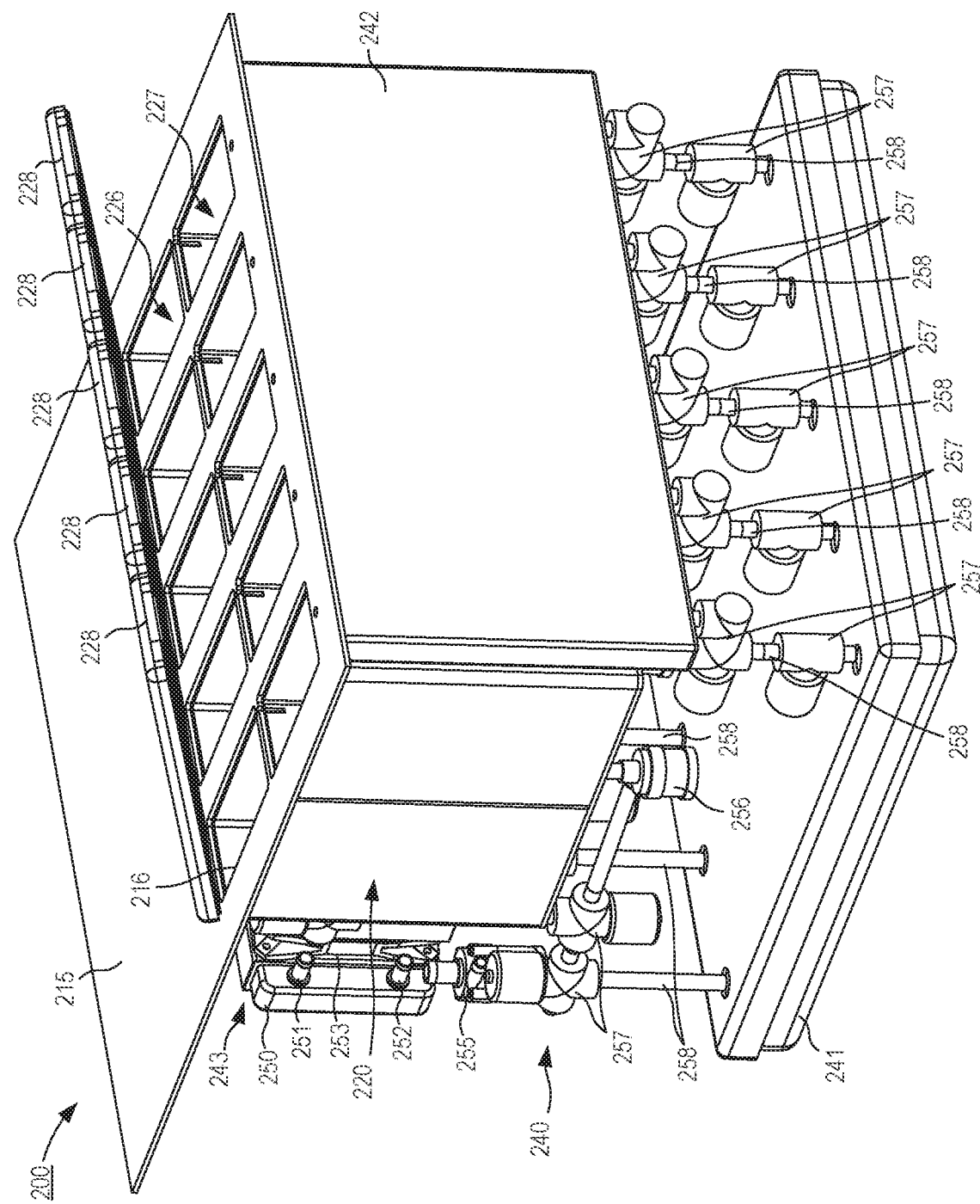

As described above, at least a portion of the set of thermal containers 220, at least a portion of the fluid circulation system 240, and at least a portion of the controller are configured to be disposed within the housing 210. Thus, FIGS. 4-10 illustrate portions of the device 200 without the housing 210. The thermal containers 220 of the device 200 can be any suitable shape, size, and/or configuration and configured to be coupled to a mounting plate 215 (e.g., via mechanical fasteners, adhesives, welding, ultrasonic welding, and/or the like). As shown in FIG. 5, the mounting plate 215 defines a set of openings 216 configured to provide access to the thermal container 220. As shown in FIGS. 4 and 5, the set of thermal containers 220 includes five thermal containers 220. In other embodiments, the device 200 can include any suitable number of thermal containers 220. Each thermal container 220 includes and/or is coupled to a lid 228, which can be transitioned between a first configuration (e.g., a closed configuration, as shown in FIG. 4) and a second configuration (e.g., an open configuration, as shown in FIG. 5). The lids 228 are each configured to fluidically isolate a volume defined by its associated thermal container 220 when in the first configuration (e.g., closed configuration). For example, the lids 228 can include a seal or the like that can form a substantially fluid tight seal with a surface of the mounting plate 215 when in the first configuration. Although not shown in FIGS. 3-10, the device 200 can include any other suitable lid or the like configured to selectively allow access to a portion of the device 200. For example, the device 200 can include one or more lids configured to allow a user to access one or more fluid reservoirs such as, for example, a steam reservoir 242 or the like included in the fluid circulation system 240 (see e.g., FIGS. 4 and 5).

The thermal container(s) 220 can be formed of and/or can include any suitable material(s) and/or combinations thereof. For example, in some embodiments, the thermal container(s) 220 can be formed of a metal such as aluminum, stainless steel, and/or the like. In such embodiments, the constituent material of the thermal container(s) 220 can have a relatively high thermal conductivity (e.g., between about 10 W/mk and about 250 W/mk, as described above). In other words, the thermal container(s) 220 can be formed of and/or can include materials that conduct heat such as metals (e.g., aluminum, stainless steel, and/or the like) and/or ceramics. While the thermal container(s) 220 are formed from a material having a relatively high thermal conductivity, a material or combination of materials having a relatively low thermal conductivity (e.g., between about 0.1 W/mk and about 1.8 W/mk, as described above) can be disposed about each thermal container 220 to insulate and/or at least partially thermally isolate a portion of the thermal container(s) 220 from other portions of the device 200 (e.g., other thermal containers 220, the housing 210, portions of the fluid circulation system 240, etc.) In other words, each thermal container 220 can include and/or can be at least partially surrounded by an insulating material such as, for example, polyurethane foam or foil, silicone, and/or the like (not shown in FIGS. 3-10). Thus, as described above with reference to the thermal container(s) 120, the insulating material can thermally isolate each thermal container 220 such that a temperature associated with each thermal container 220 can be independently controlled substantially without transferring thermal energy to, for example, adjacent thermal containers 220 or other portions of the device 200. Moreover, in some embodiments, the thermal container(s) 220 can include a surface finish and/or coating that can increase or decrease a thermal conductivity of the thermal container(s) 220. In other embodiments, at least an inner surface of the thermal container(s) 220 can include a non-stick finish or coating such as, for example, polytetrafluoroethylene (also known as PTFE or Teflon®).

In the embodiment illustrated in FIGS. 3-10, the thermal containers 220 are substantially similar and are uniformly distributed along the mounting plate 215 (FIG. 5). In other embodiments, a device can include a set of non-uniform thermal containers. For example, in some embodiments, a size and/or capacity of a first thermal container included in a device can be greater than a size and/or capacity of a second thermal container included in the device. In such embodiments, for example, the larger thermal container can be configured to store and/or cook multiple servings of food while the smaller thermal container can be configured to store and/or cook a single serving. In some embodiments, a portion of a thermal container configured to store and/or cook a meat and/or protein can be smaller than a portion of the thermal container configured to store and/or cook a starch, vegetable, etc. In such embodiments, by forming portions of the thermal container with different sizes, an overall size of the device 200 can be reduced. Moreover, in some embodiments, forming portions of the thermal container with different sizes can ensure a food package and/or container is disposed within the thermal container in a predetermined orientation or the like.

Figure 6:
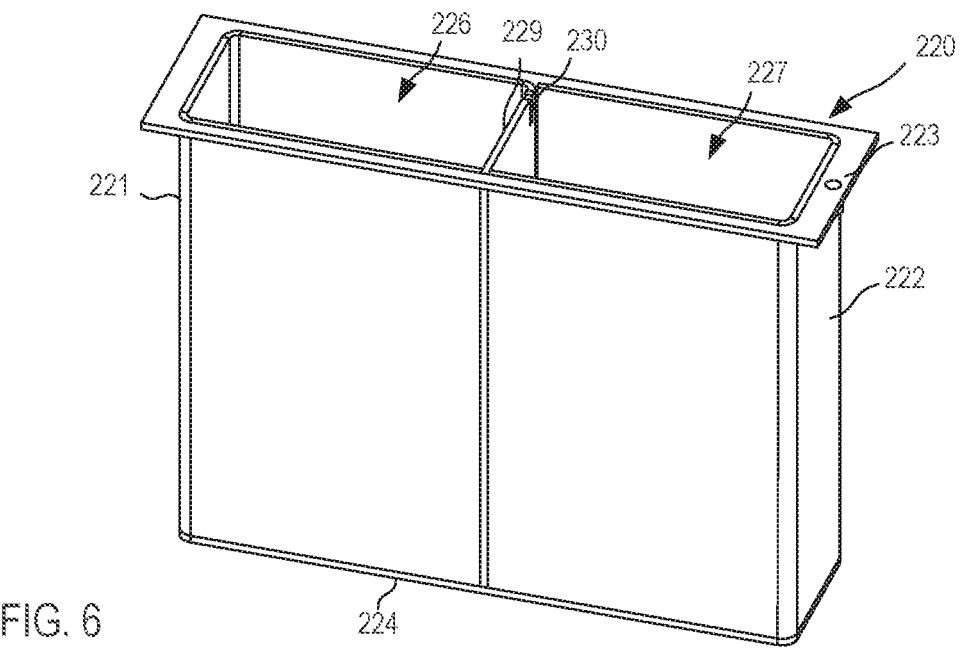
FIG. 6 is a perspective view of a thermal container included in the semi-autonomous fluid-immersion cooking device of FIG. 3.
Figure 7:
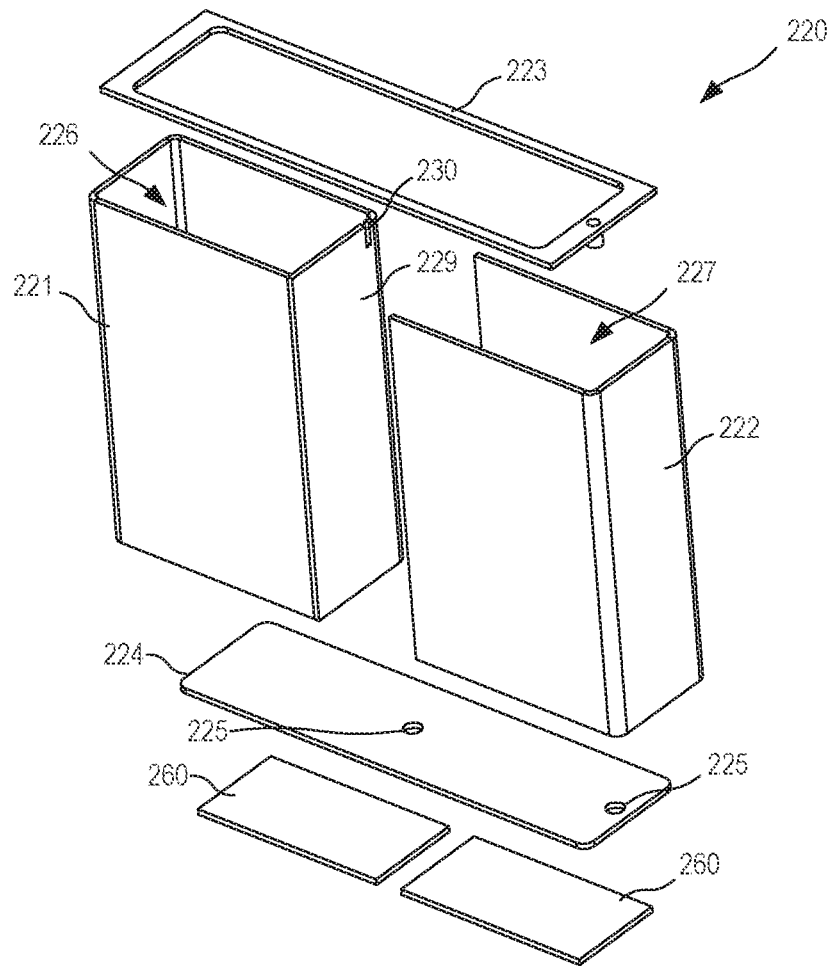
FIG. 7 is an exploded view of the thermal container of FIG. 6.
Figure 8:
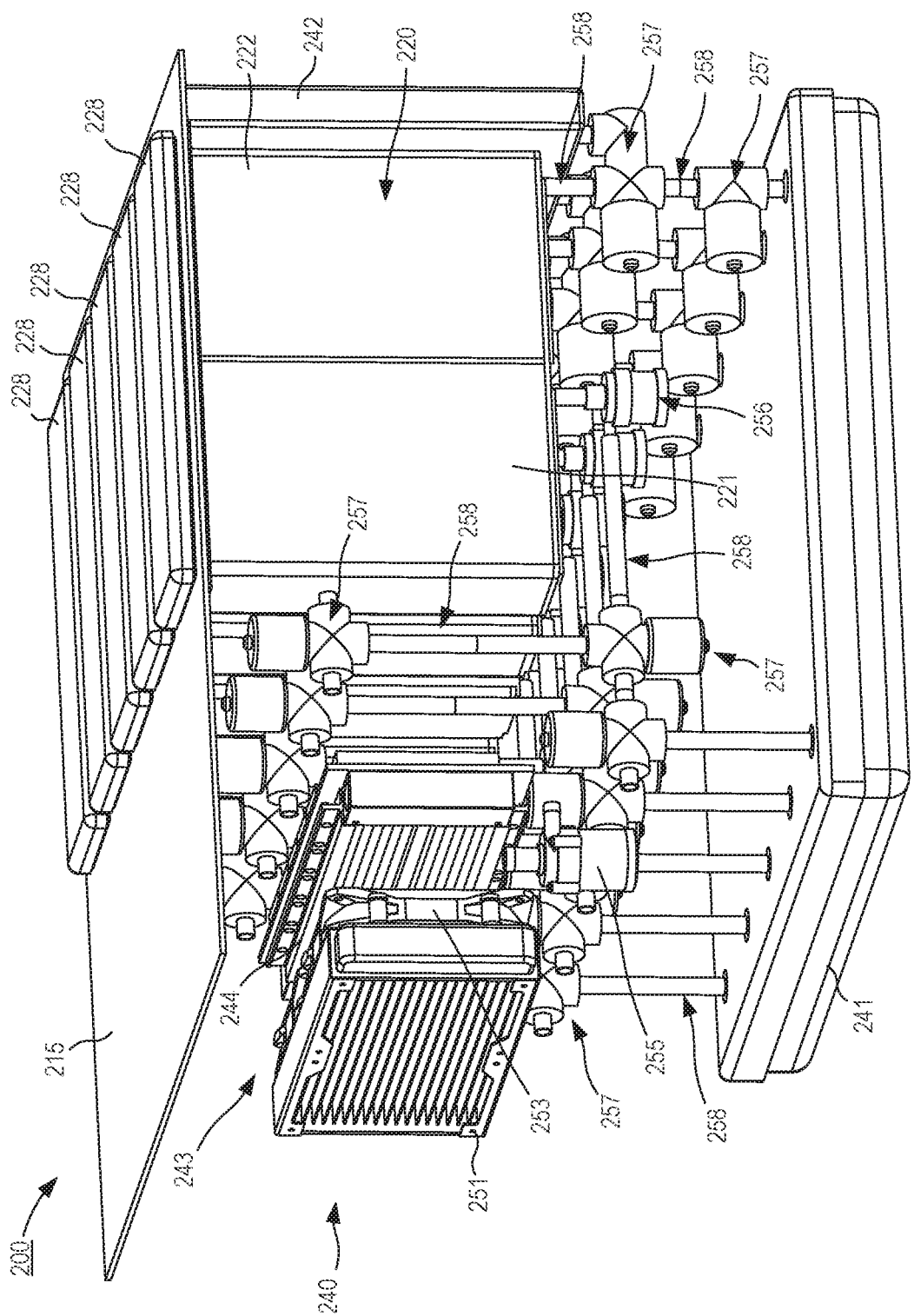
FIG. 8 is a rear perspective view of the semi-autonomous fluid-immersion cooking device of FIG. 3 in the first configuration.

As shown in FIGS. 6 and 7, each thermal container 220 includes a first portion 221, a second portion 222, a mounting flange 223, and a base plate 224. The mounting flange 223 can be configured to mount the thermal container 220 to the mounting plate 215 (see e.g., FIG. 10). The base plate 224 defines a set of openings 225 configured to allow a flow of fluid therethrough. More specifically, the base plate 224 defines a first opening 225 aligned and/or otherwise in fluid communication with the first portion 221 and a second opening 225 aligned and/or otherwise in fluid communication with the second portion 222. As such, the first and second opening 225 can place the first portion 221 and the second portion 222, respectively, in fluid communication with a portion fluid circulation assembly 240. In some embodiments, the openings 225 can also establish fluid communication between the first portion 221 and the second portion 222 of the thermal container 220. Although not shown in FIGS. 6 and 7, the first portion 221 and/or second portion 222 of the thermal container 220 can define any other suitable opening or the like configured to receive a flow of fluid therethrough, as described in further detail herein.

As shown in FIG. 7, each thermal container 220 also includes and/or is at least operatively coupled to a set of heating elements 260 configured to transfer thermal energy to portions of the thermal container 220. The heating elements 260 can be any suitable configuration such as, for example, radiant heating elements, induction heating elements, steam generator elements and/or the like. As shown in FIG. 7, the set of heating elements 260 includes, for example, two heating elements 260. The two heating elements 260 can be substantially similar or can be two different types of heating elements. In other embodiments, the thermal container 220 can include and/or can be at least operatively coupled to more or fewer heating elements 260. The heating elements 260 included in and/or operatively coupled to one thermal container 220 can be operated independent of the heating elements 260 included in and/or operatively coupled to the other thermal containers 220. In some embodiments, the device 200 can include a multi-zoned heating element or the like, in which each zone can be independently controlled. Thus, the device 200 can be configured to control a temperature of different volumes of fluid contained in each thermal container 220 independently by controlling an operating state of, for example, the heating elements 260 and the fluid circulation system 240, as described in further detail herein.

While the heating elements 260 described above with reference to FIG. 7 as being included in or at least operatively coupled to the thermal container 220, in other embodiments, the device 200 can include any suitable heat source and/or element disposed in any suitable position within the device 200. For example, in some embodiments, the heating elements 260 can be, for example, "inline" and/or "flow through" heating elements disposed at any suitable position along a fluid flow path (e.g., defined by the fluid circulation system 240). In other embodiments, the heating elements 260 can be a heat exchanger and/or otherwise included in a heat exchanger assembly. In some embodiments, the heating elements 260 can be disposed, for example, at or near a rear portion of the device 200 and/or otherwise separated from the thermal containers 220. In such embodiments, disposing the heating elements 260 at or near the rear of the device 200 in a position that is separate from the thermal containers 220 can reduce an amount of thermal insulation (not shown) otherwise used to insulate each thermal container 220 from the remaining thermal containers 220 and/or other portions of the device 200.

In some embodiments, the first portion 221 of the thermal container 220 and the second portion 222 of the thermal container 220 can be formed independently (e.g., via independent manufacturing processes) and can be coupled via welding, ultrasonic welding, an adhesive, and/or the like. Similarly, the mounting flange 223 and the base plate 224 can be formed independent of the first portion 221 and/or the second portion 222 and can be coupled thereto via welding, ultrasonic welding, an adhesive, and/or the like. In other embodiments, each thermal container 220 can be, for example, a monolithically constructed container formed via casting, injection molding, stamping (e.g., deep draw stamping), and/or the like. In still other embodiments, the set of thermal containers 220 can be a monolithically constructed set of containers.

As shown, the first portion 221 of the thermal container 220 defines a first volume 226 and the second portion 222 of the thermal container 220 defines a second volume 227. The arrangement of the thermal container 220 is such that the first volume 226 is fluidically isolated from the second volume 227. More specifically, the thermal container 220 includes an inner wall 229 configured to define a portion of the first volume 226 on a first side of the wall 229 and a portion of the second volume 227 on a second side of the wall 229. In some embodiments, the wall 229 can be configured to transfer thermal energy between the first volume 226 and the second volume 227. For example, in some embodiments, the wall 229 can be formed with and/or by a portion of the thermal container 220 and thus, can be formed of and/or can include substantially the same constituent material of the thermal container 220 (e.g., having a relatively high thermal conductivity, as described above). Thus, as a temperature within, for example, the first volume 226 is increased relative to the second volume 227, the temperature differential therebetween results in thermal energy being transferred from the relatively hotter side of the wall 229 to the relatively cooler side of the wall 229, thereby transferring thermal energy from the first volume 226 and the second volume 227 (or vice versa). In other embodiments, the wall 229 can be formed of and/or from any suitable material or combination of materials configured to selectively control thermal energy transfer therethrough.

In some embodiments, the first volume 226 of the thermal container 220 and the second volume 227 of the thermal container 220 can be configured to store and/or cook different types of food. For example, the first volume 226 can be configured to receive a first kind of food such as, for example, meats and/or other proteins, and the second volume 227 can be configured to receive a second kind of food such as, for example, vegetables, starches, carbohydrates, and/or the like. As such, in some embodiments, the thermal container 220 can be configured to receive the food items in a predetermined arrangement and/or orientation. For example, the food items configured to be disposed in the thermal container 220 can be contained within a fluid tight package and/or a cartridge having a predetermined size, shape, and/or configuration. As shown in FIGS. 6 and 7, the wall 229 defines an alignment notch 230 at a predetermined position along an edge of the wall 229 that is configured to receive and/or engage a portion of the package and/or cartridge, thereby aligning the package and/or cartridge within the thermal container 220. In some embodiments, an inner surface of the thermal container 220 can include one or more rails, guides, protrusions, grooves, tracks, channels, and/or the like (not shown) configured to engage and/or otherwise guide at least a portion of the package or cartridge as it is inserted into the thermal container 220. In such embodiments, the alignment notch 230 and the rails, guides, grooves, etc. can collectively engage a portion of the package and/or cartridge such that the package and/or cartridge is positioned within the thermal container 220 in a predetermined orientation (e.g., in only one orientation and/or configuration). Thus, the arrangement of the first portion 221 and the second portion 222 can be at least partially based on desirable storage and/or cooking conditions associated with the first kind of food and the second kind of food, respectively.

For example, in some embodiments, the first portion 221 and the second portion 222 can each be associated with a different heating element 260. In some embodiments, for example, the heating element 260 associated with and/or at least operatively coupled to the first portion 221 of the thermal container 220 can be a radiant heating element, while the heating element 260 associated with and/or at least operatively coupled to the second portion 222 of the thermal container 220 can be a steam generating heating element. Thus, as described in further detail herein, the heating element 260 associated with the first portion 221 can be configured to heat a volume of fluid disposed within the first volume 226 to cook, for example, the meat and/or other proteins, and the heating element 260 associated with the second portion 222 can be configured to generate a volume of steamed vapor within the second volume 227 to cook, for example, the vegetables, starches, carbohydrates, and/or the like.

When, for example, the device 200 is storing the food in the thermal container 220 prior to cooking, the arrangement of the first portion 221 and the second portion 222 can be such that a cooled volume of fluid is circulated through at least the first volume 226, which in turn, can maintain the first volume 226 below a temperature threshold. Conversely, with the second volume 227 configured to receive, for example, vegetables, it may be undesirable to expose the vegetables to and/or submerge the vegetables in a relatively cold volume of fluid. As such, the arrangement of the wall 229 can be such that thermal energy from the second volume 227 is carried through the wall 229 and at least a portion of the thermal energy is removed from a surface of the wall 229 as the relative cooler flow of fluid flows relative thereto. In other words, the wall 229 or at least a portion thereof can form and/or can otherwise act as a heat exchanger configured to transfer thermal energy from the second volume 227 to the first volume 226 when the device 200 is storing the food prior to cooking. As such, the first volume 226 of the thermal container 220 and the second volume 227 of the thermal container 220 can be maintained at a predetermined temperature that is sufficiently cold to store (e.g., refrigerate) the food contained therein prior to cooking.

The fluid circulation system 240 of the device 200 can be any suitable shape, size, and/or configuration. The fluid circulation system 240 is configured to circulate a fluid (e.g., water) through a portion of the device 200 and to regulate a temperature of the fluid as it flows therethrough. As shown, for example, in FIGS. 8-10, the fluid circulation system 240 includes a drain reservoir 241, a steam reservoir 242, a chiller assembly 243 (having a first heat exchanger 245, a second heat exchanger 250, and a heat exchanger pump 255), a set of circulation pumps 256 (e.g., one or more per thermal container 220), a set of valves 257, and a set of fluid conduits 258. Although not shown in FIGS. 3-10, the controller, and/or one or more processors included therein, can be configured to execute a set of instructions or code associated with controlling the fluid circulation system 240. For example, the controller can perform and/or execute processes associated with transitioning one or more valves 257 from an open configuration to a closed configuration (or vice versa), increasing or decreasing a flow rate through the heat exchanger pump 255 and/or the set of circulation pumps 256, and/or the like. As described above with reference to the controller 170, in some instances, the controller can control at least a portion of the fluid circulation system 240 based on signals (and/or data contained therein) from any number of sensors, encoders, thermometers, thermistors, fill indicators, etc. In other instances, the controller can control at least a portion of the fluid circulation system 240 based on data associated with a local or remote user input, as described in further detail herein.

The fluid circulation system 240 is configured to define a fluid flow path between the drain reservoir 241, the steam reservoir 242, and the chiller assembly 243 and each thermal container 220. In some embodiments, the fluid circulation system 240 also defines a fluid flow path between each thermal container 220 and a heat source such as an inline heater or the like. In the embodiment shown in FIGS. 3-10, the fluid circulation system 240 defines an independent fluid flow path associated with each thermal container 220. Said another way, while in fluid communication with the same drain reservoir 241 and/or the same steam reservoir 242, the fluid flow path for each thermal container 220 is otherwise fluidically isolated from the remaining fluid flow paths defined by the fluid circulation system 240. As such, the device 200 can independently control a temperature associated with each thermal container 220.

An example of one or more fluid flow paths for one thermal container 220 is described below with reference to FIG. 9. While described for a given thermal container 220, it should be understood that similar fluid flow paths can be defined for each thermal container 220 included in the device 200 and, therefore, that a temperature associated with each thermal container 220 can be independently controlled. As shown, a first fluid conduit 258A is in fluid communication with the first volume 226 defined by the thermal container 220 via the opening 225 defined by the base plate 224. The first fluid conduit 258A places the first volume 226 in fluid communication with the circulation pump 256. Although not shown in FIG. 9, in some embodiments, the fluid circulation system 240 can include a valve, solenoid, and/or the like configured to selectively occlude and/or close the opening 225 defined by the base plate 224 to fluidically isolate the first volume 226 from the circulation pump 256.

The circulation pump 256 is in fluid communication with a first valve 257A via a second fluid conduit 258B. The first valve 257A, in turn, is in fluid communication with a second valve 257B via a third fluid conduit 258C and a third valve 257C via a fourth fluid conduit 258D. In this manner, the first valve 257A is configured to selectively establish fluid communication between the circulation pump 256 and the second valve 257B (e.g., via the first valve 257A, the second fluid conduit 258B, and the third fluid conduit 258C) or the third valve 257C (e.g., via the first valve 257A, the second fluid conduit 258B, and the fourth fluid conduit 258D). The second valve 257B is in fluid communication with the chiller assembly 243 via a fifth fluid conduit 258E and the drain reservoir 241 via a sixth fluid conduit 258F. The third valve 257C is in fluid communication with the first valve 257A via the fourth fluid conduit 258D (as described above), the chiller assembly 243 via a seventh fluid conduit 258F, and the first volume 226 of the thermal container 220 via an eighth fluid conduit 258H. Although not shown in FIG. 9, in some embodiments, the thermal container 220 can include an inlet port or the like that can have a valve, solenoid, and/or the like configured to selectively place the eighth fluid conduit 258H in fluid communication with the first volume 226. In other embodiments, the eighth fluid conduit 258H can include and/or can form a check valve or the like.

While described above as defining the fluid flow paths within which fluid can flow to circulate through, for example, the first volume 226 of the thermal container 220, the fluid circulation system 240 defines one or more fluid flow paths configured to circulate fluid through the second volume 227 of the thermal container 220. For example, as shown in FIG. 9, a ninth fluid conduit 258J is in fluid communication with the second volume 227 defined by the thermal container 220 via the opening 225 defined by the base plate 224. The ninth fluid conduit 258J places the second volume 227 in fluid communication with a fourth valve 258. Although not shown in FIG. 9, in some embodiments, the fluid circulation system 240 can include a valve, solenoid, and/or the like configured to selectively occlude and/or close the opening 225 defined by the base plate 224 to fluidically isolate the second volume 227 from the fourth valve 258D. The fourth valve 257D is in fluid communication with the steam reservoir 242 via a tenth fluid conduit 258K and a fifth valve 257E via an eleventh fluid conduit 258L. The fifth valve 257E is in fluid communication with the drain reservoir 241 via a twelfth fluid conduit 258M. This arrangement of the fluid flow paths between the drain reservoir 241, the steam reservoir 242, the chiller assembly 243, and the thermal container 220 allows the device 200 to selectively and/or independently control the fluid flow and/or temperature associated with the first portion 221 of the thermal container 220 and the second portion 222 of the thermal container 220, as described in further detail herein.

Figure 10:
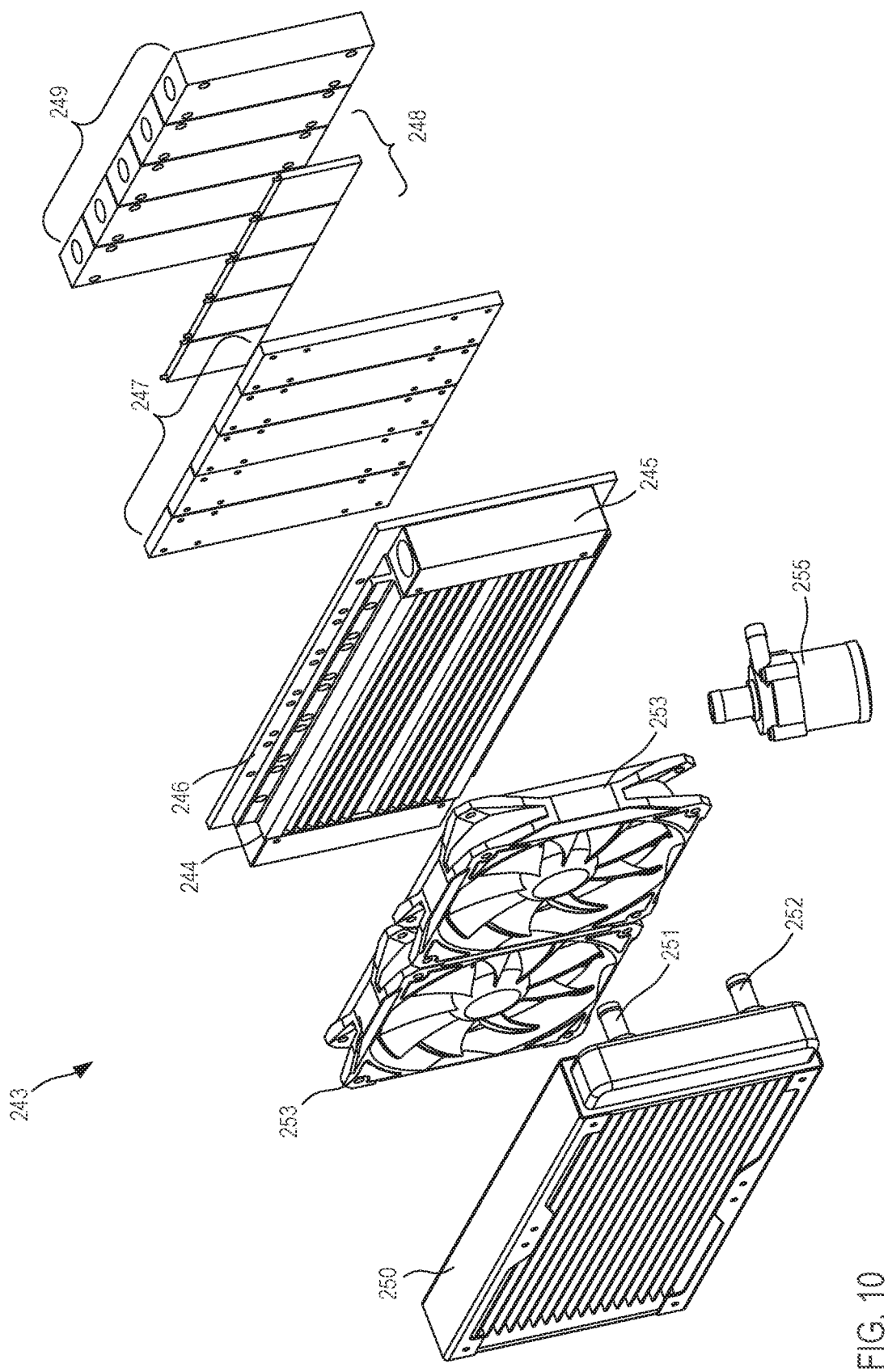
FIG. 10 is an exploded view of a portion of a fluid circulation system included in the semi-autonomous fluid-immersion cooking device of FIG. 3.

As described above, the chiller assembly 243 is configured to cool a fluid flowing into and/or through the first volume 226 of the thermal container 220. The chiller assembly 243 can be any suitable arrangement and/or configuration. For example, as shown in FIG. 10, the first heat exchanger 244 of the chiller assembly 243 can be a shell and tube heat exchanger or the like having a manifold 245, a cold plate 246, a set of mounting blocks 247, a set of thermoelectric chillers 248 (e.g., Peltier coolers and/or any other suitable thermoelectric cooler), and a set of cold sinks 249. The mounting blocks 247 are configured to be coupled to the cold sinks 249 such that the second of thermoelectric chillers 248 are disposed therebetween. The mounting blocks 247 are also coupled to the cold plate 246, which in turn, is coupled to the first heat exchanger 244. In this manner, the controller, for example, can send a flow of electric current and/or can cause a flow electric current to be sent to the thermoelectric chillers 248 can result in thermal energy being transferred from a first side (e.g., a cold side) of the thermoelectric chillers 248 in contact with the cold sinks 249 to a second side (e.g., a hot side) of the thermoelectric chillers 248 in contact with the mounting blocks 247. In addition, the first heat exchanger 244 can receive a flow of cooled working fluid that can, for example, remove thermal energy from the cold plate 246. Thus, with the cold plate in contact with the first heat exchanger 244 and the mounting blocks 247, thermal energy can be transferred from the cold sinks 249 to the working fluid of the first heat exchanger 244, as described in further detail herein.

The second heat exchanger 250 is a shell and tube heat exchanger or the like having an inlet 251 and an outlet 252 and being coupled to one or more fans 253. Although not shown in FIG. 10, the heat exchangers 244 and 250 are each fluidically coupled to the heat exchanger pump 255 via a fluid conduit or the like. For example, a first fluid conduit can fluidically couple an outlet 252 of the second heat exchanger 250 to an inlet of the manifold 245 of the first heat exchanger 244; a second fluid conduit can fluidically couple the outlet of the manifold 245 of the first heat exchanger 244 to the heat exchanger pump 255; and a third fluid conduit can fluidically couple the heat exchanger pump 255 to the inlet 251 of the second heat exchanger 250. In this manner, the heat exchanger pump 255 can be configured to circulate a working fluid (e.g., a coolant such as haloalkane coolant like R-134a, a water-based glycol mixture, betaine, and/or the like) through the first heat exchanger 244 and the second heat exchanger 250 to cool and/or otherwise remove heat from the fluid circulating through the device 200. In some embodiments, by fluidically coupling the pump between the outlet of the first heat exchanger 244 and the inlet 251 of the second heat exchanger 250 is such that heat resulting from work done by the pump is transferred to the working fluid after the flow of working fluid exits the first heat exchanger 244. While the pump 255 is particularly described above and shown, for example, in FIGS. 8-10, in other embodiments, the pump 255 can be any suitable configuration. For example, in some embodiments, a pump can include a built-in reservoir or the like.

Expanding further, cold working fluid can exit the outlet 252 of the second heat exchanger 250 and flow into the manifold 246 of the first heat exchanger 244. As the working fluid flows through the first heat exchanger 244, it removes heat from the cold plate 246. Thus, the cold plate 246 is cooled, chilled, and/or otherwise is associated with a low thermal energy. With the cold plate 246 being cooled by the working fluid, the cold plate 246 can have a thermal energy that is less than a thermal energy of the mounting plates 247 and the hot side of the thermoelectric chillers 248 (as described above). Similarly, the fluid flowing from the thermal container 220 through the cold sinks 249 of the chiller assembly 243 has a temperature and/or an amount of thermal energy that is greater than a thermal energy of the cold side of the thermoelectric chillers 248. Therefore, the working fluid (e.g., coolant) flowing through the first heat exchanger 244 removes thermal energy from the fluid (e.g., water) flowing through the cold sinks 249, which can then flow from the first heat exchanger 244 and into the inner volume 226 defined by first portion 221 of the thermal container 220 with a temperature that is colder than, for example, a temperature of fluid flowing from the first volume 226 into the circulation pump 256 via the first fluid conduit 258A.

The heated working fluid (e.g., coolant) can flow from the first heat exchanger 244 to the heat exchanger pump 255, which in turn, pumps the working fluid into the inlet 251 of the second heat exchanger 250. The working fluid flowing through the second heat exchanger 250 can reject heat and/or otherwise can be cooled via a flow of air generated by the one or more fans 253 along a portion of the second heat exchanger 250 (e.g., an outer surface). As such, the working fluid can be "recharged" (i.e., cooled) and can exit the second heat exchanger 250 via the outlet 252 and can flow into the inlet of the first heat exchanger 244. In this manner, when the device 200 and/or at least a portion thereof is in a storage configuration, fluid can flow from the fluid reservoir 241, through the cold sinks 249 where the fluid is cooled, and into the first volume 226 of the thermal container 220.

Figure 9:
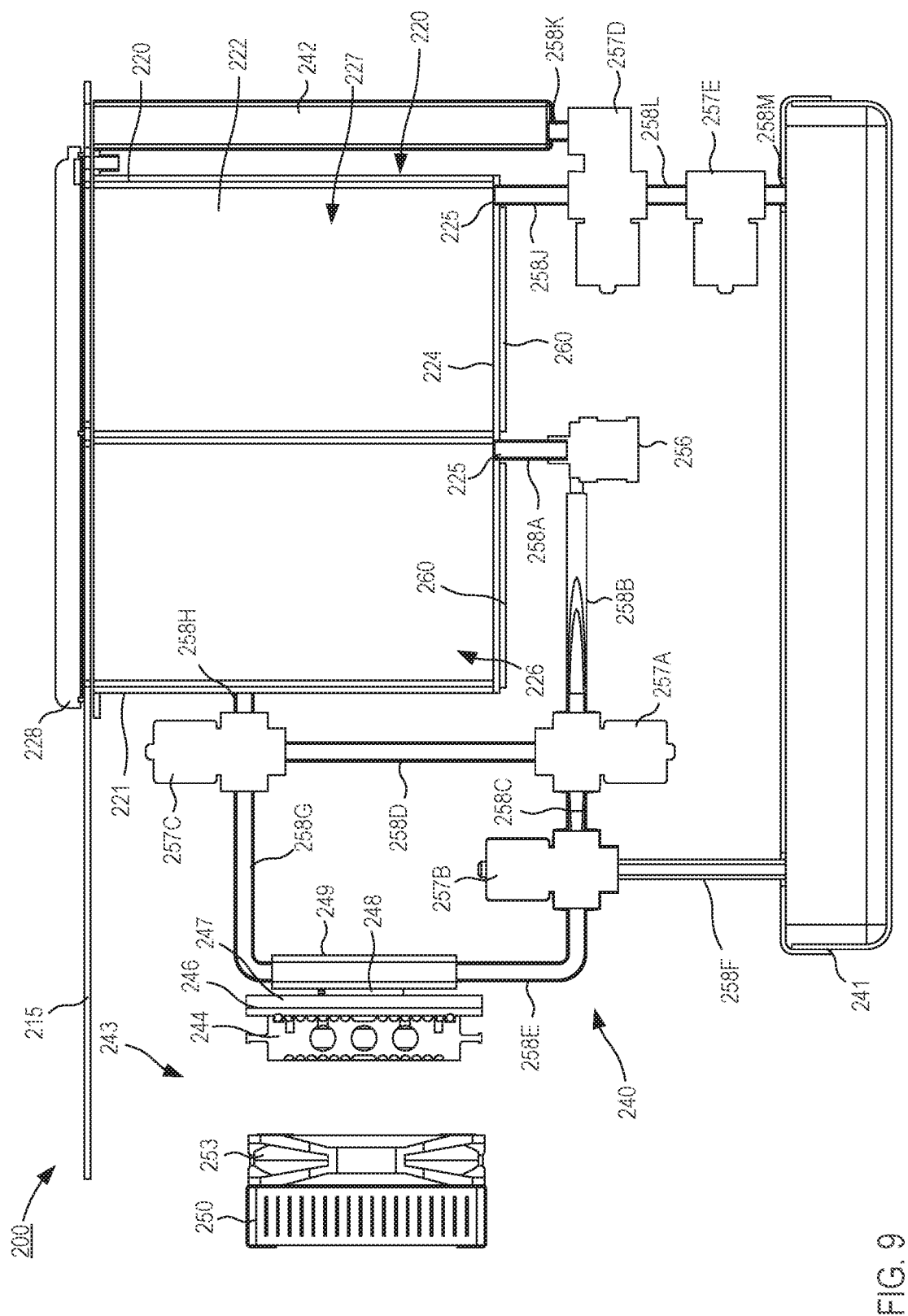
FIG. 9 is a cross-sectional view of the semi-autonomous fluid-immersion cooking device of FIG. 3, taken along the line 9-9 in FIG. 4.

For example, the controller can perform one or more processes to place at least a portion of the device 200 in a storage configuration (e.g., a storage configuration associated with thermal container 220 shown in FIG. 9). Specifically, the controller can send a signal to the circulation pump 256 that results in the circulation pump 256 drawing fluid from the inner volume 226 via the first fluid conduit 258A and into the first valve 257A via the second fluid conduit 258. The controller can also send a signal to the first valve 257A, the second valve 257B, and the third valve 257C that places each of the valves 257A, 257B, and 257C in a first configuration such that the first valve 257A places the third fluid conduit 258C in fluid communication with the second fluid conduit 258B; the second valve 257B places the fifth fluid conduit 258E (and thus, the cold sink 249) in fluid communication with the third fluid conduit 258C; and the third valve 257C places the eighth fluid conduit 258H (and thus, the first volume 226 of the thermal container 220) in fluid communication with the seventh fluid conduit 258G (and thus, the cold sink 249). Thus, when the controller places the device 200 in the storage configuration associated with, for example, the thermal container 220 shown in FIG. 9, the associated portion of the fluid circulation system 240 can circulate the cooled or cold fluid through the first portion 221 of the thermal container 220, thereby maintaining the food contained in the first portion 221 at a desired storage temperature. For example, in some embodiments, the fluid can be configured to maintain a temperature within the first volume 226 of the thermal container 220 at or about 40° F. Moreover, the controller can receive one or more signals from any suitable sensor, thermistor, etc. and based on data included therein can actively control at least a portion of the fluid circulation system 240 to increase or decrease a temperature associated with a volume of the fluid.

In addition, with the device 200 in such a storage configuration, the controller can place the fourth valve 257D and/or the fifth valve 257E in a first configuration to fluidically isolate the second volume 227 of the thermal container 220 from the steam reservoir 242. For example, in some instances, the second volume 227 can be substantially devoid of fluid. As described above, however, the wall 229 of the thermal container 220 is configured to transfer thermal energy between the first portion 221 and the second portion 222 of the thermal container 220. Therefore, the cool and/or cold fluid circulating through the inner volume 226 of the first portion 221 can remove a portion of the thermal energy from the wall 229 (e.g., cools the wall 229). As a result, a temperature within the second volume 227 of the thermal container 220 is controlled and/or otherwise maintained at or below a given temperature. In some instances, a temperature of the first volume 226 can be associated with a desired temperature for storing, for example, meat and/or protein, while a temperature of the second volume 227 can be associated with a desired temperature (substantially equal to the temperature associated with the first portion 221 or greater than the temperature associated with the first portion 221) for storing, for example, vegetables, starches, carbohydrates, and/or the like. Moreover, in some instances, placing the fourth valve 257D and/or the fifth valve 257E in the first configuration can establish fluid communication between the second volume 227 of the thermal container 220 and the drain reservoir 241 such that condensed fluid and/or the like can be drained from the second volume 227 into the drain reservoir 241. In other embodiments, the fourth valve 257D can fluidically isolate the second volume 227 from the fifth valve 257E and thus, the drain volume 241.

While the controller is described above as placing the thermal container 220 in a storage configuration (e.g., a refrigeration configuration), the controller can perform one or more processes to place at least the portion of the device 200 in a cooking configuration and/or mode (e.g., a cooking configuration associated with the thermal container 220 shown in FIG. 9). For example, in some embodiments, the controller can place the first valve 257A, the second valve 257B, and the third valve 257C in a second configuration to transition the fluid circulation system 240 from a refrigeration configuration associated with the thermal container 220 to a cooking configuration associated with the thermal container 220. As such, the first valve 257A fluidically isolates the third fluid conduit 258C from the second fluid conduit 258B and, instead, places the fourth fluid conduit 258D in fluid communication with the second fluid conduit 258B. The second valve 257B, for example, can be closed or the like when in the second configuration such that at least the fifth fluid conduit 258E (and thus, the cold sink 249) is fluidically isolated from the third fluid conduit 258C. The third valve 257C, for example, fluidically isolates the seventh fluid conduit 258G (and thus, the cold sink 249) from the fourth fluid conduit 258D and the eighth fluid conduit 258H and, instead, places the fourth fluid conduit 258D in fluid communication with the eighth fluid conduit 258H (and thus, the first volume 226 of the thermal container 220). Therefore, the controller can place the fluid circulation system 240 in a configuration in which the fluid flows through the circulating pump 256, the first and third valves 257B and 257C, and the first, second, fourth, and eighth fluid conduits 258A, 258B, 258D, and 258H. In other words, the fluid can flow in a substantially closed flow path that is fluidically isolated from the chiller assembly 243.

In other embodiments, the controller can place the circulation pump 256 in, for example, a "powered off" state in which the circulation pump 256 does not pump fluid therethrough. In such embodiments, the fluid within the first volume 226 of the thermal container 220 can be in a state of equilibrium such that the fluid is not substantially flowing through the portion of the fluid circulation system 240.

With the first volume 226 of the thermal container 220 fluidically isolated from the chiller assembly 243 (e.g., a cooling source), the controller can place the heating elements 260 in a "powered on" state. For example, in some embodiments, the controller can send a signal to a power source or the like, which in turn, can deliver electric current to the heating elements 260. The electric current delivered to the heating elements 260 results in an increase in thermal energy associated with the heating elements 260. In other words, the heating elements 260 are powered on to produce, generate, radiate, and/or otherwise output heat. Thus, with the heating elements 260 at least operatively or thermally coupled to the thermal container 220 (see e.g., FIGS. 7 and 9), at least a portion of the thermal energy produced by the heating elements 260 heats the volume of fluid within the first volume 226 of the thermal container 220. Therefore, with the food contained in the package and/or cartridge and disposed in the thermal container 220 such that the food is submerged in the volume of fluid, the device 200 can cook the food in a sous-vide manner (e.g., via fluid-immersion cooking). In some instances, by maintaining the heating element 260 and the volume of fluid within the thermal container 220 in thermal equilibrium (substantially), the volume of fluid transfers a portion of the thermal energy to the food submerged therein until, for example, the volume of fluid and the food reach a state of thermal equilibrium (substantially). As described above, while the heating elements 260 are shown, for example, as being coupled to the thermal container 220, in other embodiments, the device 200 can include a heating element that is, for example, "inline" and/or otherwise separated from the thermal container 220. For example, in some embodiments, the device 200 can include an inline heat source within the fourth fluid conduit 258D and/or otherwise fluidically coupled between the first valve 257A and the third valve 257C. As such, the inline heat source can heat the flow of fluid at it flows from the first valve 257A to the third valve 257C.

In addition, the controller can place the fourth valve 257D in a second configuration. As such, the fourth valve 257D can establish fluid communication between the steam reservoir 242 and the second volume 227 via the fourth valve 257D and the ninth and tenth fluid conduits 258J and 258K. Moreover, the fourth valve 257D can fluidically isolate the eleventh fluid conduit 258L from the ninth and tenth fluid conduits 258J and 258K. Therefore, when the heating element 260 associated with the second portion 222 of the thermal container 220 (e.g., a steam generator or the like) is in the powered on state, steam can flow from the steam reservoir 242 into the second volume 227. Therefore, the controller can be configured to control a temperature of the fluid and/or vapor within the first volume 226 and the second volume 227, respectively. In some instances, a temperature of the fluid within the first volume 226 can be associated with a desired temperature for cooking, for example, meat and/or protein disposed therein, while a temperature of the vapor within the second volume 227 can be associated with a desired temperature for cooking and/or steaming, for example, vegetables, starches, carbohydrates, and/or the like. Moreover, with the fluid flow path associated with the thermal container 220 shown, for example, in FIG. 9 being fluidically isolated from the chiller assembly 243 and with the thermal container 220 being, for example, thermally isolated from the other thermal containers 220 (see e.g., FIGS. 4, 5, and 8), the food within the thermal container 220 described with reference to FIG. 9 can be cooked while food in the other thermal containers 220 can be, for example, stored at a lower temperature such as, for example, a refrigeration temperature. In other embodiments, any suitable combination of the thermal containers 220 can in the storage configuration or the cooking configuration.

In some embodiments, the controller can be configured to place the device 200 in, for example, a hold configuration after the device 200 has cooked food contained therein. For example, in some embodiments, after the device 200 has cooked a desired amount of food in one or more thermal containers 220, the controller can be configured to reduce an amount of thermal energy transferred from the heating elements 260 to the flow of the fluid. In turn, a temperature of the fluid flowing through at least the first portion 221 of the one or more thermal containers 220 can be reduced to a desired "hold" temperature or the like. For example, in some embodiments, the device 200 can be configured to cook food within the one or more thermal containers 220 at about 170° F. and/or any other suitable cooking temperature and once completed, can reduce the temperature of the fluid (i.e., by reducing the amount of thermal energy released from the heating elements 260) to about 140° F. and/or any other suitable hold temperature. Thus, the food can be maintained at a safe temperature after the food is cooked until the user is ready to eat the cooked food.

In some embodiments, the controller can be configured to place the device 200 in, for example, a drain configuration after the device 200 has cooked food contained therein. For example, in some embodiments, the controller can place the first valve 257A in the first configuration such that the third fluid conduit 258C is in fluid communication with the second fluid conduit 258B while the fourth fluid conduit 258D is fluidically isolating the fourth fluid conduit 258D. The controller can place the second valve 257B in a third configuration such that the sixth fluid conduit 258F is in fluid communication with the third fluid conduit 258C while fluidically isolating the fifth fluid conduit 258E. Thus, fluid can flow from the first volume 226 and into the drain reservoir 241. Similarly, the controller can place the fourth valve 257D in a third configuration in which the eleventh fluid conduit 257L is in fluid communication with the ninth fluid conduit 257J while the tenth fluid conduit 258K is fluidically isolated, and the fifth valve 257E in a second configuration in which the twelfth fluid conduit 258M is in fluid communication with the eleventh fluid conduit 258L. As such, fluid can flow from the second volume 227 and into the drain reservoir 241. In this manner, the cooked food can be disposed in the thermal container 220 but is no longer submerged in the fluid.

As described with reference to the device 100 of FIGS. 1 and 2, the controller can at least semi-autonomously control the device 200 to store and/or cook the food contained therein. For example, in some instances, food disposed in a package or cartridge (not shown in FIGS. 3-10) can be positioned within a thermal container 220 such that a meat and/or protein portion of the meal is disposed in the first volume 226 and a vegetable and starch portion of the meal is disposed in the second volume 227. In some instances, the device 200 can include an optical scanner, a RFID radio, and NFC radio, and/or the like configured to receive data associated with the meal contained in the package or cartridge. For example, in some embodiments, the package can include a barcode or RFID tag containing identifying information associated with the meal. As such, the controller can receive the identifying information and can, for example, query a database and/or communicate with a device via a network to associate the identifying information with, for example, storing a cooking instructions and/or information. In this manner, the controller can control any suitable portion of the device 200, as described above, to place any of the thermal containers 220 in a storage configuration having a storage temperature based on the information associated with the food contained therein or in a cooking configuration having a cooking temperature based on the information associated with the food contained therein.

In some instances, the controller can perform and/or execute one or more processes associated with cooking food disposed in the thermal container 220 based on one or more local or remote user inputs, preferences, settings, etc. e volume of fluid in a state of thermal equilibrium (substantially). For example, as described above with reference to the controller 170, the controller in this embodiment includes a memory configured to receive and/or store information and/or instructions that are executed by one or more processors. The controller can receive data, information, and/or instructions from any suitable source such as, for example, the user interfaces 213 included in the housing 210 (FIG. 3), a remote controller, a mobile device, a smartphone, a tablet, a laptop, a personal (PC), and/or the like. For example, a user can use a mobile application and/or PC application to remotely control the device 200, for example, to establish a target time at which food should be completely cooked and ready for consumption, to override a pre-programmed process, to turn on or off the device 200 (e.g., place in a "powered on" state or a "powered off" state, respectively), and/or to control any other suitable function of the controller and/or device 200. Thus, based on such user inputs, data, information, and/or instructions, the device 200 can be configured to at least semi-autonomously store and cook food contained therein.

Figure 13:
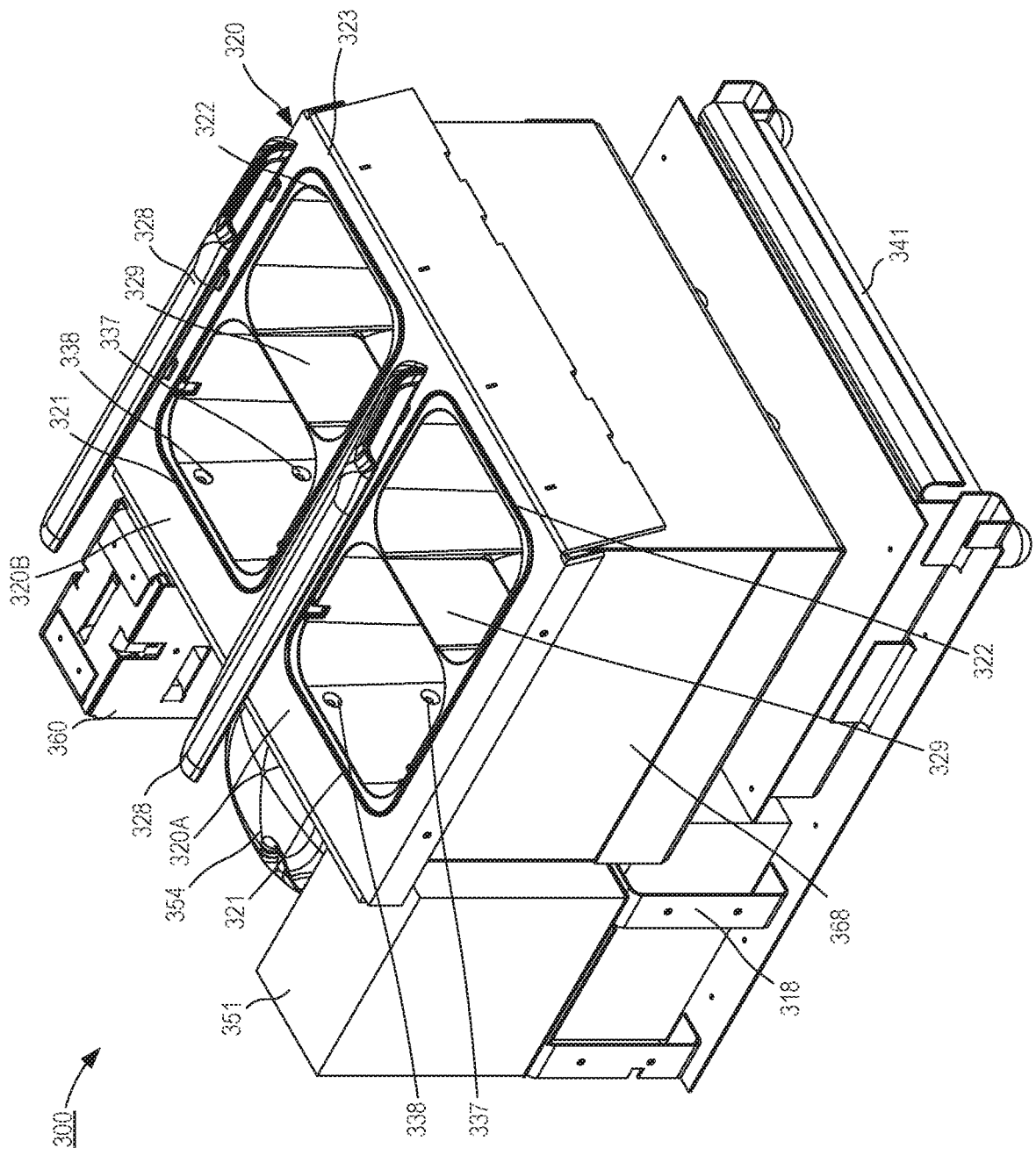
FIG. 13 is a front perspective view of the semi-autonomous fluid-immersion cooking device of FIG. 11 shown without portions of the housing, a controller, and/or a support structure.
Figure 14:
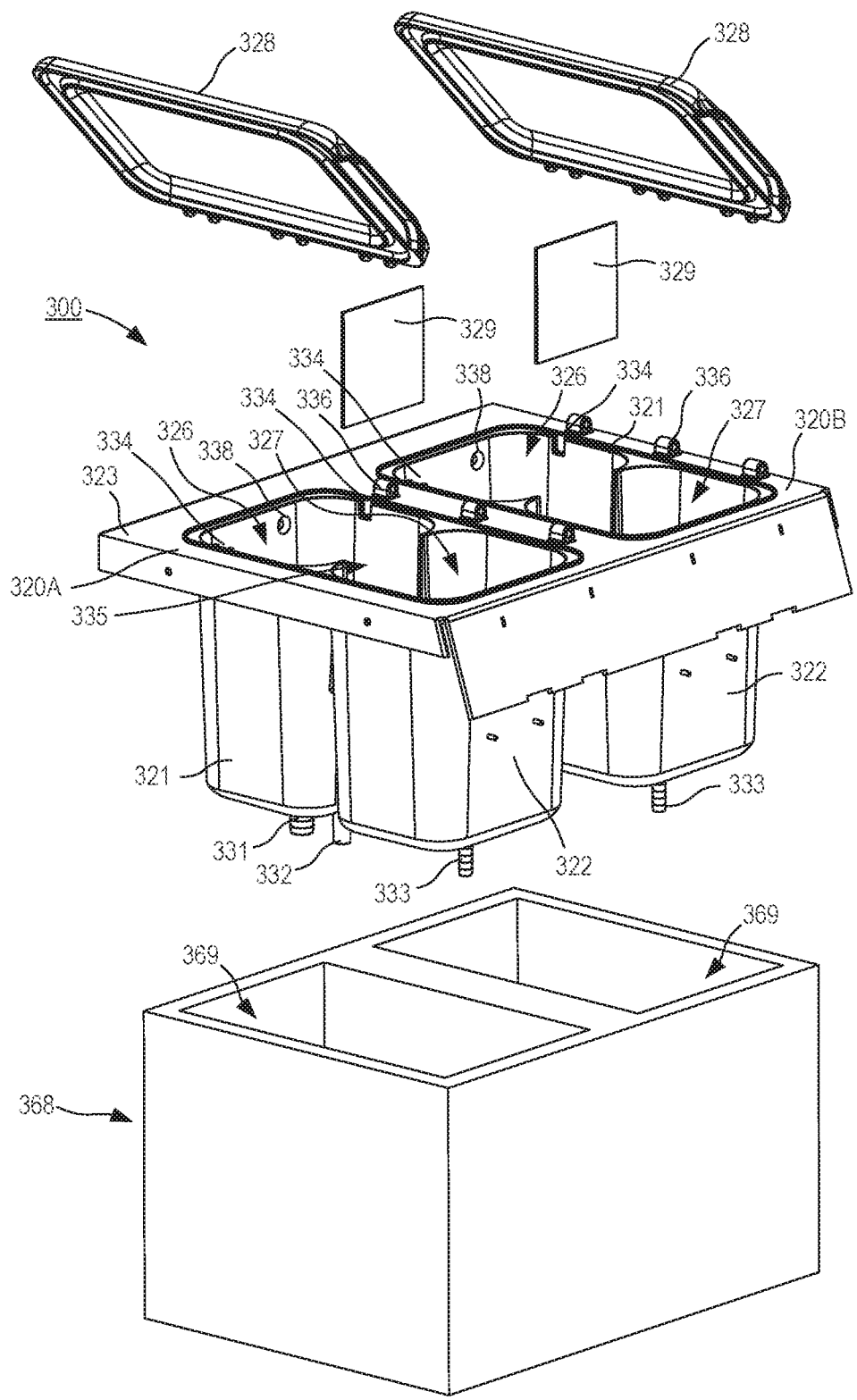
FIG. 14 is a partially exploded view of a thermal container, lid, and insulation material included in the semi-autonomous fluid-immersion cooking device of FIG. 11.
Figure 15:
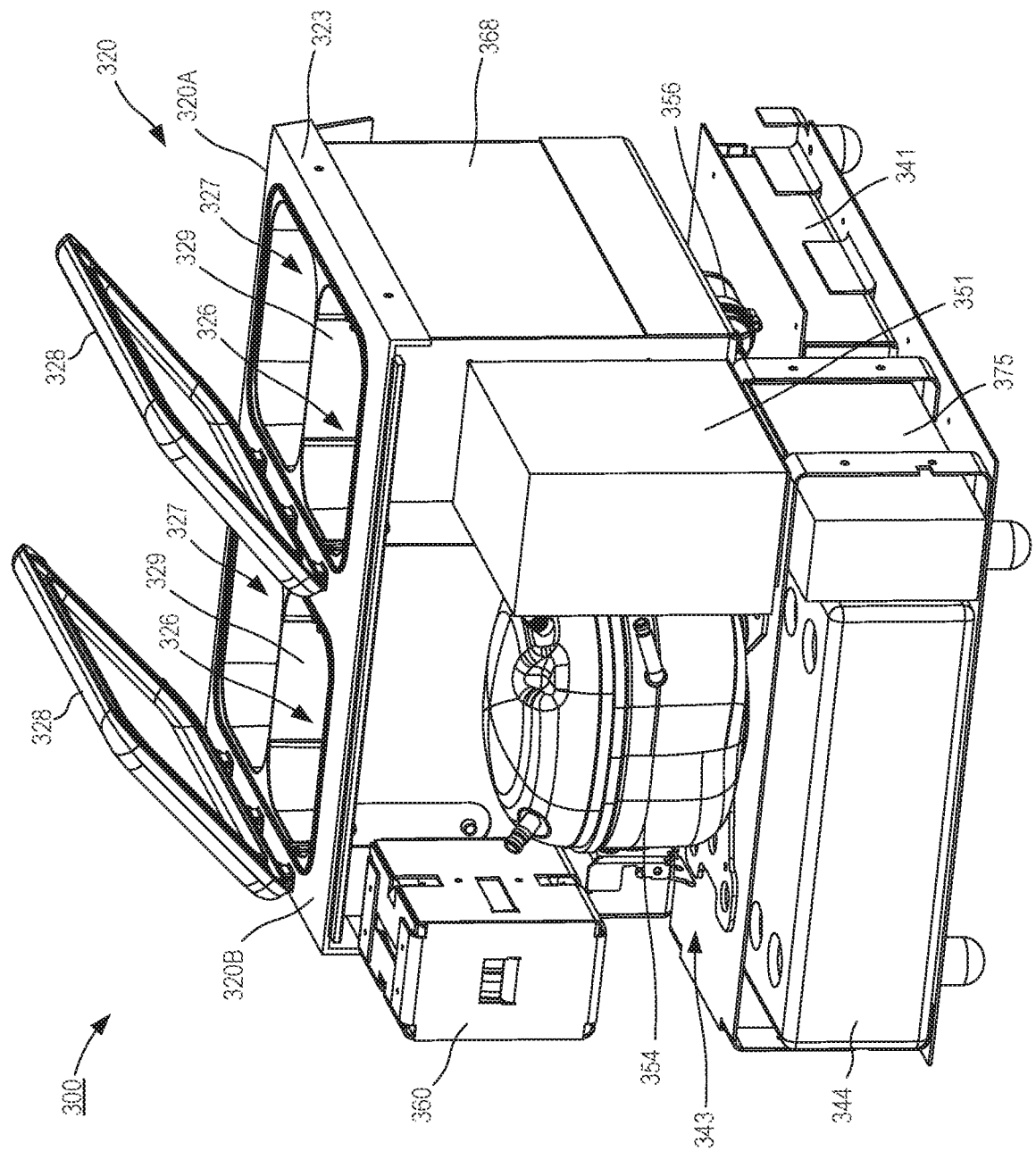
FIG. 15 is a rear perspective view of a portion of the semi-autonomous fluid immersion cooking device of FIG. 11.
Figure 16:
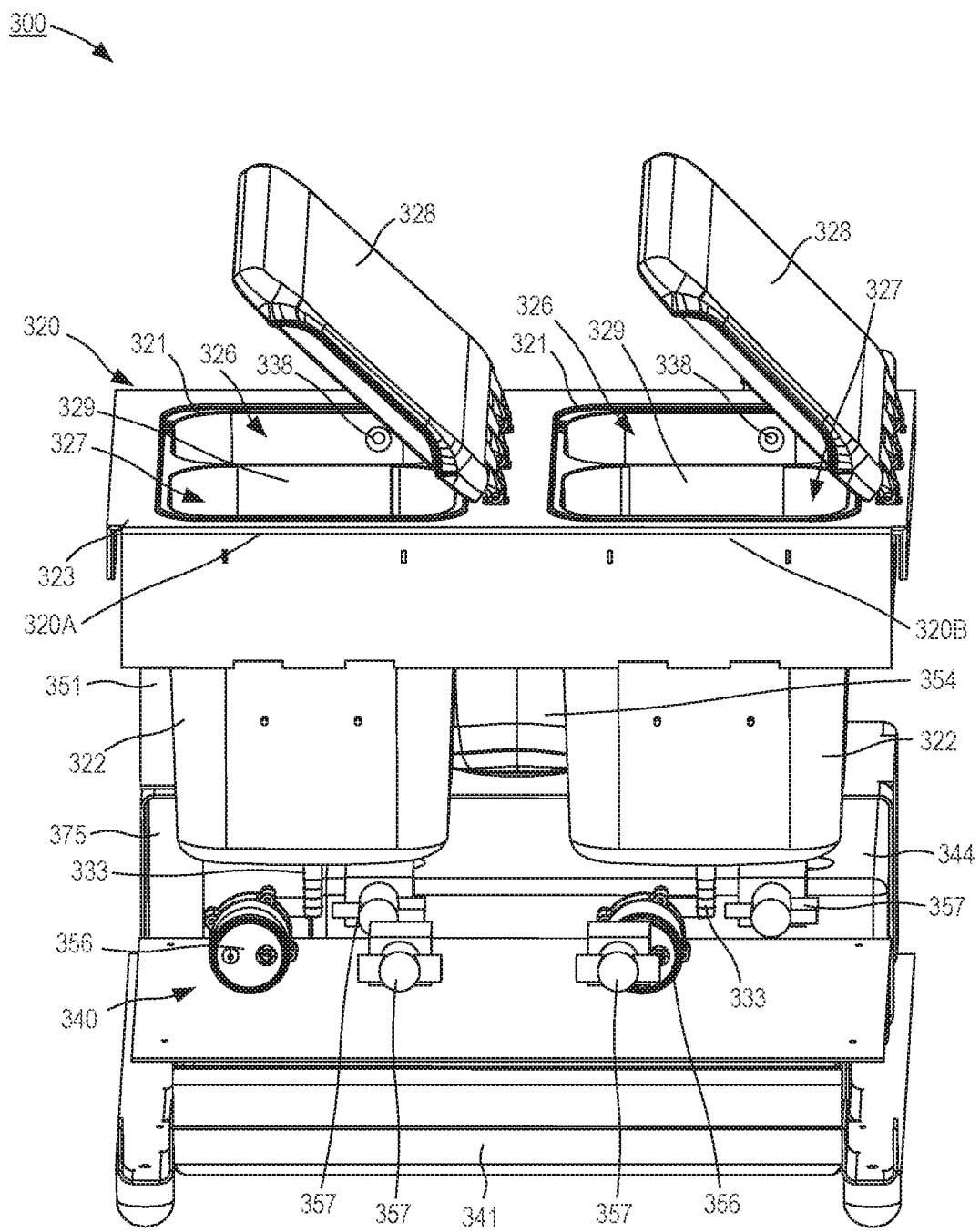
FIG. 16 is a front perspective view of a portion of the semi-autonomous fluid-immersion cooking device of FIG. 11.

FIGS. 11-17B illustrate a semi-autonomous fluid-immersion cooking device 300 according to an embodiment. The fluid-immersion cooking device 300 (also referred to herein as "device") can be any suitable cooking device, machine, and/or system. As described in further detail herein, for example, the device 300 can be a sous-vide cooking device configured to store food within a sealed package and disposed in the device 300 at a first temperature prior to cooking and configured to cook the food disposed therein at a second temperature greater than the first temperature via heat transfer between the food and a circulating fluid such as water. The device 300 includes a housing 310, one or more thermal containers 320, a fluid circulation system 340, and a controller 370. In some embodiments, the device 300 can be substantially similar to the device 100 described above with reference to FIGS. 1 and 2 and/or the device 200 described above with reference to FIGS. 3-10. Thus, some aspects of the device 300 are not described in further detail herein. For example, the controller 370 of the device 300 can be substantially similar to or the same as the controller 170 described above with reference to the device 100. As such, the controller 370 of the device 300 can include and/or can be in communication with any suitable electronic and/or electromechanical device configured to control at least a portion of the device 300, as described above with reference to the devices 100 and/or 200. Moreover, the controller 370 can be electrically connected to any suitable power supply 375 (FIG. 15). In some embodiments, the device 300 can be electrically connected to an electrical wall outlet and/or the like.

Figure 11:
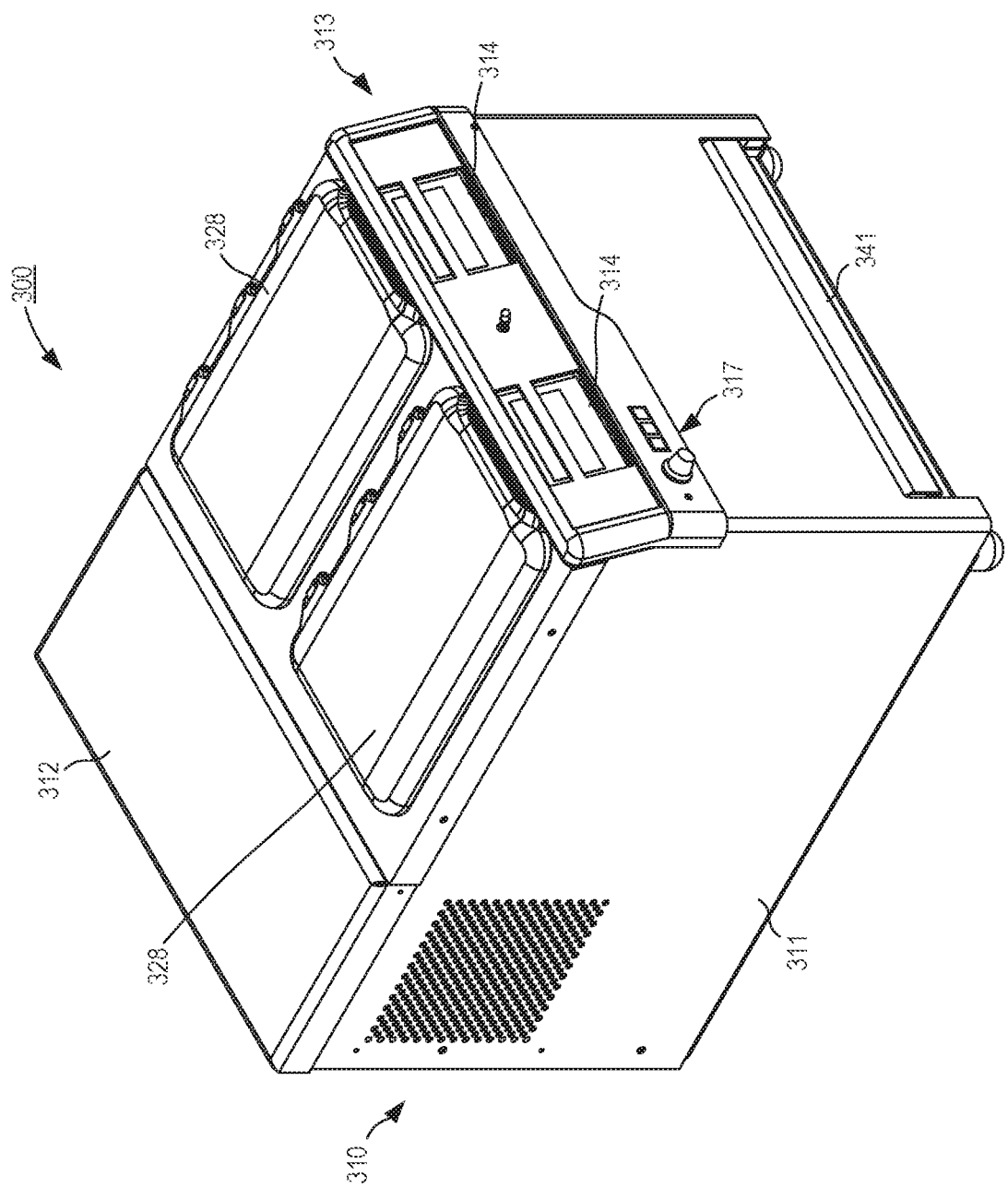
FIG. 11 is a perspective view of a semi-autonomous fluid-immersion cooking device according to an embodiment.

The housing 310 of the device 300 is configured to house and/or at least partially enclose the set of thermal containers 320, the fluid circulation system 340, and the controller 370. The housing 310 can be any suitable shape, size, and/or configuration. For example, as shown in FIG. 11, the housing 310 is substantially rectangular and can have a size suitable for placement on, for example, a kitchen countertop or the like. The housing 310 includes a body portion 311 and a lid 312. The lid 312 is coupled to the body portion 311 and can be removed to allow a user to access the components contained within the housing 310. The body portion 311 of the housing 310 includes one or more user interface portions 313. For example, the interface portion 313 can include one or more displays and/or controls configured to present a user with information associated with the device 300 and/or to otherwise present an interface with which a user can interact to control at least a portion of the device 300. In the embodiment shown in FIGS. 11 and 12, the interface portion 313 includes a display 314 associated with each thermal container 320 or set of thermal containers 320. Thus, each display 314 can be configured to graphically represent data associated with its corresponding thermal container(s) 320, as described above with reference to the interface portion 213 illustrated in FIG. 3. Moreover, the interface portion 313 includes a set of controls 317 that can be manipulated by a user to provide an input for the device 300. That is to say, the user can manipulate the controls 317 and/or can otherwise set the controls 317, which can provide, for example, a user input to the controller 370. In some embodiments, the arrangement of the interface portion 313 (e.g., the displays 314 and the controls 317) can be similar to known or familiar arrangements found in or on other kitchen appliances (e.g., a stove or the like). In some embodiments, the controls 317 can work and/or can be used in conjunction with any other suitable control such as an external electronic device (e.g., smartphone or personal computer).

The thermal container(s) 320 of the device 300 can be any suitable shape, size, and/or configuration and configured to be coupled to one or more support structures 318 disposed within the housing 310 (e.g., via a mounting flange 323 and one or more mechanical fasteners, adhesives, welding, ultrasonic welding, and/or the like). As shown in FIGS. 13-15, the thermal container(s) 320 includes, for example, two sides and/or two sets of thermal containers 320. In other embodiments, the device 300 can include any suitable number of thermal containers 320 (e.g., one, three, four, five, six, seven, eight, nine, ten, or more). In this embodiment, the thermal container(s) 320 are monolithically and/or unitarily formed. In other embodiments, the thermal container(s) 320 can be formed from two or more components and coupled, for example, during manufacturing. Although described above as being a single component including multiple thermal containers, in other embodiments, the device 300 can include multiple independent thermal containers disposed within the housing 310 (e.g., as described above with reference to the device 200).

As described above, the thermal container 320 includes two sides, a first side 320A and a second side 320B (and/or two sets of independent thermal containers). As shown in FIGS. 13-16, the first side 320A of the thermal container 320 includes a first portion 321 forming a first volume 326 and a second portion 322 forming a second volume 327. The first portion 321 of the first side 320A includes an inlet port 337, an outlet port 331, and an overflow port 338. As described in further detail herein, the inlet port 337, the outlet port 331, and the overflow port 338 are each physically and fluidically coupled to a portion of the fluid circulation system 340 such that a fluid can selectively flow into and/or through the first volume 326 defined by the first portion 321. In addition, the first portion 321 includes a sensor port 332 configured to receive, for example, a portion of a temperature sensor and/or the like (e.g., a thermometer, a thermocouple, etc.). The second portion 322 of the first side 320A includes a port 333 that is physically and fluidically coupled to a portion of the fluid circulation system 340 and that is configured to receive an inlet flow and/or an outlet flow of fluid therethrough, as described in further detail herein.

In the embodiment shown in FIGS. 11-17B, the second side 320B of the thermal container 320 is similar to and/or substantially the same as the first side 320A of the thermal container 320. Accordingly, the second side 320B of the thermal container 320 includes a first portion 321 forming a first volume 326 and a second portion 322 forming a second volume 327. The first portion 321 of the second side 320B includes an inlet port 337, an outlet port 331, an overflow port 338, and a sensor port 332 while the second portion 322 of the second side 320B includes a port 333, as described above with reference to the first side 320A of the thermal container 320.

Although the first side 320A and the second side 320B are described above as being similar and/or substantially the same, in other embodiments, a device can include a thermal container and/or multiple thermal containers, which are not similar (e.g., non-uniform). For example, in some embodiments, a size and/or capacity of a first side of a thermal container included in a device can be greater than a size and/or capacity of a second side of the thermal container included in the device. In such embodiments, for example, the larger thermal container and/or side thereof can be configured to store and/or cook multiple servings of food while the smaller thermal container and/or side thereof can be configured to store and/or cook a single serving.

Figure 12:
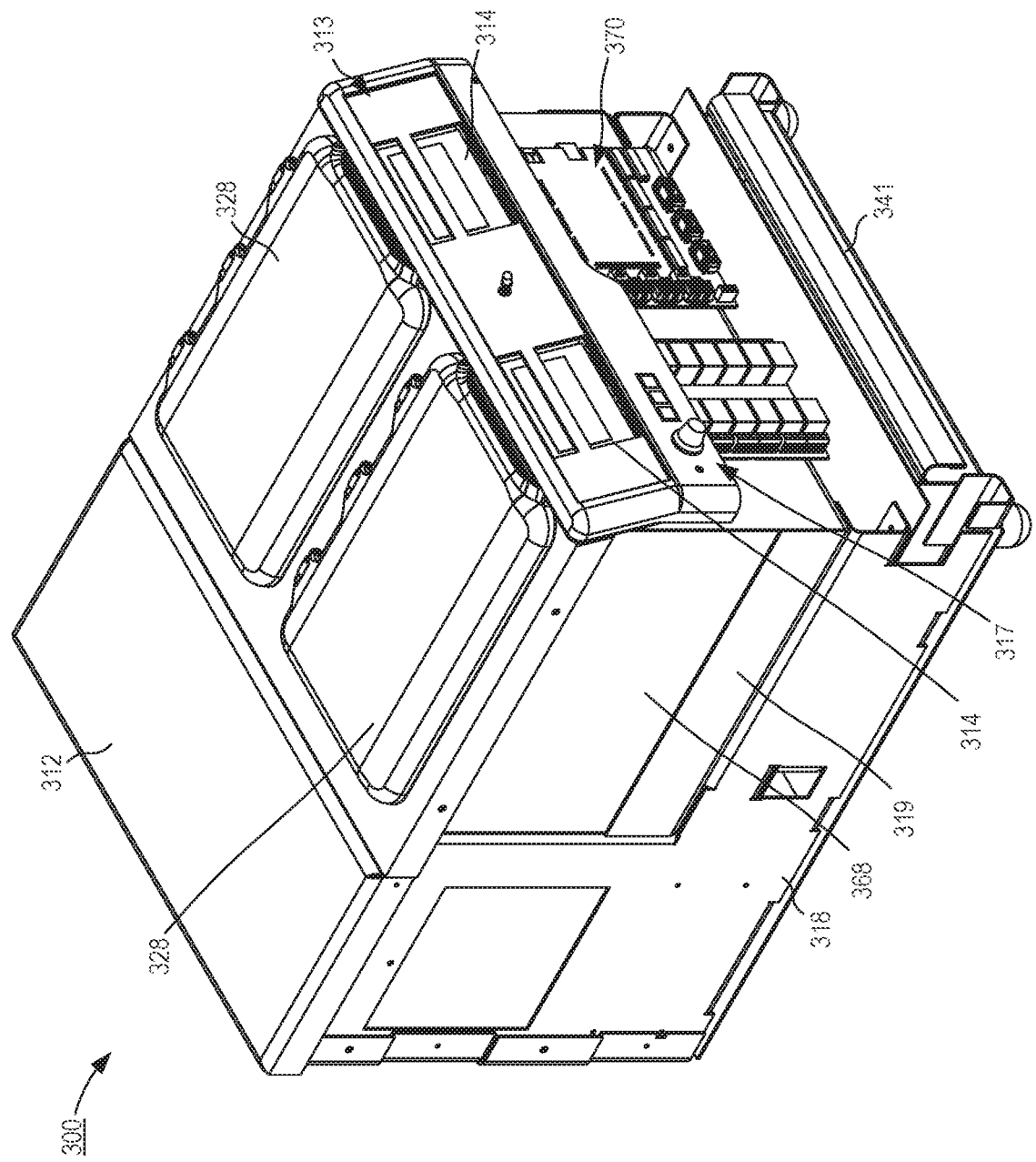
FIG. 12 is a perspective view of the semi-autonomous fluid-immersion cooking device of FIG. 11 shown without portions of a housing.

Each side 320A and 320B of the thermal container 320 includes and/or is coupled to a lid 328, which can be transitioned between a first configuration (e.g., a closed configuration, as shown in FIGS. 11 and 12) and a second configuration (e.g., an open configuration, as shown in FIGS. 13-16). For example, as shown in FIG. 14, the mounting flange 323 of the thermal container 320 includes a set of couplers 336 configured to pivotably couple the lids 328 to the thermal container 320 such that, when in the first configuration (e.g., closed) one lid 328 fluidically isolates the first volume 326 and the second volume 327 on the first side 320A of the thermal container 320 while the other lid 328 fluidically isolates the first volume 326 and the second volume 327 on the second side 320B of the thermal container 320. For example, the lids 328 can include a seal or the like that can form a substantially fluid tight seal with a surface of the mounting flange 323 when in the first configuration. As described in further detail herein, the arrangement of the thermal container 320 is such that the first volume 326 and/or the second volume 327 on either side 320A and/or 320B of the thermal container 320 can receive one or more food items and can store the one or more food items substantially at a predetermined and/or desired storage temperature and/or can cook the one or more food items substantially to and/or at a predetermined and/or desired cooking temperature.

The thermal container 320 (i.e., the monolithically formed thermal container 320) can be formed of and/or can include any suitable material(s) and/or combinations thereof. For example, in some embodiments, the thermal container 320 can be an injection-molded component formed of a plastic or polymer material. In some embodiments, forming the thermal container 320 from a plastic or polymer can be such that the thermal container 320 has a relatively low thermal conductivity (e.g., between about 0.1 W/mk and about 0.25 W/mk, as described above). In this manner, the thermal container 320 can be configured to, for example, insulate and/or retain thermal energy within or on the first side 320A of the thermal container 320 while shielding and/or at least partially isolating the second side 320B of the thermal container 320 from the thermal energy. Thus, heat transfer between the sides 320A and 320B of the thermal container 320 can be reduced, which in turn can allow for independent temperature control of the first side 320A and the second side 320B of the thermal container 320, as described in further detail herein.

Moreover, a material or combination of materials having a relatively low thermal conductivity can be disposed about at least a portion of the thermal container 320 to insulate and/or at least partially thermally isolate one or more portions of the thermal container 320 from other portions of the device 300 (e.g., other portions of the thermal container 320, the housing 310, portions of the fluid circulation system 340, etc.) For example, as shown in FIGS. 13-15, and insulating material 368 can define an opening 369 configured to receive at least a portion of the first side 320A of the thermal container 320 and an opening 369 configured to receive at least a portion of the second side 320B of the thermal container 320. In some embodiments, the insulating material 368 can be, for example, polyurethane foam or foil, silicone, and/or the like. Thus, as described above with reference to the thermal containers 120 and 220, the insulating material 368 can thermally isolate the first side 320A of the thermal container 320 from the second side 320B of the thermal container 320 such that a temperature associated with each side 320A and/or 320B can be independently controlled substantially without transferring thermal energy therebetween and/or to other portions of the device 300.

While the thermal container 320 is described above as being formed from and/or of a material having a relatively low thermal conductivity, in some embodiments, at least a portion of the thermal container 320 can be formed of a material having a relatively high thermal conductivity (e.g., a metal such as aluminum, stainless steel, and/or the like having a thermal conductivity between about 10 W/mk and about 250 W/mk, as described above). For example, as shown in FIGS. 13-15, both the first side 320A and the second side 320B of the thermal container 320 defines a slot 335 configured to receive a wall 329, which in turn, at least partially separates the first portions 321 from the second portions 322. In some embodiments, the wall 329 can be formed of a material having a relatively high thermal conductivity such as a metal or the like. The arrangement of the wall 329 coupled to the first side 320A of the thermal container 320 can selectively allow for thermal energy to be transferred between the first portion 321 and the second portion 322 of the first side 320A, as described in further detail herein. Likewise, the arrangement of the wall 329 coupled to the second side 320B of the thermal container 320 can selectively allow for thermal energy to be transferred between the first portion 321 and the second portion 322 of the second side 320B, as described above with reference to the wall(s) 229 included in the device 200. Thus, as a temperature within, for example, the first volume 326 is increased relative to the second volume 327, the temperature differential therebetween results in thermal energy being transferred from the relatively hotter side of the wall 329 to the relatively cooler side of the wall 329, thereby transferring thermal energy from the first volume 326 and the second volume 327 (or vice versa), as described in further detail herein.

In some embodiments, the first volume 326 and the second volume 327 of the first side 320A of the thermal container 320 can be configured to store and/or cook different types of food. For example, the first volume 326 of the first side 320A can be configured to receive a first kind of food such as, for example, meats and/or other proteins, and the second volume 327 of the first side 320A can be configured to receive a second kind of food (or a second kind of food, a third kind of food, a fourth kind of food, etc.) such as, for example, vegetables, starches, carbohydrates, and/or the like. As such, in some embodiments, the first side 320A of the thermal container 320 can be configured to receive the food items in a predetermined arrangement and/or orientation.

For example, the food items configured to be disposed in the thermal container 320 can be contained within one or more fluid tight packages, cartridges, and/or cartridge assemblies having a predetermined size, shape, and/or configuration. More specifically, the first portion 321 of the first side 320A of the thermal container 320 includes and/or defines a set of alignment notches 334 (see e.g., FIG. 14) configured to receive a portion of a food cartridge having a predetermined and/or given arrangement. In some embodiments, for example, a food cartridge and/or package containing a meat and/or other protein can be at least partially disposed within the first volume 326 defined by the first portion 321 of the first side 320A such that a portion of the food cartridge and/or package is disposed within the notches 324. In some embodiments, the arrangement of the notches 334 and the food cartridge and/or package is such that the food cartridge and/or package is positioned within the first portion 321 in a predetermined orientation (e.g., in only one orientation and/or configuration). Although not shown in FIGS. 11-17B, in some embodiments, the second portion 322 of the first side 320A of the thermal container 320 can likewise include any suitable alignment notch and/or feature configured to align at least a portion of a food cartridge disposed within the second volume 327. With the second side 320B of the thermal container 320 being similar to and/or substantially the same as the first side 320A, the first portion 321 and the second portion 322 of the second side 320B can similarly include a set of notches 334 and/or any other suitable feature configured to at least partially align a food cartridge, food cartridge assembly, food cartridge caddy or holder, etc. within the first volume 326 and second volume 327 of the second side 320B of the thermal container 320.

In some embodiments, the first portions 321 and the second portions 322 of the thermal container 320 can each include at least one sensor such as an RFID sensor or reader configured to sense the presence of and/or read a corresponding RFID tag or the like disposed on a portion of the food cartridge contained therein. For example, in some instances, such an RFID sensor and/or reader can be configured to sense and/or detect a presence of a food cartridge disposed within the corresponding first portion 321 and/or second portion 322. In some instances, the RFID sensor and/or reader can be configured to read and/or receive data from the RFID tag and/or the like disposed on the portion of the food cartridge therein (e.g., in addition to and/or instead of detection of the food cartridge's presence). For example, as described above with reference to the devices 100 and/or 200, the RFID tag and/or the like disposed on the portion of the food cartridge can include data associated with the type of food contained within the food cartridge, a set of storing and/or cooking instructions, and/or any other suitable data.

In some embodiments, such an arrangement of the first portions 321 and the second portions 322 of the thermal container 320 can ensure that the first portions 321 receive a food item(s) having a first type (e.g., a meat or protein) and the second portions 322 receive a food item(s) having a second type (e.g., a starch, vegetable, etc.). Thus, the device 300 can be configured to store and/or cook food items in a manner specific to and/or at least partially based on the type of the food items. For example, in some instances, it may be desirable to cook the food item (e.g., a meat) contained in the first portion(s) 321 to a first temperature and the food item (e.g., a starch, vegetable, and/or other non-meat food item) contained in the second portion(s) 322 to a second temperature different from the first temperature.

By way of another example, when the device 300 is storing food in the thermal container 320 prior to cooking (e.g., on the first side 320A and/or the second side 320B), the device 300 can be configured to circulate a cooled volume of fluid through the first volume(s) 326 defined by the first portion(s) 321, which in turn, can maintain the first volume(s) 326 below a temperature threshold. Conversely, with the second volume(s) 327 configured to receive, for example, starches and/or vegetables, it may be undesirable to expose these food items to and/or submerge these food items in a volume of fluid prior to cooking. As such, the arrangement of the wall(s) 329 can be such that thermal energy from the second volume(s) 327 is carried through the wall(s) 329 and at least a portion of the thermal energy is removed from a surface of the wall(s) 329 as the colder fluid flows relative thereto. In other words, the wall(s) 329 or at least a portion thereof can form and/or can otherwise act as a heat exchanger configured to transfer thermal energy from the second volume(s) 327 to the first volume(s) 326 when the device 300 is storing the food prior to cooking such that the food items disposed in the second volume(s) 327 can be kept below a temperature threshold without exposing and/or submerging the food items to a circulating fluid.

The fluid circulation system 340 of the device 300 can be any suitable shape, size, and/or configuration. The fluid circulation system 340 is configured to circulate a fluid (e.g., water) through a portion of the device 300 and to regulate a temperature of the fluid as it flows therethrough. As shown, for example, in FIGS. 15-17B, the fluid circulation system 340 includes a drain reservoir 341, a chiller assembly 343, a set of circulation pumps 356 (e.g., one or more per side of the thermal container 320), a set of solenoids (valves) 357, a set of fluid conduits 358, a set of fittings 359, a set of one-way valves 365, and a heater assembly 360. The controller 370, and/or one or more processors included therein, can be in electrical and/or electronic communication with at least a portion of the fluid circulation system 340 and can be configured to execute a set of instructions or code associated with controlling the fluid circulation system 340. For example, the controller 370 can perform and/or execute processes associated with transitioning one or more solenoids 357 from an open configuration to a closed configuration (or vice versa), increasing or decreasing a flow rate through one or more circulation pumps 356, and/or the like. As described above with reference to the controller 170, in some instances, the controller 370 can control at least a portion of the fluid circulation system 340 based on signals (and/or data contained therein) from any number of sensors, encoders, thermometers, thermistors, fill indicators, etc. In other instances, the controller 370 can control at least a portion of the fluid circulation system 340 based on data associated with a local or remote user input, data received from a RFID tag and/or via near field communication (NFC), etc., as described in further detail herein.

The fluid circulation system 340 is configured to define a fluid flow path between the drain reservoir 341, the chiller assembly 343, the heater assembly 360, and the thermal container 320 (e.g., the first side 320A and/or the second side 320B). In the embodiment shown in FIGS. 11-17B, the fluid circulation system 340 defines an independent fluid flow path associated with each side 320A and 320B of the thermal container 320. Said another way, while in fluid communication with the same drain reservoir 341, the same chiller assembly 343, and/or the same heater assembly 360, the fluid flow path for the first side 320A of the thermal container 320 is otherwise fluidically isolated from the fluid flow path for the second side 320B of the thermal container 320. As such, the device 300 can independently control a temperature associated with each side 320A and 320B of the thermal container 320.

As shown in FIG. 15, the chiller assembly 343 includes a heat exchanger 344, a condenser 351, and a compressor 354. The chiller assembly 343 is configured to chill, cool, and/or otherwise remove thermal energy from a volume of fluid circulating therethrough. For example, in some embodiments, the chiller assembly 343 can be substantially similar to known refrigeration units and/or assemblies. More specifically, the chiller assembly 343 can be configured to circulate a working fluid (e.g., a coolant such as R-134a (1,1,1,2-Tetrafluoroethane), R-600a (isobutene), water-based glycol mixtures, betaine, and/or the like) through, for example, a vapor compression cycle. In such instances, the compressor 354 receives a flow of the working fluid (coolant) in a vapor state and compresses the working fluid such that the pressure and temperature of the working fluid increase. The compressed working fluid is compressed, for example, to a superheated vapor state and exits the compressor 354 after which the superheated vapor flows into the condenser 351. The superheated vapor rejects heat when passing through the condenser 351 and is allowed to condense into a saturated liquid state. The saturated liquid working fluid then flows through an expansion valve (not shown in FIGS. 11-17B), which reduces a pressure associated with the working fluid and in turn, results in the saturated liquid transitioning to a liquid and vapor mixture via, for example, adiabatic flash evaporation. As a result of the expansion, a temperate associated with the working fluid (liquid-vapor mixture) is reduced and the "cold" working fluid flows into the heat exchanger 344, in which the cold working fluid absorbs thermal energy rejected from the storing/cooking fluid (e.g., water) circulating through the heat exchanger 344. The working fluid then flows to the compressor 354 and the vapor-compression cycle is repeated.

Accordingly, the chiller assembly 343 can be used to absorb thermal energy from (i.e., cool) the fluid flowing through the fluid circulation system 340 and/or the thermal container 320. In some instances, when the controller 370 places the device 300 in the storage configuration associated with the first side 320A and/or the second side 320B of the thermal container 320, the associated portion of the fluid circulation system 340 can circulate the cooled or cold fluid through the first portion(s) 321 of the thermal container 320, thereby maintaining the food contained in the first portion(s) 321 at a desired storage temperature. For example, in some embodiments, the fluid can be configured to maintain a temperature within the first volume(s) 326 of the thermal container 320 at or about 40° F. Moreover, the controller 370 can receive one or more signals from any suitable sensor, thermometer, thermocouple, thermistor, etc. and based on data included therein can actively control at least a portion of the fluid circulation system 340 to increase or decrease a temperature associated with a volume of the fluid.

The heater assembly 360 of the fluid circulation system 340 can be any suitable device and/or assembly configured to heat a fluid of fluid passing therethrough. In some embodiments, for example, the heater assembly 360 can include known heating elements such as those used in coffee makers or the like (e.g., thick film heaters or the like). In some embodiments, such heating elements can be, for example, 750 watts-1,200-watt heating elements, which can be duty cycled in a desired and/or predetermined manner to control a rate and/or amount of thermal energy transferred to a volume of fluid (e.g., water) flowing therethrough. In some embodiments, the heater assembly 360 can include one or more heating elements that can have, for example, a 400-watt configuration, an 800-watt configuration, and/or a 1,200-watt configuration. Moreover, in some instances, the heating elements can be duty cycled and/or run in phases (e.g., via the controller 370 or portion thereof) to, for example, increase an output of the heating elements in about 40 watt increments. For example, in some embodiments, the heater assembly 360 can be configured to raise a temperature associated with a volume of fluid (e.g., water) circulating therethrough by about 20° Fahrenheit (F). In some embodiments, the heater assembly 360 can be configured to raise a temperature of a volume of fluid (e.g., water) by about 4° F. per minute or more (e.g., 5° F. per minute, 6° F. per minute, 7° F. per minute, 8° F. per minute, 9° F. per minute, 10° F. per minute, 15° F. per minute, 20° F. per minute, 25° F. per minute, or more). Moreover, the controller 370 can be configured to duty cycle the heating elements included in the heater assembly 360 to control an amount and/or rate of heat transferred from the heater assembly 360 to the volume of fluid.

An example of one or more fluid flow paths for the first side 320A of the thermal container 320 is described below with reference to FIGS. 17A and 17B. While described for the first side 320A of the thermal container 320, it should be understood that similar fluid flow paths are or can be defined for the second side 320B of the thermal container 320 and, therefore, that a temperature associated with each side 320A and 320B of the thermal container 320 can be independently controlled. Accordingly, the fluid flow paths associated with the second side 320B are not described in further detail herein and should be considered substantially similar to those described with reference to the first side 320A unless otherwise indicated.

Figure 17A:
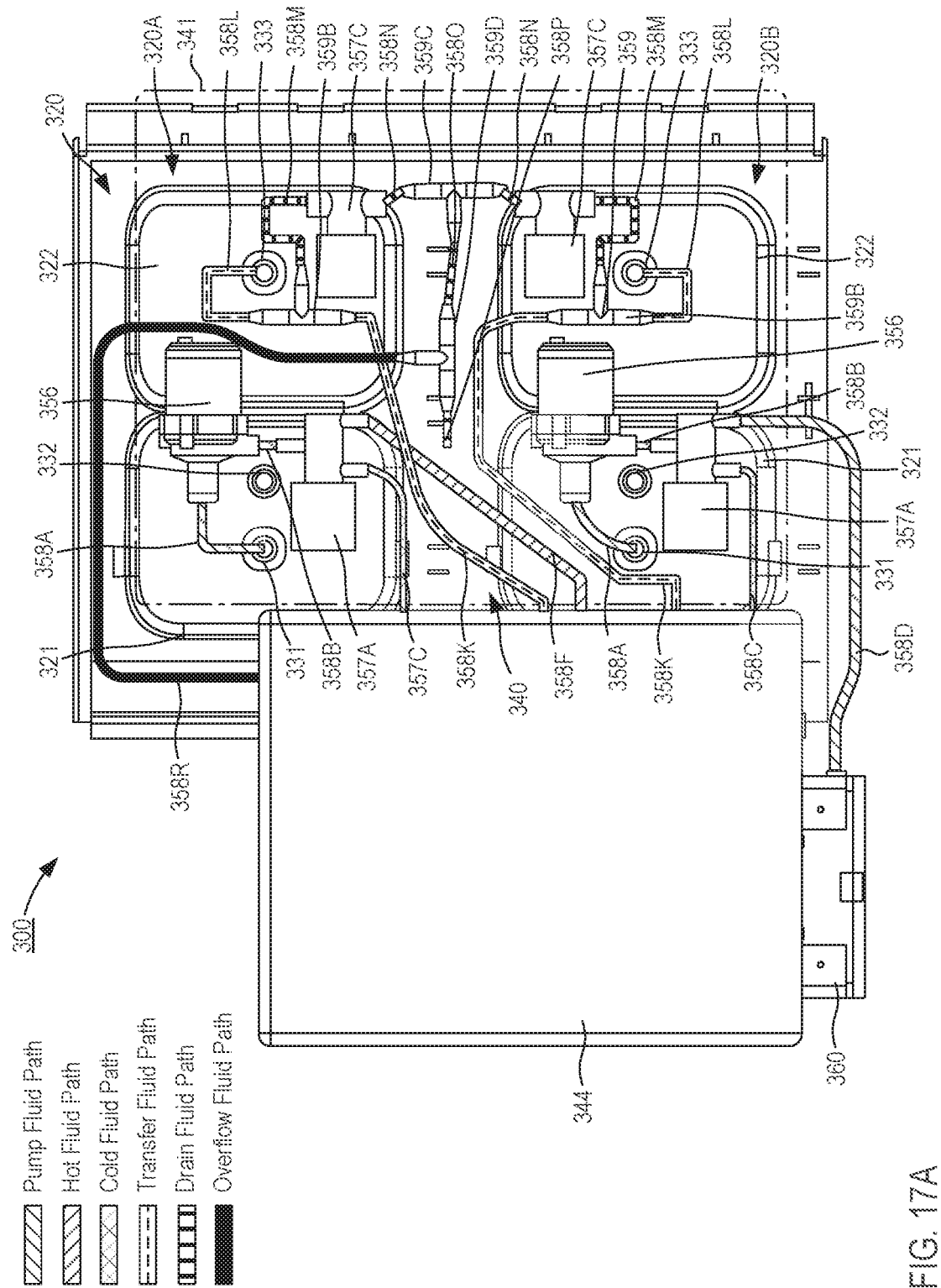
FIGS. 17A and 17B are a bottom view and a rear view of a portion of the semi-autonomous fluid-immersion cooking device of FIG. 11 illustrating at least a portion of a fluid circulation system.

As shown in FIG. 17A, a first fluid conduit 358A is in fluid communication with the first volume 326 defined by the first portion 321 of the thermal container 320 (on the first side 320A) via the outlet port 331. The first fluid conduit 358A places the first volume 326 in fluid communication with the circulation pump 356. The circulation pump(s) 356 can be any suitable configuration. For example, in some embodiments, the circulation pump(s) 356 can be a pump configured to provide a flow of fluid in a single direction or a reversible pump configured to provide a flow of fluid in two directions.

The circulation pump 356 is in fluid communication with a first solenoid 357A via a second fluid conduit 358B. Thus, fluid can flow within a "pump fluid path" from the outlet port 331 to the first solenoid 357A. The first solenoid 357A, in turn, is in fluid communication with the heat exchanger 344 of the chiller assembly 343 via a third fluid conduit 358C and the heater assembly 360 via a fourth fluid conduit 358D. As shown in FIG. 17B, the heat exchanger 344 is in fluid communication with a first one-way valve 365A via a fifth fluid conduit 358E, which in turn, is in fluid communication with a first inlet of a first fitting 359A via a sixth fluid conduit 358F. The heater assembly 360 is in fluid communication with a second solenoid 357B via a seventh fluid conduit 358G. The second solenoid 357B is in fluid communication with a second one-way valve 365B via an eighth fluid conduit 358H, which in turn, is in fluid communication with a second inlet of the first fitting 359A via a ninth fluid conduit 358I. An outlet of the first fitting 359A is in fluid communication with the inlet port 337 of the first portion 321 of the thermal container 320 via a tenth fluid conduit 358J.

Thus, when the controller 370 places the device 300 in the storage configuration, the outlet port 331 establishes fluid communication between the first volume 326 and the circulation pump 356; the first solenoid 357A establishes fluid communication between the circulation pump 356 and the heat exchanger 344; and the first one-way valve 365A (via the first fitting 359A) establishes fluid communication between the heat exchanger 344 and the inlet port 337 of the first portion 321. Accordingly, a fluid can flow through a "cold fluid path" or "cold loop" to maintain the fluid within the first volume 326 at or below a desired storage temperature (e.g., about 40° F.). When the controller 370 places the device 300 in the cooking configuration, the outlet port 331 establishes fluid communication between the first volume 326 and the circulation pump 356; the first solenoid 357A establishes fluid communication between the circulation pump 356 and the heater assembly 360; and the second solenoid 357B establishes fluid communication, via the second one-way valve 365B and the first fitting 359A, between the heater assembly 360 and the inlet port 337 of the first portion. Accordingly, the fluid can circulate through a "hot fluid path" or "hot loop" to maintain the fluid within the first volume 326 at about a desired cooking temperature (e.g., about 140° F.).

While described above as defining the fluid flow paths (e.g., the "cold loop" and the "hot loop") within which fluid can flow to circulate through, for example, the first volume 326 of the thermal container 320, the fluid circulation system 340 defines one or more fluid flow paths configured to circulate fluid through the second volume 327 of the thermal container 320 (e.g., a "transfer fluid path" or "transfer loop"). For example, as shown in FIGS. 17A and 17B, an eleventh fluid conduit 358K is in fluid communication with a second fitting 359B, which in turn, is in fluid communication with the port 333 of the second portion 322 via a twelfth fluid conduit 358L. As such, the controller 370 can send to the second solenoid 357B a signal that results in the second solenoid 357B establishing fluid communication between the heater assembly 360 and the port 333 of the second portion 322 (e.g., establishes the "transfer loop"). Moreover, such an arrangement can allow the controller 370 to split the flow of the fluid between the first portion 321 and the second portion 322 such that a volume of fluid is disposed in each portion 321 and 322. In other words, the controller 370 can send a signal to the second solenoid 357B that places the second solenoid 357B in a configuration in which a first volume of the fluid can flow through the second solenoid 357B and into the eighth fluid conduit 358H and a second volume of the fluid can flow through the second solenoid 357B and into the eleventh fluid conduit 358K. In some embodiments, the arrangement can allow for simultaneous cooking within the first portion 321 and the second portion 322 of the thermal container 320 and/or can provide a means by which the controller 370 can control and volume, temperature, flow rate, etc. of fluid within the first volume 326 and/or the second volume 327.

As described above, a thirteenth fluid conduit 358M establishes fluid communication between the second fitting 359B and a third solenoid 357C. As shown in FIG. 17B, the third solenoid 357C is in fluid communication with the drain reservoir 341 via two fittings (i.e., a third fitting 359C and a fourth fitting 359D) and three fluid conduits (i.e., a fourteenth fluid conduit 358N, a fifteenth fluid conduit 358O, and a sixteenth fluid conduit 358P). In this manner, the controller 370 can send to the third solenoid 357C a signal that places the third solenoid 357C in a configuration such that fluid communication is established between the first portion 321 and/or the second portion 322 and the drain reservoir 341 (e.g., a "drain fluid path" or a "drain loop"). Accordingly, in some embodiments, the device 300 can be configured to drain a volume of fluid after a cooking operation and/or after food items have been removed from the device 300. In other embodiments, the controller 370 can send to the third solenoid 357C a third signal that is operable in allowing a volume of fluid to be drained during use (e.g., to prevent overflowing, to manage and/or control fluid volume, flow rate, and/or temperature, and/or the like).

Figure 17B:
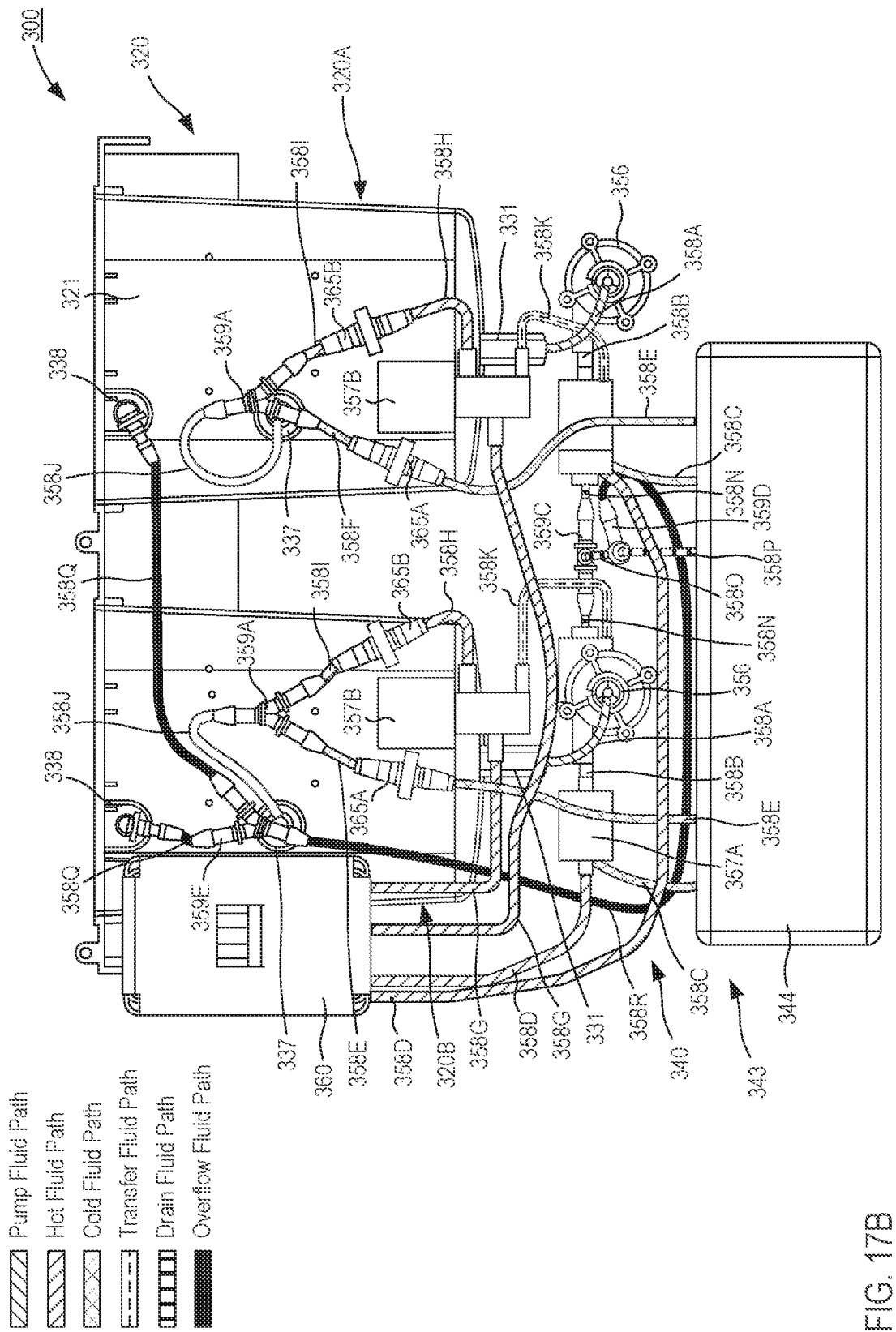

As shown in FIGS. 17A and 17B, the first volume 321 includes the overflow port 338 that is in fluid communication with the drain reservoir 341. More specifically, the fluid circulation system 340 includes a seventeenth fluid conduit 358Q that is in fluid communication with a fifth fitting 359E. The fifth fitting 359E, in turn, is in fluid communication with the fourth fitting 359D via an eighteenth fluid conduit 358R.

Thus, if a volume of fluid within the first volume 326 exceeds a predetermined threshold, a portion of the fluid can flow from the overflow port 338 to the drain reservoir 341 (e.g., via an "overflow fluid path" or "overflow loop"). Furthermore, in the embodiment shown in FIGS. 17A and 17B, the "overflow loop" is in a passive arrangement in that the "overflow loop" is devoid of a solenoid and/or valve. Thus, if a volume of fluid within the first volume 326 exceeds the volume threshold, then a portion of the volume of fluid can flow through the "overflow loop" without being dependent on the operation of a valve and/or solenoid.

Although not shown in FIGS. 11-17B, in some embodiments, the device 300 and/or controller 370 can include a switch, sensor, detector (e.g., an ultrasonic fluid detector), etc. configured to sense and/or detect a presence of the drain reservoir 341. In such embodiments, the controller 370 can be configured to limit fluid flow through a portion of the fluid circulation system 340 if a presence of the drain reservoir 341 is not detected (e.g., limit and/or substantially prevent fluid flow through the third solenoid 357. Moreover, if a volume of fluid overflows, for example, the first volume 326 and a presence of the drain reservoir 341 is not detected, in some instances, the controller 370 can be configured to balance and/or transfer a volume of fluid between the first volume 326 and the second volume 327 to avoid an overflow condition in which fluid overflows and/or spills out of the first volume 326 and/or the second volume 327.

An example of using the device 300 to semi-autonomously store and/or cook one or more food items disposed therein is described below. While the use of the first side 320A of the thermal container 320 is specifically described, it should be understood that the describing the use of only the first side 320A of the thermal container 320 is for simplicity and not limitation. The device 300 can be used in any other suitable manner such as, for example, using the second side 320B of the thermal container 320 in the manner described herein. In other instances, both of the first side 320A and the second side 320B can used in a manner similar to that described herein.

In use, a user can dispose a food cartridge and/or a portion of a food cartridge within the first volume 326 defined by the first portion 321 of the thermal container 320. The food cartridge can be positioned in the first volume 326 such that a portion of the food cartridge engages and/or is disposed in the notches 334. Accordingly, the user can ensure the correct food cartridge has been inserted into the first volume 326 and the food cartridge is properly aligned. In some instances, for example, the food cartridge disposed within the first volume 326 can contain a meat and/or protein. Similarly, the user can dispose one or more food cartridges or one or more portions of a food cartridge in the second volume 327. In some embodiments, the arrangement of the second portion 322 and the one or more food cartridges can be such that the food cartridge(s) are disposed in the second volume 327 in a predetermined orientation. For example, in some embodiments, the food cartridges can be at least partially stacked and can have a size and/or shape that can be disposed in only one way. For example, in some embodiments, the food cartridge(s) can be arranged such that a starch or carbohydrate (e.g., rice) is disposed in a lower position while a vegetable is stacked on top of the starch or carbohydrate (e.g., is in a higher position). As described in further detail herein, such a predetermined orientation and/or arrangement can result in a desired storing and/or cooking condition for each food item disposed in the second volume 327. In other embodiments, the food cartridge(s) can be disposed within the second volume 327 in any suitable manner. In some embodiments, the food cartridge(s) can be disposed within a holder or caddy configured to at least temporarily retain the food cartridge(s) in a predetermined orientation and/or arrangement.

As described above, in some embodiments, each food cartridge and/or each portion of a food cartridge that contains a food item can include, for example, an RFID tag configured to provide data to an RFID reader included in the first portion 321 and the second portion 322 of the thermal container 320. For example, in some embodiments, the RFID reader included in the first portion 321 and/or second portion 322 can receive a signal from the RFID tag of each associated food cartridge(s) or portion thereof. In some instances, the controller 370 can determine a presence of the food cartridge(s) or portion thereof based on the RFID signal. In other instances, the controller 370 can receive data from the RFID reader that is associated with and/or otherwise provides information relating to the food items contained therein. For example, the data can include the type of food item, an amount of the food item, storing and/or cooking instructions associated with the food item, and/or any other suitable data.

With the food items disposed within the first volume 326 and/or the second volume 327, the controller 370 can execute one or more processes to place the device 300 in the storage configuration or the cooking configuration based on a user input. For example, in some instances, the user can input a time to begin cooking and/or a time at which the user would like the food to be ready to eat. In some instances, the user input can be via the controls 317 included in the device 300 (see e.g., FIGS. 11 and 12). In other instances, the user input can be via an external electronic device such as a smartphone, tablet, laptop, pc, and/or any other suitable "smart device."

If the time at which the user would like the food to be ready is such that the device 300 should store the food items contained therein for a period of time, then the controller 370 can, for example, place the device 300 in the storage configuration. As such, the controller 370 can perform one or more processes operable to control, for example, at least a portion of the fluid circulation system 340 such that a cooled and/or cold fluid is conveyed into and/or circulated through the first volume 326 of the thermal container 320. Specifically, after disposing the food cartridge(s) in the thermal container 320, the user can convey a volume of fluid (e.g., water) into the first volume 326 defined by the first portion 321 of the thermal container 320. The fluid can be any suitable temperature, which can be determined via a thermal sensor in fluid communication with the first volume 326 via the sensor portion 332. Thus, as described in detail above, the controller 370 can perform one or more processes operable in circulating the volume of fluid through, for example, the "cold loop" of the fluid circulation system 340. That is to say, the pump 356 can convey the volume of fluid through the heat exchanger 344 in which the working fluid of the chiller assembly 343 removes thermal energy from the fluid such that the fluid is cooled. The cooled and/or cold fluid can then flow from the heat exchanger 344 and through the inlet port 337 of the first portion 321 and into the first volume 326. In this manner, the fluid circulation system 340 can be configured to circulate the fluid to maintain the fluid at or below a predetermined and/or desired storage temperature (e.g., about 40° F.). Moreover, the cooled and/or cold fluid circulating through the first volume 326 results in a temperature of the food item (e.g., a meat or protein) contained in the first volume 326 being reduced to and/or maintained substantially at the predetermined and/or desired storage temperature (e.g., the temperature of the food item is brought into and/or maintained at substantial equilibrium with the temperature of the fluid circulating through the first volume 326.

The arrangement of the device 300 when in the storage configuration is such that the fluid is only circulated through the first volume 326. That is to say, the fluid circulation system 340 does not convey fluid into and/or circulate fluid through the second volume 327 when the device 300 is in the storage configuration. As described above, however, the wall 329 disposed within the thermal container 320 is configured to transfer thermal energy from the second volume 327 to the fluid circulating through the first volume 326. For example, the wall 329 can be formed of a thermally conductive material and as such, thermal energy from the second volume 327 is conveyed through the wall 329 and absorbed by the cooled and/or cold fluid circulating through the first volume 326. In some embodiments, such an arrangement results in a relatively dry storage of the food items within the second volume 327 substantially at the predetermined and/or desired storage temperature. In some instances, the relatively dry storage substantially at the storage temperature is suitable for the food items contained therein (e.g., starch, vegetables, carbohydrates, etc.). Moreover, in some embodiments, the wall 329 can be, for example, approximately half the height of the portions 321 and/or 322 of the thermal container 320. Accordingly, a temperature gradient over a height of the second volume 327 can result and the one or more food cartridges can be disposed in a predetermined orientation within the second volume 327 such that, for example, the vegetables are disposed within a portion of the second volume 327 having a lower temperature than a temperature of a portion of the second volume 327 in which the starch is disposed. In some instances, such an arrangement can increase an efficiency in cooling the second volume 327 to a desired temperature and/or desired temperature gradient.

At a predetermined, calculated, and/or desired time, the controller 370 can be configured to perform one or more processes to transition the device 300 from the storage configuration to the cooking configuration. As such, the controller 370 can send to the first solenoid 357A a signal that is operable in stopping the flow of fluid through the "cold loop" and initiating a flow of fluid though the "hot loop." Accordingly, the pump 356 conveys a flow of the fluid to the heater assembly 360 in which the fluid absorbs thermal energy from one or more heating elements. The heated fluid can then flow from the heater assembly 360 to the second solenoid 357B and from the second solenoid 357B into the inlet port 337 of the first portion 321 of the thermal container 320. In this manner, the controller 370 can control at least a portion of the fluid circulation system 340 to increase a temperature of the fluid to a predetermined and/or desired cooking temperature. The heated and/or hot fluid circulating through the first volume 326, therefore, cooks the food item (e.g., meat or protein) at and/or to a predetermined and/or desired cooking temperature (e.g., about 140° F. or more). Moreover, the fluid circulation system 340 can be configured to circulate the fluid through the first volume 326 for a predetermined and/or desired time without conveying a volume of the fluid into the second volume 327 (e.g., via the "transfer loop").

After heating (e.g., cooking) the food item within the first portion 321 for a predetermined time, the controller 370 can send to the second solenoid 357B a signal indicative of an instructions to direct at least a portion of the flow of fluid to the second volume 327 via the "transfer fluid path" or "transfer loop." In this manner, at least a portion of the heated volume of fluid can flow through the second solenoid 357B and the port 333 of the second portion 322 and into the second volume 327. Thus, the fluid within the second volume 327 can transfer thermal energy to the food items (e.g., starch, vegetables, etc.) contained therein.

In some instances, it may be desirable to further heat the fluid to a temperature suitable for cooking the food items contained in the second volume 327 (e.g., between about 170° F. to about 212° F. and/or to a temperature just below the boiling point of water). In such instances, prior to circulating the fluid through the "transfer loop," the controller 370 can perform one or more processes that result in the fluid being circulated through the heater assembly 360. For example, in some embodiments, the fluid can circulate through the "hot loop" to absorb thermal energy from the heater assembly 360. In such embodiments, the food item(s) contained in the first volume 326 are exposed to the fluid having an increasing temperature (e.g., a temperature above which the food item was being cooked). Accordingly, the controller 370 can be configured to predict and/or calculate a cooking time adjustment or the like based on the exposure of the food item in the first volume 326 to the fluid having the increased temperature. In other words, the controller 370 can determine and/or calculate a cook time based on a predicted and/or predetermined mode of heating the fluid (i.e., cooking at a varying temperature). Said another way, a cook time that is otherwise associated with cooking the food item at a set temperature (e.g., 140° F.) is reduced when the fluid is subsequently heated to a temperature suitable to cook the food item(s) in the second volume 327 (e.g., between about 170° F. and about 212° F.).

Once the fluid is heated to a predetermined temperature, the second solenoid 357B can "open" and/or otherwise transition to allow a fluid flow into the second volume 327. In some instances, a predetermined volume of the fluid can be conveyed into the second volume 327 such that at least a portion of one or more food items is disposed in the volume of fluid. For example, as described above, the arrangement of the second portion 322 and the food cartridge or the portion of the food cartridge disposed therein can be such that the food items are disposed in a predetermined configuration and/or orientation. Specifically, in some such arrangements, a starch (e.g., rice, potatoes, etc.) can be in a position below, for example, a vegetable(s) and the volume of fluid conveyed into the second volume 327 can be such that the starch is disposed in the volume of fluid while the vegetable(s) are substantially not disposed in the volume of fluid. In some instances, such an arrangement, configuration, and/or process can be based at least in part on a difference in the amount of thermal energy sufficient to cook the starch (e.g., a relatively greater amount) and the amount of thermal energy sufficient to cook the vegetable(s) (e.g., a relatively lesser amount). In other instances, all of the food items disposed in the second volume 327 can be disposed in the volume of fluid. Moreover, in some instances, the controller 370 can control the volume of fluid conveyed into the second volume 327 based at least in part on data and/or information received from and/or included in one or more RFID tags included in the food cartridge(s) and/or portions thereof.

In some instances, the volume of fluid can be disposed in the second volume 327 for a predetermined time and then can be drained. For example, in some instances, the volume of fluid can transfer thermal energy to the food items contained in the second volume 327, which in turn reduces an amount of thermal energy of the volume of fluid. In some instances, the amount of temperature loss of the fluid can be predicted and/or determined and after a predetermined time and/or after the temperature of the volume of fluid drops below a temperature threshold, the controller 370 can send a signal to the third solenoid 357C operable in draining the volume of fluid or at least a portion thereof from the second volume 327. Thus, once the used fluid or a portion of the used fluid is drained, the controller 370 can send a signal to the third solenoid 357C to stop the draining process and the controller 370 can send a signal to the second solenoid 357B to allow a volume of heated fluid to flow through the second solenoid 357B and into the second volume. Stated simply, the controller 370 can be configured to refresh the volume of fluid transferred into the second volume 327, which in turn can reduce a cooking time of the food items disposed in the second volume 327 by circulating in a new volume of heated fluid.

As described above, the thermal container 320 includes the wall 329 that separates portions of the first volume 326 and the second volume 327. The arrangement of the wall 329 (e.g., the height of the wall 329) can be based on and/or can otherwise account for heat transfer through the wall 329 during storage (as described above) as well as during cooking. For example, by arranging the wall 329 height to be about half of the height of the first and second portions 321 and 322, respectively, an amount of thermal energy transferred from the second volume 327 back into the first volume 326 can be reduced, which in turn, can reduce a likelihood of overcooking the food item(s) disposed in the first volume 326. More specifically, a volume of the fluid transferred into the second volume 327 can be such that a fill height of the second volume 327 is below the wall 329. Thus, the heated fluid radiates thermal energy to the constituent material of the thermal container 320 (e.g., having a relatively low thermal conductivity) rather that the constituent material of the wall 329 (e.g., having a relatively high thermal conductivity). Accordingly, an amount of thermal energy transferred through the wall 329 as a result of cooking the food item(s) contained in second volume 327 can be reduced, which in turn, can reduce a likelihood of overcooking the food items(s) than the contained in the first volume 326.

In some embodiments, the controller 370 can be configured to place the device 300 in, for example, a hold configuration after the device 300 has cooked food contained therein. For example, in some embodiments, after the device 300 has cooked a desired amount of food in one or more sides 320A and/or 320B of the thermal container 320, the controller 370 can be configured to reduce an amount of thermal energy transferred from the heater assembly 360 to the flow of the fluid. In some instances, at least a portion of the fluid can be drained and/or circulated through the "cold loop" to further reduce the temperature of the fluid. In turn, a temperature of the fluid flowing through at least the first portion 321 of the thermal containers 320 can be reduced to a desired "hold" temperature or the like. For example, in some embodiments, the device 300 can be configured to cook food within the one or more thermal containers 320 at about 170° F. and/or any other suitable cooking temperature and once completed, can reduce the temperature of the fluid (i.e., by reducing the amount of thermal energy released from the heating elements 360) to about 140° F. and/or any other suitable hold temperature. Thus, the food can be maintained at a safe temperature after the food is cooked until the user is ready to eat the cooked food.

In some embodiments, the controller 370 can be configured to place the device 300 in, for example, a drain configuration after the device 300 has cooked food contained therein. For example, in some embodiments, the controller 370 can place both the second solenoid 357B and the third solenoid 357C in a configuration that establishes fluid communication between the first and second volumes 326 and 327 and the drain reservoir 341. Thus, fluid can flow from the first volume 326 and the second volume 327 and into the drain reservoir 341. In this manner, the cooked food can be disposed in the thermal container 320 but is no longer submerged in the fluid. In other embodiments, a user can remove the food cartridge(s) from the thermal container 320 prior to draining the fluid. In such embodiments, the user can add a cleansing member (e.g., a tablet, pouch, liquid, detergent, etc.) into the first volume 326 and/or the second volume 327 and the controller 370, in turn, can be configured to circulate a volume of the fluid including the cleansing member (e.g., dissolved in the volume of fluid) through the fluid circulation system 340. Accordingly, the device 300 can be configured to self-clean after a cooking process. In some instances, after completing the cleaning process, the controller 370 can place the device 300 in the drain configuration to drain the fluid, as described above.

Although not shown in FIGS. 11-17, in some embodiments, the lids 328 can include any suitable heating and/or cooking element configured to augment the fluid-immersion cooking of the food items contained in the thermal container 320. For example, in some embodiments, the lids 328 can include a broiling element or the like that can broil, sear, and/or otherwise cook at least a portion of the food item(s) contained in the first volume 326 and/or the second volume 327. In other embodiments, any suitable portion of the devices 100, 200, and/or 300, the thermal containers 120, 220, and/or 320, and/or the food cartridges disposed therein can include any suitable heating element that can be configured to bake, roast, broil, sear, and/or otherwise cook the food items in at least one additional modality. For example, in some embodiments, a food cartridge (or portion thereof) containing a meat item can include an induction heat element or the like that can be selectively activated when the food cartridge is positioned within the thermal container. By way of example, such a food cartridge can include an electric contact configured to complete an electric circuit when the food cartridge is positioned in the thermal container. Thus, a controller (e.g., the controller 370) can send a signal and/or can send a flow of electric current through the electric circuit, which in turn, can energize and/or otherwise activate the induction heating element of the food cartridge. In other embodiments, any suitable heating element can be included in any suitable portion of the device and selectively activated and/or controlled by a controller.

Although not shown in FIGS. 11-17, in some embodiments, the device 300 can include a fluid reservoir or the like that can provide a flow of fluid to the fluid circulation system 340. For example, a user is described above a pouring a volume of fluid (e.g., water) into the first volume 326, in other embodiments, the user can pour a volume of fluid into the fluid reservoir, which in turn, can supply the fluid to the fluid circulation system 340. In some instances, the volume of fluid contained in the fluid reservoir can be greater than a volume of fluid used to store and/or cook the food items contained in the thermal container 320. In such instances, the extra volume of fluid can be used as, for example, a "make-up" volume or the like that can be used to add a volume of fluid to the fluid circulation system 340 during a storage and/or cooking process. In some instances, the extra volume of fluid can be used, for example, during a cleansing process, as described above. In some embodiments, the fluid reservoir, the thermal container(s), and/or the fluid circulation system can be in fluid communication with a fluid source (e.g., plumbed into the water supply of a house, office, building, etc.). Likewise, the fluid reservoir, the thermal container(s), and/or the fluid circulation system can be in fluid communication with a drain or drain reservoir (e.g., a sink, basin, and/or otherwise plumbed into a drainage system of a house, office, building, etc.).

Figure 18:
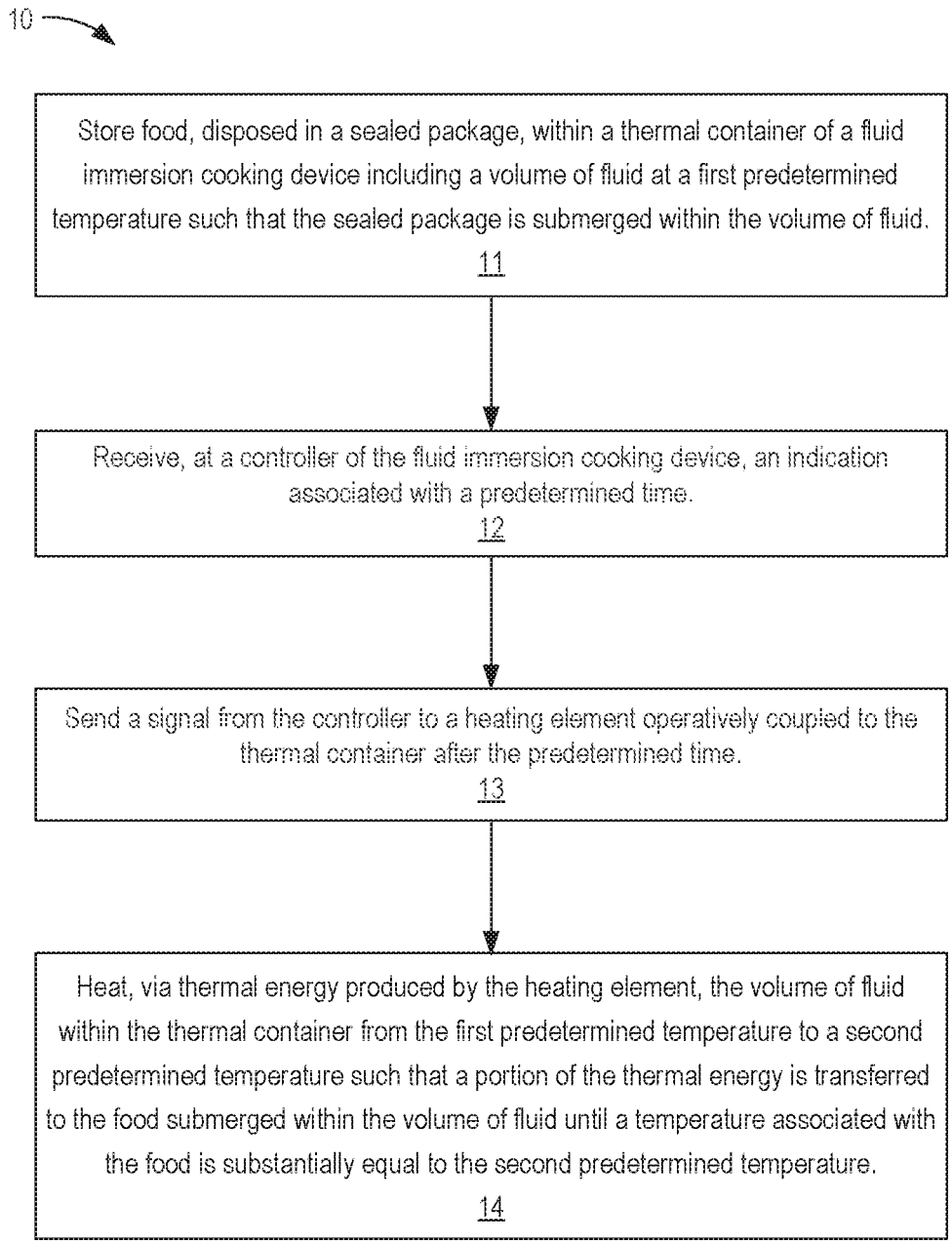
FIG. 18 is a flowchart illustrating a method of at least semi-autonomously storing and cooking meals via fluid immersion.

Referring now to FIG. 18, a flowchart is shown illustrating a method 10 of using an at least semi-autonomous fluid-immersion cooking device (also referred to herein as "device") according to an embodiment. The device can be any suitable configuration. For example, in some embodiments, the device can be substantially similar to the device 100, 200, and/or 300 described in detail herein. As such, the device can include at least one thermal container, a fluid circulation system, one or more heating elements, and/or any other suitable component such as those described above. As shown, the method 10 includes storing food, disposed in a sealed package, within the thermal container(s) including a volume of fluid at a first predetermined temperature such that the sealed package is submerged within the volume of fluid, at 11. For example, prior to disposing the food in the thermal container, a user can fill at least a portion of the thermal container with a fluid. Similarly, the user can fill at least a portion of, for example, a steam reservoir and/or other fluid storage reservoir. In some embodiments, the device and/or thermal container can include a fill indicator or the like such that a desired volume of fluid is added to the thermal container. Thus, the device can be in a storage configuration that is substantially similar to the storage configuration described in detail above with reference to the device 200 (see e.g., FIG. 9). In some embodiments, the first predetermined temperature can be a refrigeration temperature such as, for example, about 40° F. or the like. Moreover, the device can include a controller configured to monitor and/or control a temperature of the fluid within which at least a portion of the food is disposed, as described in detail above with reference to the devices 100, 200, and/or 300.

The controller receives an indication associated with a predetermined time, at 12. In some embodiments, for example, the indication can be associated with a data included in and/or represented by a local and/or remote user input, data, preference, setting, and/or the like. The predetermined time can be, for example, associated with an approximate time at which the device (or a portion thereof) is placed in a cooking configuration such that at least a portion of the food contained therein is cooked and suitable for consumption at a desired time (e.g., a second predetermined time defined, for example, by user input data or the like). As such, the controller sends a signal to one or more heating elements operatively coupled (e.g., at least thermally coupled) to the thermal container after the predetermined time, at 13. In some instances, for example, the controller can send the signal immediately and/or within a very short time (e.g., within a relatively few number of processor clock cycles or the like) after the predetermined time period.

The volume of fluid within the thermal container is heated, via thermal energy produced by the heating element, from the first predetermined temperature to a second predetermined temperature such that a portion of the thermal energy is transferred to the food submerged within the volume of fluid until a temperature associated with the food is substantially equal to the second predetermined temperature, at 14. For example, as described in detail above with reference to the device 100, 200, and/or 300, the fluid can be fluidically isolated from a cooling source such as, for example, a heat exchanger configured to remove heat from the fluid. Thus, the thermal energy produced by the heating element heats the fluid to the second predetermined temperature. As described in detail above, the controller can receive signals from and/or send signals to any suitable electric device, sensor, electromechanical device, and/or the like associated with controlling, regulating, and/or maintaining the fluid substantially at the second predetermined temperature. Thus, as described in detail above with reference to the devices 100, 200, and/or 300, the method 10 can be used to store food at a desired temperature such as, for example, a refrigeration temperature and/or used to cook food via sous-vide to a desired temperature.

Figure 19:
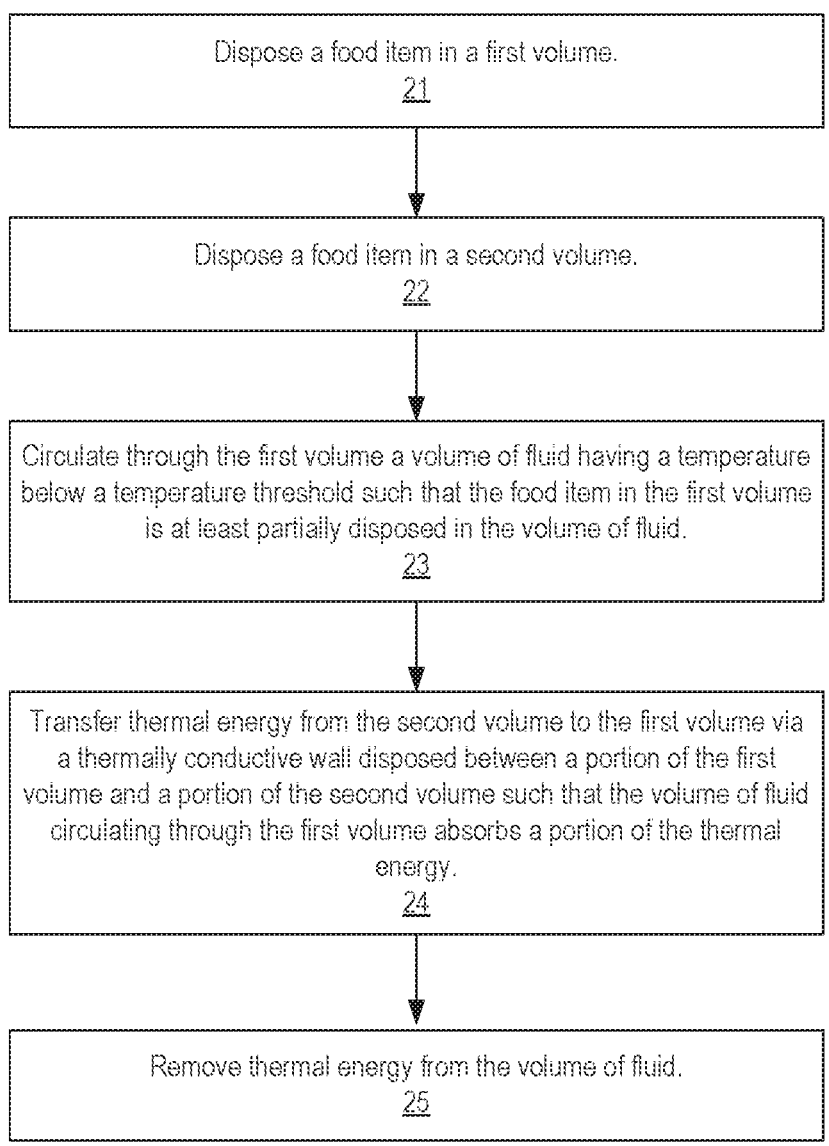
FIG. 19 is a flowchart illustrating a method of at least semi-autonomously storing and cooking meals via fluid immersion.

FIG. 19 is a flowchart illustrating a method 20 of using a fluid-immersion storage and cooking device according to an embodiment. The fluid-immersion storage and cooking device (also referred to herein as "device") can be any of the devices described herein. For example, in some embodiments, the device can be similar to and/or substantially the same as the device 300 described above with reference to the FIGS. 11-17. As such, the device can include at least one thermal container having a first portion and a second portion, and a fluid circulation system configured to circulate a volume of fluid through at least one of the first portion and the second portion to store and/or cook one or more food items disposed in the thermal container.

The method 20 includes disposing a food item in a first volume defined by the first portion of the device, at 21. In some instances, the food item is a meat or protein disposed in a sealed package or the like. More particularly, the package can fluidically isolate the food item contained therein while allowing thermal energy to be transferred between the food item and a volume outside of the package (e.g., the first volume). A food item is disposed in a second volume defined by the second portion of the device, at 22. In some instances, the food item disposed in the second volume is a starch, vegetable, and/or other non-meat food item. In some instances, more than one food item can be disposed in the second volume. Moreover, the food item(s) can be disposed in one or more packages and/or food cartridges. In some embodiments, the package and/or food cartridge disposed in the second volume can be coupled to and/or otherwise formed with the package or food cartridge disposed in the first volume. In some embodiments, the package and/or food cartridge disposed in the second volume can be fluidically and thermally permeable. That is to say, the food item(s) contained in the package and/or food cartridge disposed in the second volume can be in fluid communication and thermal communication with the second volume, as described above with reference to the device 300. In some embodiments, at least some of the food items, packages, and/or food cartridges can be disposed in, for example, a caddy, a holder, and/or the like prior to being inserted into the thermal container. In such embodiments, the caddy and/or holder can simplify and/or otherwise facilitate the insertion and/or removal of the food items as well as can ensure the food items, packages, and/or food cartridges are disposed in a predetermined orientation.

A volume of fluid having a temperature below a temperature threshold is circulated through the first volume such that the food item in the first volume is at least partially disposed in the volume of fluid, at 23. For example, in some embodiments, the device can be in a first configuration (e.g., a "storage" configuration), in which the device maintains one or more food items at a storage temperature prior to cooking the food item(s). In such embodiments, the fluid circulation system of the device can circulate the volume of fluid through, for example, a "cold loop" defined between the first portion of the thermal container and a chiller assembly and/or a heat exchanger included therein. In some instances, a temperature of the volume of fluid can be maintained at and/or below a predetermined storage temperature such as, for example, about 40° F. In other embodiments, the volume of fluid can be maintained at any suitable temperature. Moreover, the food item disposed in the first volume is at least partially submerged in the fluid circulating through the first volume and, as such, is maintained at or below the threshold temperature.

Thermal energy is transferred from the second volume to the first volume via a thermally conductive wall disposed between a portion of the first volume and a portion of the second volume such that the volume of fluid circulating through the first volume absorbs a portion of the thermal energy, at 24. The wall can be formed of and/or can include a material having a relatively high thermal conductivity, as described above with reference to the wall 329 included in the device 300. Accordingly, the wall can transfer thermal energy from a first side of the wall (e.g., the side defining a portion of the second volume) to a second side of the wall (e.g., the side defining a portion of the first volume). Moreover, at least a portion of the volume of fluid can flow along the surface of the wall that defines the portion of the first volume, thereby removing or absorbing thermal energy from the wall. In this manner, the second volume can be, for example, "passively" cooled. In other words, the second volume and/or the food item(s) disposed therein can be cooled without circulating a volume of the fluid therethrough, as described above with reference to the device 300.

Thermal energy can then be removed from the volume of fluid, at 25. For example, as described above, the fluid circulation system of the device can circulate the volume of fluid between the first volume and the chiller assembly (e.g., the chiller assembly 343 included in the device 300). Thus, the chiller assembly and/or a heat exchanger included therein can remove thermal energy from the volume of fluid. With the thermal energy removed from the volume of fluid, the fluid circulation system can deliver and/or transfer the cold, chilled, and/or cooled fluid back into the first volume. As such, the device can maintain the food item disposed in the first volume and the food item(s) disposed in the second volume at or below the temperature threshold (e.g., a storage temperature such as, for example, about 40° F.).

Figure 20:
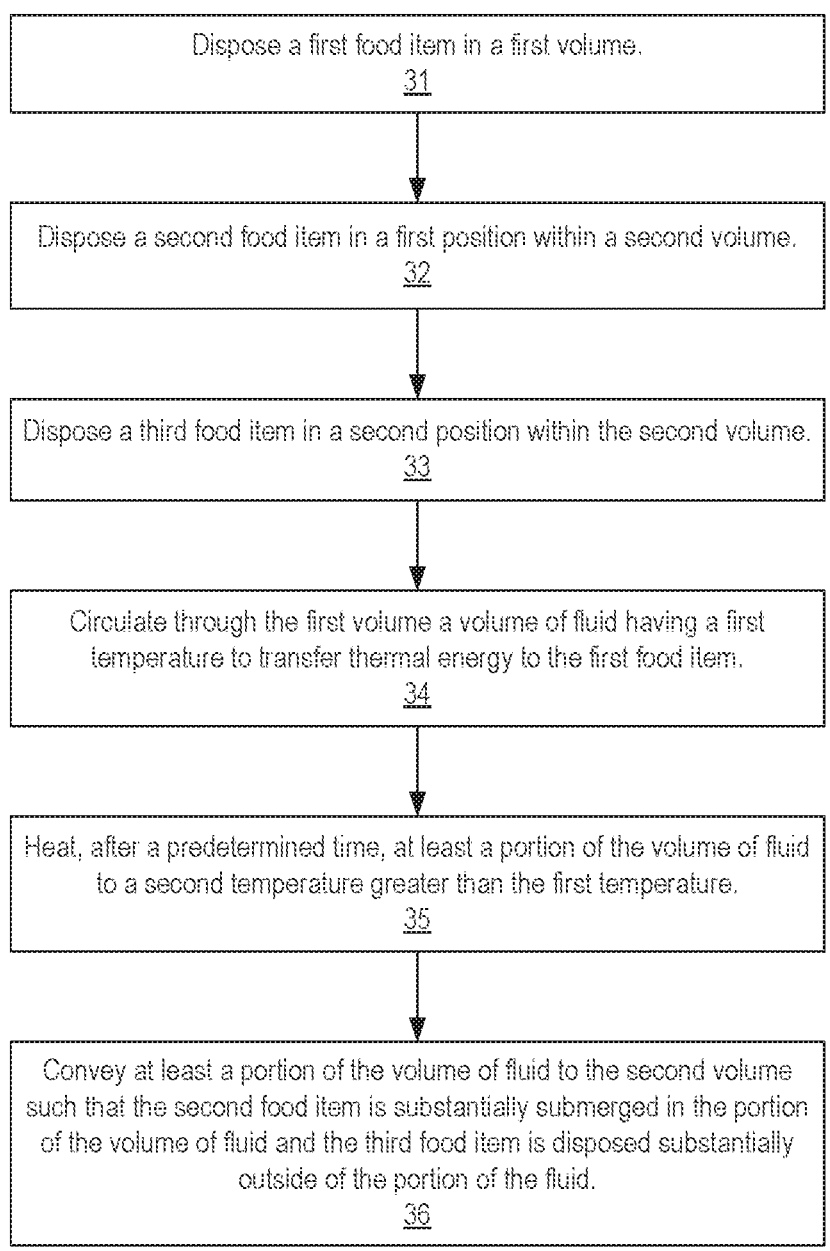
FIG. 20 is a flowchart illustrating a method of at least semi-autonomously storing and cooking meals via fluid immersion.

FIG. 20 is a flowchart illustrating a method 30 of using a fluid-immersion storage and cooking device according to an embodiment. The fluid-immersion storage and cooking device (also referred to herein as "device") can be any of the devices described herein. For example, in some embodiments, the device can be similar to and/or substantially the same as the device 300 described above with reference to the FIGS. 11-17. As such, the device can include at least one thermal container having a first portion and a second portion, and a fluid circulation system configured to circulate a volume of fluid through at least one of the first portion and the second portion to store and/or cook one or more food items disposed in the thermal container.

The method 30 includes disposing a first food item in a first volume defined by the first portion of the device, at 31. In some instances, the first food item is a meat or protein disposed in a sealed package or the like. More particularly, the package can fluidically isolate the food item contained therein while allowing thermal energy to be transferred between the food item and a volume outside of the package (e.g., the first volume). A second food item (e.g., a starch) is disposed in a first position within a second volume defined by the second portion of the device, at 32. A third food item (e.g., a vegetable) is disposed in a second position within the second volume different from the first position, at 33. In some instances, the second food item and the third food item are disposed in individual and/or separate packages and/or food cartridges. In other instances, a package and/or food cartridge containing the second food item can be coupled to a package and/or food cartridge containing the third food item. In still other instances, a package and/or food cartridge can contain both the second food item and the third food item. In addition, in some instances, the one or more packages and/or food cartridges configured to be disposed within the second volume can be coupled to and/or formed with the package and/or food container configured to be disposed within the first volume, as described above with reference to, for example, the device 200. In still other embodiments, additional food items can be disposed in the second volume. For example, in some embodiments, the method 30 can include disposing a fourth food item in a third position within the second volume. In some embodiments, the fourth food item can be a sauce, seasoning, marinade, etc.

The arrangement of the one or more packages and/or food cartridges configured to be disposed in the second volume can be such that the second food item is disposed in the first position and the third food item is disposed in the second position. For example, in some embodiments, the second food item (e.g., a starch) can be disposed within the second volume in a position below the third food item (e.g., a vegetable), as described in further detail herein. Furthermore, while the package and/or food cartridge containing the first food item is described above as being fluidically impermeable yet thermally permeable, the one or more packages and/or food cartridges (or portions thereof) can be fluidically and thermally permeable, as described above with reference to the packages and/or food cartridges disposed in the devices 100, 200, and/or 300. That is to say, the second food item and the third food item are configured to be in fluid communication and thermal communication with the second volume and/or a volume of fluid contained therein, as described above with reference to the device 300.

A volume of fluid having a first temperature is circulated through the first volume to transfer thermal energy to the first food item, at 34. For example, in some embodiments, the device can be in a first configuration (e.g., a "storage" configuration) when maintaining one or more food items at a storage temperature prior to cooking the food item(s), as described above with reference to the method 20. In some embodiments, the device can be configured to transition from the first configuration to a second configuration (e.g., a "cooking" configuration), in which the device cooks the one or more food items in response to a user input and/or instruction. For example, in some instances, the user can input a time at which the user desires to eat the food item(s) cooked by the device. As such, the device (and/or a controller included therein) can determine and/or calculate a time to start cooking the food item(s) based at least in part on the user input and information and/or data associated with the one or more food items. In some embodiments, the device and/or controller can receive an input, data, and/or information from, for example, a web page or web browser application programming interface (API).

In some embodiments, the package and/or food cartridge containing the first, second, and third food items can each include, for example, an electric or electronic communication device (e.g., an RFID tag, bar code, QR code, NFC radio, and/or the like) that can include and/or can transmit data associated with the one or more food items contained therein. Thus, the device can receive and/or can determine cooking instructions, etc. for the food item(s) contained in the device and can determine when to transition the device from, for example, a storage configuration, to a cooking configuration, as described above with reference to the devices 100, 200, and/or 300. Moreover, the device and/or the controller included therein can be configured to control the fluid circulation system and/or one or more heater assemblies to heat the fluid circulating through the first volume to the first temperature (e.g., to circulate the volume of fluid through a "hot loop"). In some instances, the first temperature can be, for example, a predetermined cooking temperature or the like based at least in part on data received from the electric or electronic communication device of the package and/or food cartridge. For example, in some instances, the first temperature can be between about 140° F. and about 170° F. In other instances, the first temperature can be less than 140° F. or greater than 170° F.

After a predetermined time, at least a portion of the volume of fluid is heated to a second temperature greater than the first temperature, at 35. For example, as described above, the device and/or the controller included therein can define a cooking method or modality based at least in part on data associated with the first, second, and/or third food items. In some instances, it may be desirable to heat and/or cook the first food item (e.g., a meat or protein) at the first temperature and the second and third food items (e.g., a starch and vegetable, respectively) at the second temperature. Accordingly, the device and/or controller can determine when the increase a temperature of at least a portion of the volume of fluid circulating through the first volume (e.g., through the "hot loop"), as described in detail above with reference to the device 300. More particularly, the device and/or controller can circulate at least a portion of the volume of fluid through the heater assembly to increase a temperature thereof to the second temperature. With the volume of fluid still circulating through the first volume, in some instances, the predetermined time can account for the exposure of the first food item to the increase in thermal energy, as described above with reference to the device 300.

After increasing the temperature of the fluid to the second temperature, at least a portion of the volume of fluid is conveyed to the second volume such that the second food item is substantially submerged in the portion of the volume of fluid and the third food item is disposed substantially outside of the portion of the fluid, at 36. For example, in some embodiments, the second temperature can be between about 170° F. and about 212° F. In other words, the second temperature of the fluid (e.g., water) can be increased to a temperature above the first temperature but below, for example, the boiling point of water (e.g., about 212° F.). In other instances, the second temperature can be greater than the boiling point of water and/or the boiling point of the fluid circulating through the device.

As described above, in some embodiments, the arrangement of the second food item and the third food item within the second volume can be such that the second food item is in a position below the third food item. Thus, the portion of the volume of fluid transferred into the second volume of the thermal container can be sufficient to substantially submerge the second food item while not substantially submerging the third food item. By way of example, in some instances, the second food item can be rice, which can be cooked via a known cooking method of submerging the rice in a boiling or sub-boiling water for a predetermined time. The third food item can be a vegetable such as, for example, broccoli, green beans, etc., which can be cooked via a known cooking method of steaming or the like for a predetermined time. Accordingly, the second food item and the third food item can be arranged in the second volume such that when the portion of the volume of fluid is conveyed into the second volume, the second food item and the third food item are cooked via known cooking methods. In some instances, after cooking the first, second, and third food items, the method can include maintaining the food items at a third temperature less than the first temperature until the user removes the cooked food items. The third temperature can be, for example, a warming temperature or the like such that the food items are ready to eat upon removal from the device, as described above with reference to the devices 100, 200, and/or 300.

Although the packages and/or cartridges containing the food are not particularly shown and/or described herein, it should be understood that such packages and/or cartridges can have any suitable arrangement and/or configuration. In some embodiments, for example, the packages can contain meat and/or other protein products in a first fluidically sealed portion and can contain vegetables, starches, carbohydrates, etc. in a second fluidically sealed portion (or fluidically porous portion such as a reduced oxygen packaging or the like). In some embodiments, the packages and/or cartridges can include an absorbent material or the like configured to absorb excess fluid resulting from the cooking of the food.

In some embodiments, a user can, for example, subscribe to a meal delivery service in which the user selects the food items he or she wishes to eat (e.g., via a PC application, mobile application, web browser and the Internet, telephone service, etc.) and receives the food items via a delivery. In such embodiments, the food items and/or meals can be pre-packaged prior to delivery. In this manner, the user can receive the food items and can place them within the device 100, 200, and/or 300 without having to place the food items, for example, in freeze storage or the like. Such subscription services can be based on, for example, a desired number of meals per week and/or any other suitable measure. In other instances, a user can purchase one or more meals "on demand." For example, a user can enter an order via the Internet and a web browser, PC or mobile application, etc.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals (e.g., propagating electromagnetic wave carrying information on a transmission medium such as space or a cable). The media and computer code (also referred to herein as code) may be those designed and constructed for the specific purpose or purposes. Examples of non-transitory computer-readable media include, but are not limited to: magnetic storage media such as hard disks, optical storage media such as Compact Disc/Digital Video Discs (CD/DVDs), Compact Disc-Read Only Memories (CD-ROMs), magneto-optical storage media such as optical disks, carrier wave signal processing modules, and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, FORTRAN, etc.), functional programming languages (Haskell, Erlang, etc.), logical programming languages (e.g., Prolog), object-oriented programming languages (e.g., Java, C++, etc.), or other programming languages and/or other development tools. Additional examples of computer code include, but are not limited to, control signals, encrypted code, and compressed code.

While some of the electronics systems are described herein as receiving signals from any suitable sensor and/or the like and based on a processor executing a set of instructions, a subsequent action is performed by a portion of the device, in other instances, a signal from the sensor can be operable in causing a portion of the device to perform the subsequent action. For example, in some embodiments, the signal sent from a sensor can be operable in transitioning a switch, a fuse, a breaker, and/or any other suitable logic device from a first state, in which a portion of the device receives a flow of electric power, to a second state, in which the portion of the device substantially does not receive a flow of electric power or vice versa. For example, a sensor can send a signal based on a temperature of a volume of fluid contained in a thermal container exceeding a predetermined threshold that can be operable in opening or closing one more valves configured to control a flow fluid into and/or out of the thermal container to bring the temperature of the volume of fluid within the predetermined threshold. Similarly, a fill sensor or the like can send a signal based on a fill level of a volume of fluid contained in the thermal container exceeding a predetermined fill limit that can be operable in opening one or more valves to establish fluid communication between a volume defined by the thermal container and a drain reservoir. As such, at least a portion of the fluid can be drained from the thermal container until the volume of the fluid is within the predetermined fill limit.

While various embodiments have been described above, it should be understood that they have been presented by way of example only, and not limitation. Where schematics and/or embodiments described above indicate certain components arranged in certain orientations, positions, and/or configurations, the arrangement of components may be modified. For example, although the fluid flow paths of the devices 200 and 300 are particularly described above with reference to FIG. 9 and FIGS. 17A-17B, respectively, it should be understood that the fluid flow paths are presented by way of example and not limitation. In other embodiments, a device can include any suitable fluid circulation system that can include pumps, valves, solenoids, fluid conduits, manifolds, distribution blocks, and/or the like in any suitable configuration such that when the device (or a portion thereof) is in a storage configuration, a fluid flowing through at least a portion of the device is substantially cooled and when the device (or a portion thereof) is in a cooking configuration, a fluid flowing through and/or otherwise contained within a portion of the device is (1) fluidically isolated from a cooling source and (2) thermally coupled to a heating element configured to transfer thermal energy to the fluid.

While the embodiments have been particularly shown and described, it will be understood that various changes in form and details may be made. Similarly, although various embodiments have been described as having particular features and/or combinations of components, other embodiments are possible having a combination of any features and/or components from any of embodiments as discussed above. For example, while the valves 257 are described above as being transferred between an open and closed configuration, a device can include, for example, multi-lumen valves configured to fluidically isolate a first portion of the multi-lumen valve while maintaining, for example, a second portion of the multi-lumen valve in fluid communication. The valves described herein can be any suitable valve, solenoid, and/or the like. While the first volume 226 and the second volume 227 of the thermal container 220 are show, for example, in FIG. 9, as being in fluid communication with the first fluid conduit 258A and the ninth fluid conduit 258J via the openings 225 in the base plate 224, in other embodiments, the fluid circulation system 240 can include a valve or solenoid at least partially and/or selectively disposed in the openings 225 and configured to place the first volume 226 and the second volume 227 in fluid communication with the fluid circulation system 240.

By way of another example, while the thermal container(s) 220 are described above as being formed of or from a metal material such as aluminum, stainless steel, etc. and the thermal container(s) 320 are described above as being formed of or from a plastic or polymer material, in other embodiments, the thermal containers 220 and/or 320 can be formed of or from any suitable material or combination of materials. For example, in some embodiments, a thermal container can include a first portion formed of or from a metal material and a second portion formed of or from a plastic or polymer material. In other embodiments, a thermal container can include a first portion formed of or from a first metal or alloy and a second portion formed of or from a second metal or alloy, different from the first. Likewise, in other embodiments, a thermal container can include a first portion formed of or from a first plastic or polymer and a second portion formed of or from a second plastic or polymer material, different from the first. In this manner, a thermal container can have any suitable arrangement and/or can be formed of any suitable material or combination of materials to facilitate and/or otherwise control thermal transfer through and/or along portions thereof.

Although not shown, in some embodiments, any of the devices 100, 200, and/or 300 can include any suitable diffuser, heat shield, barrier, and/or any other suitable means of protecting a package and/or cartridge containing a food from being placed in direct contact with heating elements and/or an otherwise heated surface of the thermal container(s).

Where methods and/or schematics described above indicate certain events and/or flow patterns occurring in certain order, the ordering of certain events and/or flow patterns may be modified. Additionally, certain events may be performed concurrently in parallel processes when possible, as well as performed sequentially. It should be understood that the methods of operation and/or use described herein are provided by way of example and not limitation. For example, while the method 30 is described above with reference to FIG. 20 as including, at step 35, heating at least a portion of the volume of fluid to a second temperature greater than the first temperature after a predetermined time, in other instances, a temperature of the volume of fluid used to cook food items in a first portion of a thermal container and food items in a second portion of the thermal container can be substantially constant. For example, in some instances, a recipe and/or a set of instructions for cooking a first food item disposed in the first portion (e.g., a meat) can call for cooking the first food item at, for example, about 195° F. (or other suitable cooking temperature) and a recipe and/or a set of instructions for cooking at least a second food item disposed in the second portion (e.g., a starch, a vegetable, a sauce, and/or the like) can call for cooking at least the second food item at substantially the same temperature (i.e., 195° F.). Accordingly, it should be understood that while specific examples of cooling and/or heating (cooking) food items are described herein, the operation of the device (e.g., storing and/or cooking food items) is not intended to be limited thereto.

What is claimed:

1. A method of using a storage and cooking device, the device including a first container, a second container, and a circulation system, the method comprising:
   circulating a volume of water through a cold flow path of the circulation system to cool the volume of water to a refrigeration temperature, a portion of the first container defining a portion of the cold flow path, the volume of water at the refrigeration temperature cooling a first food item disposed in the first container and a second food item disposed in the second container for a first time period;
   circulating the volume of water through a hot flow path of the circulation system to heat the volume of water from the refrigeration temperature to a first cooking temperature, the portion of the first container defining a portion of the hot flow path, the volume of water at the first cooking temperature cooking the first food item for a second time period;
   circulating a portion of the volume of water through the hot flow path to change a temperature of the portion of the volume of water to a second cooking temperature different than the first cooking temperature; and
   conveying the portion of the volume of water at the second cooking temperature to the second container, a portion of the second container defining a portion of the hot flow path, the portion of the volume of water at the second cooking temperature cooking the second food item for a third time period.

2. The method of claim 1, wherein at least a portion of the third time period is concurrent with the second time period.

3. The method of claim 1, wherein the second time period is based at least in part on a calculated cook time associated with cooking the first food item via the volume of water at the first cooking temperature.

4. The method of claim 1, wherein the third time period is based at least in part on a calculated cook time associated with cooking the second food item via the portion of the volume of water at the second cooking temperature.

5. The method of claim 1, wherein the third time period is based at least in part on a calculated cook time associated with cooking the first food item and a calculated cook time associated with cooking the second food item.

6. The method of claim 1, wherein circulating the volume of water through the cold flow path includes circulating the volume of water at the refrigeration temperature around the first food item disposed in the first container.

7. The method of claim 6, wherein a portion of the second container is in thermal communication with a portion of the first container, the method further comprising:
   transferring thermal energy from the second food item disposed in the second container to the volume of water at the refrigeration temperature circulating around the first food item, thereby cooling the second food item.

8. The method of claim 1, wherein circulating the volume of water through the hot flow path to heat the volume of water from the refrigeration temperature to the first cooking temperature includes circulating the volume of water at the first cooking temperature around the first food item disposed in the first container such that the volume of water at the first cooking temperature transfers thermal energy to the first food item to cook the first food item for the second time period.

9. The method of claim 1, wherein the second food item is submerged in the portion of the volume of water at the second cooking temperature conveyed into the second container, the portion of the volume of water at the second cooking temperature transferring thermal energy to the second food item to cook the second food item for the third time period.

10. The method of claim 9, further comprising:
   receiving, at a controller of the storage and cooking device, a first data set from a first identifier associated with the first food item, the first data set including instructions for cooking the first food item; and
   receiving, at the controller of the storage and cooking device, a second data set from a second identifier associated with the second food item, the second data set including instructions for storing and cooking the second food item.

11. The method of claim 1, further comprising:
   draining the second container at an end of the third time period.

12. A method of using a storage and cooking device, the device including a first container, a second container, and a circulation system, the method comprising:
   circulating a volume of water through a cold flow path of the circulation system to cool the volume of water to a refrigeration temperature;
   circulating the volume of water at the refrigeration temperature around a first food item disposed in the first container to cool the first food item at the refrigeration temperature for a first time period;
   transferring thermal energy from a second food item disposed in the second container to the volume of water at the refrigeration temperature during the first time period;
   circulating the volume of water through a hot flow path of the circulation system to heat the volume of water from the refrigeration temperature to a first cooking temperature;
   circulating the volume of water at the first cooking temperature around the first food item disposed in the first container to cook the first food item at the first cooking temperature for a second time period;
   circulating a portion of the volume of water at the first cooking temperature through the hot flow path of the circulation system to heat the portion of the volume of water at the first cooking temperature to a second cooking temperature; and
   conveying the portion of the volume of water at the second cooking temperature to the second container, the portion of the volume of water at the second cooking temperature cooking the second food item at the second cooking temperature for a third time period.

13. The method of claim 12, wherein at least a portion of the third time period is concurrent with a portion of the second time period.

14. The method of claim 12, wherein the second time period is based at least in part on a calculated cook time associated with cooking the first food item via the volume of water at the first cooking temperature.

15. The method of claim 12, wherein the third time period is based at least in part on a calculated cook time associated with cooking the second food item via the portion of the volume of water at the second cooking temperature.

16. The method of claim 12, wherein the storage and cooking device includes a thermally conductive wall forming a portion of the first container and configured to transfer thermal energy between at least the second food item and the volume of water at the refrigeration temperature circulating around the first food item.

17. The method of claim 12, further comprising:
receiving, at a controller of the storage and cooking device, a first data set from a first identifier associated with the first food item, the first data set including instructions for cooking the first food item; and
receiving, at the controller of the storage and cooking device, a second data set from a second identifier associated with the second food item, the second data set including instructions for cooking the second food item.

18. The method of claim 12, wherein the storage and cooking device is in communication with a remote electronic device, the method further comprising:
receiving, at a controller of the storage and cooking device, a signal from the remote electronic device, the signal including data associated with at least one of the first food item and the second food item.

19. The method of claim 12, wherein the second food item is submerged in the portion of the volume of water at the second cooking temperature conveyed into the second container, the portion of the volume of water at the second cooking temperature transferring thermal energy to the second food item to cook the second food item for the third time period.

20. The method of claim 19, further comprising:
draining the second container at an end of the third time period.

21. A method of using a storage and cooking device, the device including a first container, a second container, and a circulation system, the method comprising:
transferring a volume of water from a reservoir to a cold flow path of the circulation system, a portion of the first container defining a portion of the cold flow path;
circulating the volume of water through the cold flow path to cool the volume of water to a refrigeration temperature such that a first food item disposed in the first container is cooled for a first time period;
transferring the volume of water from the cold flow path to a first hot flow path of the circulation system, the portion of the first container defining a portion of the hot flow path;
circulating the volume of water through the first hot flow path to heat the volume of water to a first cooking temperature such that the first food item is cooked at the first cooking temperature;
transferring, after a second time period, a portion of the volume of water from the first hot flow path to a second hot flow path of the circulation system, a portion of the second container defining a portion of the second hot flow path;
circulating the portion of the volume of water through the second hot flow path to heat the portion of the volume of water to a second cooking temperature greater than the first cooking temperature such that a second food item disposed in the second container is cooked at the second cooking temperature; and
transferring, after a third time period, the volume of water from at least one of the first hot flow path or the second hot flow path to a drain flow path of the circulation system.

22. The method of claim 21, wherein at least a portion of the third time period is concurrent with the second time period.

23. The method of claim 21, wherein circulating the volume of water through the cold flow path includes circulating the volume of water at the refrigeration temperature around the first food item to cool the first food item.

24. The method of claim 23, wherein a portion of the second container is in thermal communication with a portion of the first container, the method further comprising:
transferring thermal energy from the second food item disposed in the second container to the volume of water at the refrigeration temperature circulating around the first food item.

25. The method of claim 21, wherein the second time period is based at least in part on a cook time associated with cooking the first food item via the volume of water at the first cooking temperature and the third time period is based at least in part on a cook time associated with cooking the second food item via the portion of the volume of water at the second cooking temperature.

26. The method of claim 25, wherein the third time period is based at least in part on the cook time associated with cooking the first food item and the cook time associated with cooking the second food item.

27. The method of claim 25, wherein the storage and cooking device includes a controller configured to control the circulation system, the method further comprising:
defining, at the controller, data indicative of the cook time associated with cooking the first food item in response to a first input; and
defining, at the controller, data indicative of the cook time associated with cooking the second food item in response to a second input.

28. The method of claim 27, further comprising:
defining, at the controller, data indicative of the first cooking temperature in response to the first input; and
defining, at the controller, data indicative of the second cooking temperature in response to the second input.

29. The method of claim 27, further comprising:
receiving a user input at the controller, the user input including data defining a calculated time for completing the cooking of the first food item and the second food item.

30. The method of claim 29, wherein the first time period is based at least in part on the calculated time for completing the cooking of the first food item and the second food item.

* * * * *